US011171888B2

(12) United States Patent
Hirota

(10) Patent No.: US 11,171,888 B2
(45) Date of Patent: Nov. 9, 2021

(54) PACKET PROCESSING DEVICE AND PACKET PROCESSING METHOD

(71) Applicant: FUJITSU LIMITED, Kawasaki (JP)

(72) Inventor: Masaki Hirota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/812,932

(22) Filed: Mar. 9, 2020

(65) Prior Publication Data

US 2020/0314033 A1  Oct. 1, 2020

(30) Foreign Application Priority Data

Mar. 27, 2019 (JP) .............................. JP2019-060673

(51) Int. Cl.
*H04L 12/46* (2006.01)
*H04L 12/939* (2013.01)
*H04L 12/26* (2006.01)

(52) U.S. Cl.
CPC ........ *H04L 49/552* (2013.01); *H04L 12/4641* (2013.01); *H04L 43/0894* (2013.01); *H04L 43/16* (2013.01); *H04L 49/555* (2013.01)

(58) Field of Classification Search
CPC . H04L 12/4641; H04L 43/0894; H04L 43/16; H04L 47/10; H04L 49/90; H04L 49/552; H04W 76/25

USPC ............................ 370/345, 468, 473; 398/79
See application file for complete search history.

(56) References Cited

U.S. PATENT DOCUMENTS

| 6,891,852 B1* | 5/2005 | Cloutier ................ H04W 76/25 370/468 |
| 2007/0064731 A1 | 3/2007 | Mizutani et al. |
| 2009/0220238 A1* | 9/2009 | Wang ..................... H04L 47/10 398/79 |

FOREIGN PATENT DOCUMENTS

| JP | 2001-177660 A | 6/2001 |
| JP | 2007-074234 A | 3/2007 |
| JP | 2018-129661 A | 8/2018 |

* cited by examiner

*Primary Examiner* — Harun Chowdhury
(74) *Attorney, Agent, or Firm* — Fujitsu Patent Center

(57) ABSTRACT

A packet processing device includes a memory, and circuitry coupled the memory and configured to perform: sampling received packets at a predetermined interval, detecting a plurality of bursts in which received packets are continuously detected by the sampling, calculating, for each of the plurality of bursts detected, a front edge period based on the received packet detected first among the bursts, calculating, for each of the plurality of bursts detected, a rear edge period based on the received packet detected last among the bursts, deciding the longer period between the front edge period and the rear edge period as a burst period, and controlling transfer of the received packets based on the decided burst period.

14 Claims, 51 Drawing Sheets

FIG. 5

| TS NUMBER | FIRST GATE | SECOND GATE | RESIDENCE TIME |
|---|---|---|---|
| 1 | O | C | 10μ SECONDS |
| 2 | O | C | 20μ SECONDS |
| 3 | O | C | 10μ SECONDS |
| 4 | O | O | 5μ SECONDS |
| 5 | O | O | 5μ SECONDS |
| 6 | O | O | 15μ SECONDS |
| ⋮ | ⋮ | ⋮ | ⋮ |
| N | O | O | 15μ SECONDS |

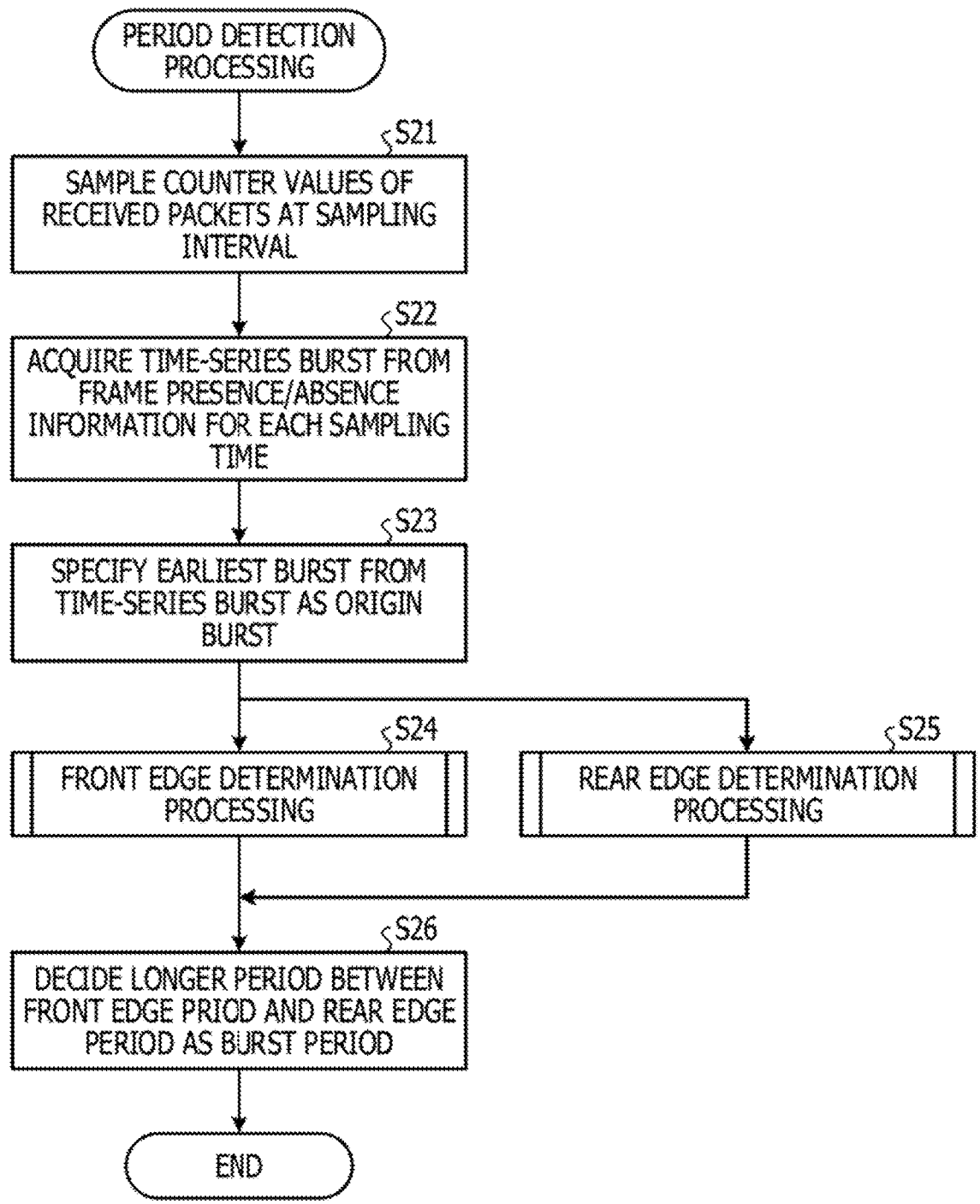

PACKET PROCESSING DEVICE AND PACKET PROCESSING METHOD

CROSS-REFERENCE TO RELATED APPLICATION

This application is based upon and claims the benefit of priority of the prior Japanese Patent Application No. 2019-60673, filed on Mar. 27, 2019, the entire contents of which are incorporated herein by reference.

FIELD

The embodiments discussed herein are related to a packet processing device and a packet processing method.

BACKGROUND

A centralized radio access network (C-RAN) including a baseband unit (BBU) and a remote radio head (RRH) has recently been studied for the realization of the fifth generation mobile communication system (5G). As for a mobile front haul (MFH) line between the BBU and the RRH, there has been studied the adoption of a common public radio interface (CPRI), method for transmitting radio analog signals almost without any change.

In a communication system coupled to an MFH line information is handled as layer 2 packets, and therefore, the network is shared with a mobile back haul (MBH) line, a wired network or the like coupling base stations. However, in the communication system, output delay occurs when MFH packets from the MFH line compete with other packets, for example, MBH packets from the MBH line. Therefore, priority control processing for suppressing such output delay is demanded. In the priority control processing, subsequent high-priority packets are preferentially read before queued low-priority packets, and thus output delay of high-priority packets, that is, MFH packets may be suppressed.

However, in the priority control processing, when a high-priority packet arrives during reading of a low-priority packet, the reading operation of the high-priority packet is stopped unto the read output of the low-priority packet being read is completed. As a result, there occurs wait for up to about one packet. When a link rate is 10 Gbps and a packet length is 9000 bytes, for example, output delay of about 7μ seconds occurs. In the MFH line, output delay of 100μ seconds or less is demanded between the RRH and the BBU; therefore, in the case of a multistage node configuration, such output delay for one packet may not be ignored.

Time Sensitive Networking (TSN) of the Institute of Electrical and Electronics Engineers (IEEE) 802.1 has been studied as another method for suppressing the output delay. The TSN includes a time aware shaper (TAS) method of the IEEE 802.1 Qbv as a data plane function to suppress packet output delay.

Examples of the related art include Japanese Laid-open Patent Publication Nos. 2001-177660, 2007-74234, 2018-129661, and the like.

SUMMARY

According to an aspect of the embodiments, a packet processing device includes a memory, and circuitry coupled the memory and configured to perform: sampling received packets at a predetermined interval, detecting a plurality of bursts in which received packets are continuously detected by the sampling, calculating, for each of the plurality of bursts detected, a front edge period based on the received packet detected first among the bursts, calculating, for each of the plurality of bursts detected, a rear edge period based on the received packet detected last among the bursts, deciding the longer period between the front edge period and the rear edge period as a burst period, and controlling transfer of the received packets based on the decided burst period.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram illustrating an example of a table configuration of a list table;

FIG. 15 is a flowchart illustrating an example of processing operations of the analysis unit related to the period detection processing;

DESCRIPTION OF EMBODIMENTS

A communication system is assumed, including a plurality of packet switches adopting the TAS method. In this case, each of the packet switches has to adjust opening and closing timing of each gate in the entire communication system, considering the transmission timing at the transmission end of MFH packets as high-priority packets as well as transmission delay for each gate of the packet switch so as to preferentially output the MFH packets.

In one aspect, it is an object of the embodiments to provide a packet processing device and the like capable of suppressing output delay of a specific packet.

Hereinafter, with reference to the drawings, embodiments of a packet processing device and the like disclosed in the present application will be described in detail. The embodiments are not intended to limit the disclosed technology. The following embodiments may be combined in any manner which is not logically contradictory.

Embodiment 1

Figure 1:
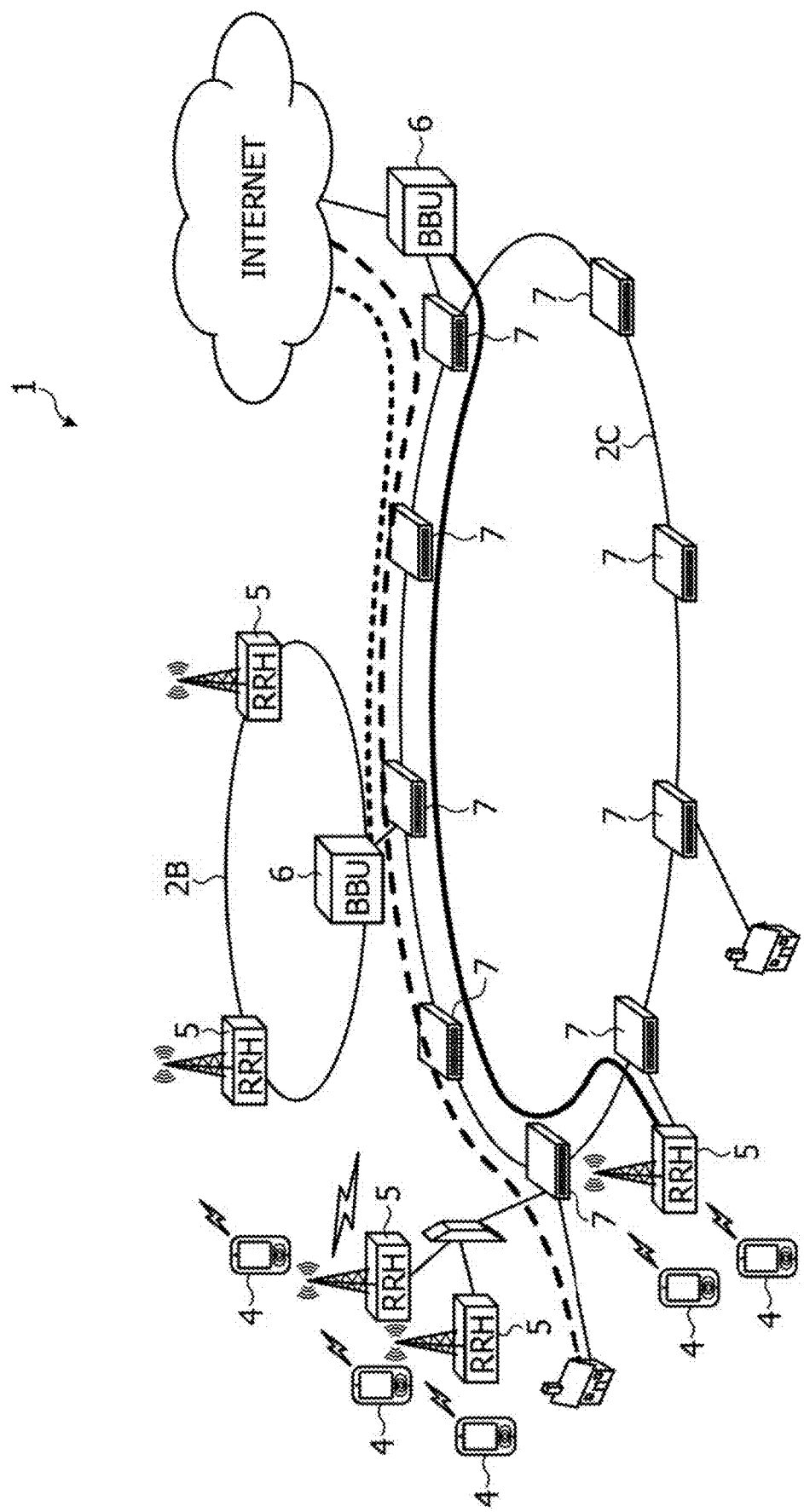
FIG. 1 is an explanatory diagram illustrating an example of a communication system of Embodiment 1.

FIG. 1 is an explanatory diagram illustrating an example of a communication system 1 of Embodiment 1. The communication system 1 illustrated in FIG. 1 includes an MBH line 2A, an MPH line 2B, and a backbone line 2C. The MBH line 2A is a line that couples a plurality of base stations (eNB: evolved Node B). The base stations is coupled wirelessly to radio terminals 4 through radio antennas. The MFH line 2B is a line that couples between an RRH 5 and a BBU 6. The RRH 5 is coupled wirelessly to the radio terminals 4. The MFH line 2B employs a base station division method in which a radio signal is transmitted between the RRH 5 and the BBU 6 using an MPH packet of an L2 frames. The backbone line 2C is coupled to another wired network in addition to the MBH line 2A and the MFH line 2B, and transmits various packets such as MBH packets from the MBH line 2A and MFH packets from the MFH line 2B. MFH packets are strongly demanded to suppress output delay compared to MBH packets.

The BBU 6 has a radio section scheduling function. The scheduling function is a function to decide various elements such as user data, a code rate, and a modulation method, for example, to be transmitted to one sub-frame. The BBU 6 divides the user data into L2 frames, and transmits MFH packets to the RRH 5. For example, the BBU 6 transmits the MFH packets to the RRH 5 at sub-frame intervals, for example, every 1 m seconds. The RRH 5 divides the user data of the radio signal received into L2 frames, and transmits MFH packets to the BBU 6.

The backbone line 2C is a line on which a plurality of packet switches 7 are arranged to transmit MBH packets from the MBH line 2A and MFH packets from the MFH line 2B. The packet switches 7 transmit various packets other than the MBH packets and the MFH packets. The packet switches 7 adopt a time aware shaper (TAS) method of the IEEE 802.1 Qbv to output the MFH packets as high-priority packets.

Figure 2:
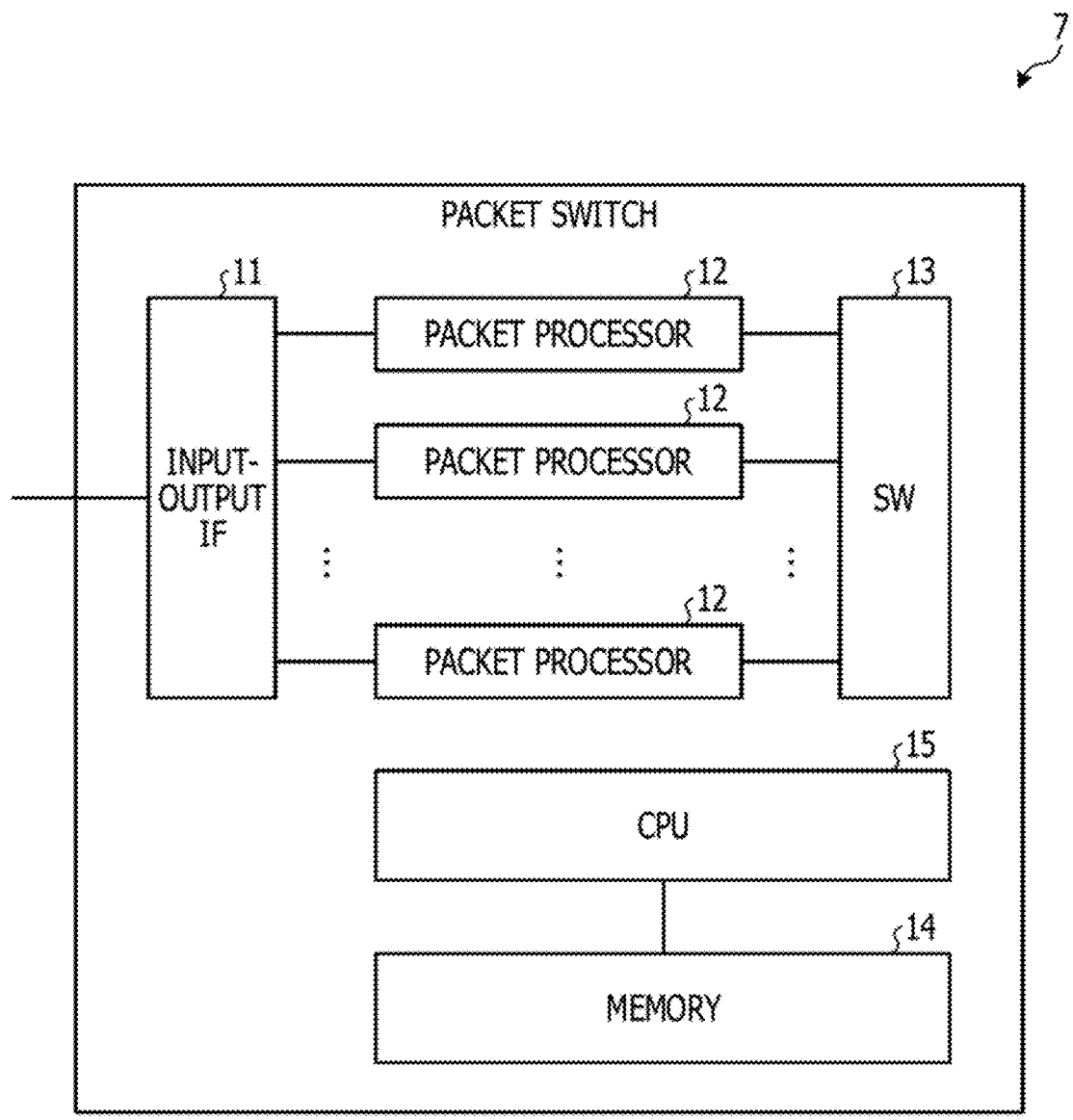
FIG. 2 is an explanatory diagram illustrating an example of a hardware configuration of a packet switch.

FIG. 2 is an explanatory diagram illustrating an example of a hardware configuration of the packet switch 7. The packet switch 7 illustrated in FIG. 2 includes an input-output interface (IF) 11, a plurality of packet processors 12, a switch (SW) 13, a memory 14, and a central processing unit (CPU) 15. The packet switch 7 is a transmission apparatus, for example. The input-output IF 11 is an IF to input and output packets by coupling to various lines such as the backbone line 2C. The input-output IF 11 is coupled to the RRH 5 and BBU 6 coupled to the backbone line 2C as well as to the other packet switches 7, for example. The packet processor 12 is a packet processing device such as an IF card to execute packet processing adopting the TAS method. The SW 13 is a switch card to switch between input and output of the packet processor 12. The memory 14 is a region to store various information. The CPU 15 controls the entire packet switch 7. The memory 14 and the CPU 15 are mounted on a control card.

Figure 3:
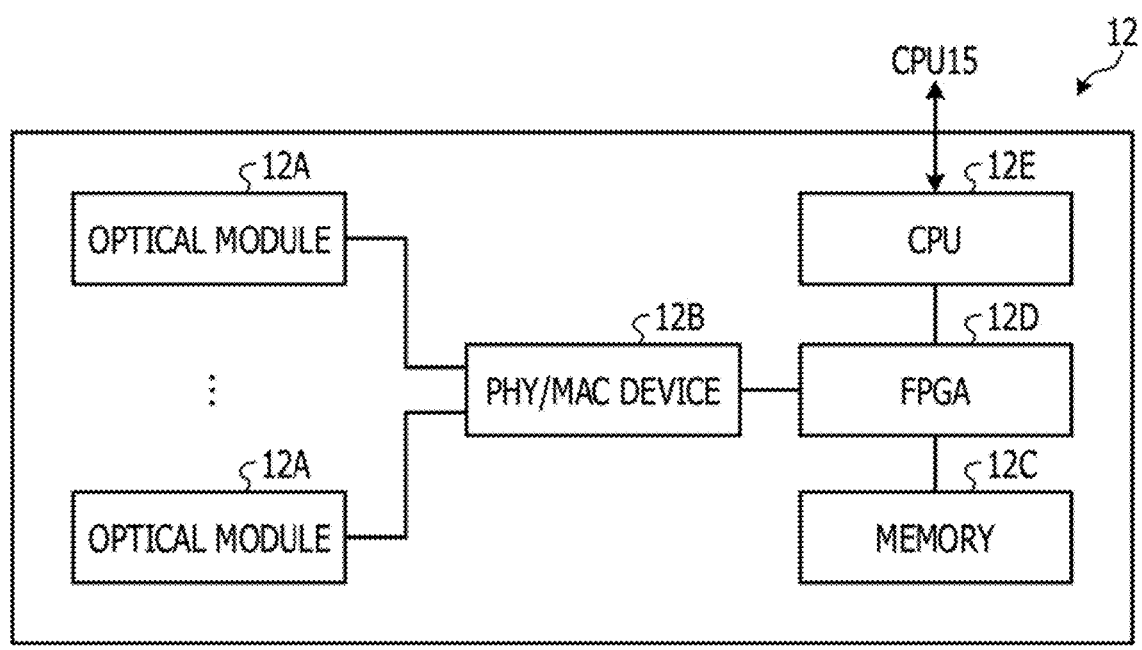
FIG. 3 is an explanatory diagram illustrating an example of a hardware configuration of a packet processor.

FIG. 3 is an explanatory diagram illustrating an example of a hardware configuration of the packet processor 12. The packet processor 12 illustrated in FIG. 3 includes a plurality of optical modules 12A, a PHY/MAC device 12B, a memory 12C, a field-programmable gate array (FPGA) 12D, and a CPU 12E. The optical module 12A is a module such as a small form-factor pluggable (SFP) to execute photo-electric conversion. The PHY/MAC device 12B is a device that executes packet processing of a PHY/MAC layer. The memory 12C is a storage area to accumulate packets, for example. The FPGA 12D is a circuit that executes various kinds of packet processing such as packet analysis and QoS control. The CPU 12E controls the entire packet processor 12. The packet processor 12 may include an application specific integrated circuit (ASIC) instead of the FPGA 12D.

Figure 4:
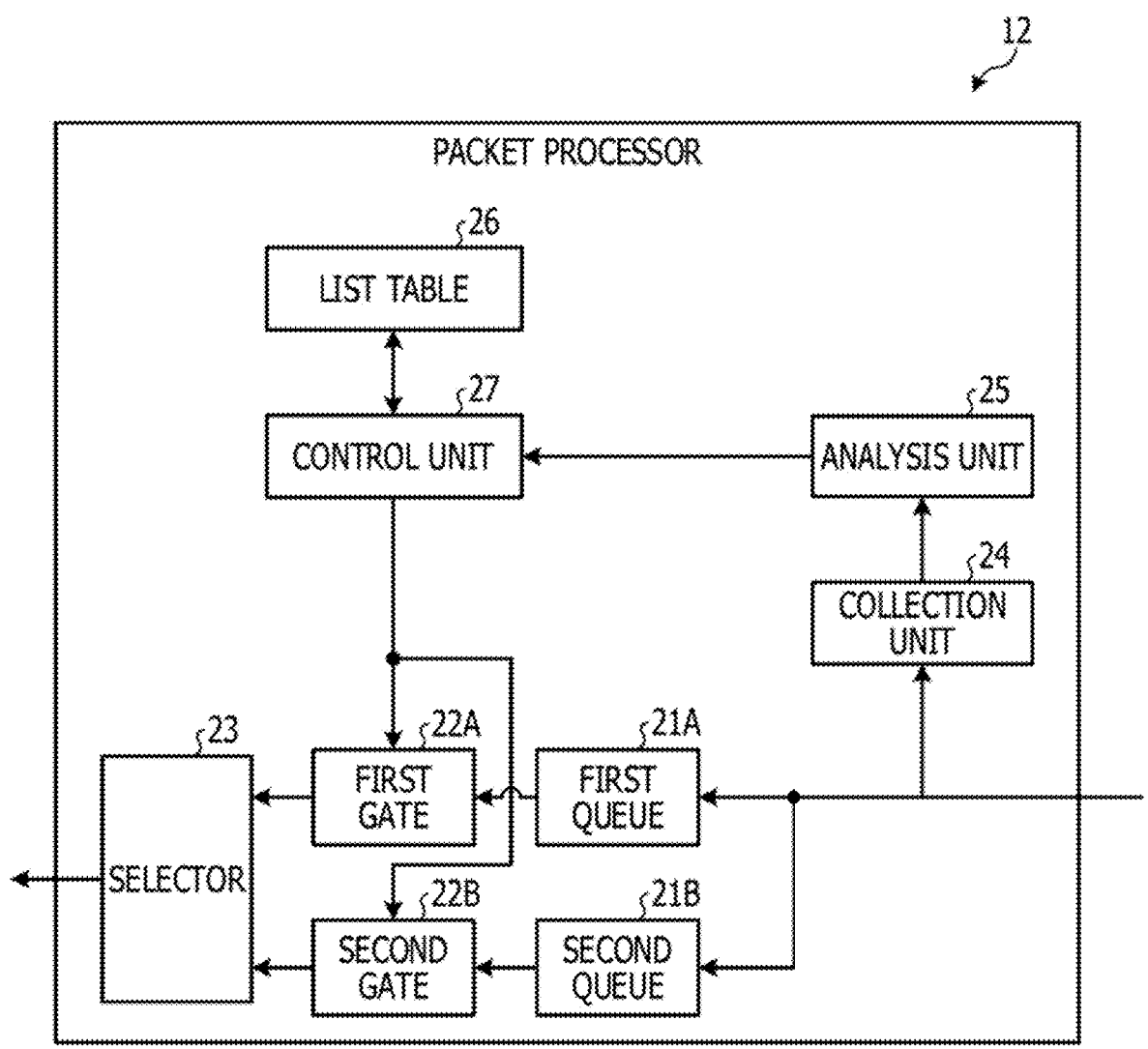
FIG. 4 is an explanatory diagram illustrating an example of a functional configuration of the packet processor.

FIG. 4 is an explanatory diagram illustrating an example of a functional configuration of the packet processor 12. The packet processor 12 illustrated in FIG. 4 includes a first queue 21A, a second queue 21B, a first gate 22A, a second gate 22B, a selector 23, a collection unit 24, an analysis unit 25, a list table 26, and a control unit 27. The first queue 21A is a storage unit for queuing MFH packets among incoming received packets. The first queue 21A identifies a P-bit of a virtual local area network (VLAN) tag in the received packet, and queues the MFH packet when the received packet is the MFH packet, based on the identification result. The second queue 216 is a storage unit for queuing non-MFH packets such as MBH packets, for example, among incoming received packets. The second queue 21B identifies a P-bit of a VLAN tag in the received packet, and queues the non-MFH packet when the received packet is the non-MFH packet, based on the identification result. The MFH packet is a high-priority packet, while the non-MFH packet is a low-priority packet. As a result, the MFH packet is preferentially outputted to avoid the competition against the non-MFH packet, thus enabling suppression of MFH packet output delay. It is assumed that the first queue 21A and the second queue 21B are included in the memory 12C, for example. The first gate 22A is an opening and closing unit to open and close the output of the MFH packets in the first queue 21A. The second gate 22B is an opening and closing unit to open and close the output of the non-MFH packets in the second queue 21B. The selector 23 selects the output from the first gate 22A or the second gate 22B. It is assumed that the first gate 22A, the second gate 22B, and the selector 23 are included in the PHY/MAC device 12B, for example.

The collection unit 24 collects statistical information on received packets. The statistical information is a count value such as an amount of packets received in each time slot. The amount of packets is, for example, the number of packets or the number of bytes. The analysis unit 25 analyzes the statistical information on the received packets to specify a periodicity of the received packets and a periodicity pattern such as a pattern. The analysis unit 25 determines a periodicity, that is, a burst period of the received packets before an operation starts, for example, and sets the determined burst period as a reference. The analysis unit 25 also learns an arrival interval (periodicity) and a pattern (average arrival amount and burst fluctuation level) of the received packets during the operation, and corrects the determined burst period based on a periodicity pattern obtained as a result of the learning. It is assumed that the collection unit 24 and the analysis unit 25 are included in the FPGA 12D, for example. For example, the burst has an indefinite burst width and the number of bursts in one burst period is indefinite.

The control unit 27 updates table contents of the list table 26 based on the analysis result of the analysis unit 25. The control unit 27 updates the time slot (TS) number in the list table 26 and the residence time for each TS number, based on the periodicity pattern of the received packets. The control unit 27 also updates the states of the first and second gates 22A and 22B set for each TS number in the list table 26, based on the periodicity pattern. The control unit 27 predicts the arrival timing of MFH packets as high-priority packets, based on the statistical information on the MFH packet among the received packets. The set states are open/closed information about the first and second gates 22A and 22B, for example, open and closed. Since the MFH packet is the high-priority packet and the non-MFH packet is the low-priority packet, the control unit 27 sets the first gate 22A in a normally open state and the second gate 22B in an open or closed state for each TS. The first gate 22A in the open state outputs the MFH packets held in the first queue 21A. The second gate 22B in the open state outputs the non-MFH packets held in the second queue 21B, and in the closed state, outputs the MFH packets held in the first queue 21A while stopping the output of the non-MFH packets held in the second queue 21B. It is assumed that the control unit 27 and the list table 26 are included in the CPU 12E, for example.

FIG. 5 is an explanatory diagram illustrating an example of a table configuration of the list table 26. In the list table 26 illustrated in FIG. 5, a TS number 26A, a set state 26B of the first gate 22A, a set state 26C of the second gate 22B, and a residence time 26D are managed in association with each other. The TS number 26A is the number for identifying the time slot (TS) of the received packet. The set state 26B of the first gate 22A is gate open/closed information indicating the open (O)/closed (C) state of the first gate 22A. The set state 26C of the second gate 22B is gate open/closed information indicating the open/closed state of the second gate 22B. The residence time 26D is time allocated to the TS number 26A. The TS number 26A may be accordingly changed from 1 to N. The set state 265 of the first gate 22A and the set state 26C of the second gate 22B may also be accordingly changed for each TS number 26A. The residence time 26D may also be accordingly changed for each TS number 26A. Referring to the list table 26, the control unit 27 sets the first and second gates 22A and 22B in the set states corresponding to the TS number "1" at the timing of the TS number "1". Next, the control unit 27 sets the first and second gates 22A and 22B in the set states corresponding to the TS number "2" at the timing of the TS number "2". Then, the control unit 27 sequentially sets the first and second gates 22A and 22B in the respective set states at each timing of the TS numbers "3" to "N". Thereafter, the control unit 27 returns to the TS number "1" after setting the set states corresponding to the TS number "N" to set the set states corresponding to the TS number "1", and then sequentially sets the set states at each timing of the TS numbers "2" to "N". In other words, referring to the list table 26, the control unit 27 sequentially sets the first and second gates 22A and 22B in the set states, in a periodically repeated manner, at each timing of the TS numbers "1" to "N". Focusing on the nature that bursty traffic occurs at sub-frame intervals of a radio section, the packet switch 7 identifies the MFH packet and the non-MFH packet, learns the arrival pattern (periodicity) of the MFH packet, and executes gate control based on the result of the learning.

The packet switch 7 adopts an autonomous TAS method to realize gate control by learning a periodicty pattern of autonomously arriving packets. The packet switch 7 determines a burst period of packets arriving before operating the autonomous TAS method, and starts operation processing to be performed in a TSN operation, based on the burst period. The operation processing is TSN processing for gate control of the output of arriving packets while updating the table contents of the list table 26, based on the statistical information on the arriving packets, as described above. Therefore, the packet switch 7 uses the burst period of the arriving packets to execute the operation processing, and thus has to quickly and accurately detect the burst period of the arriving packets before starting the operation processing. However, upon detection of the burst period of the MFH packets, for example, packets arrive in various minute fluctuation patterns depending on the location of the RRH 5, the network configuration, the number of the radio terminals 4, and an increase or decrease in communication traffic of the radio terminals 4, for example. Therefore, it is difficult to quickly and accurately detect the burst period of the MFH packets. A sampling target for determination of the burst period of the MFH packets is a discrete event such as a packet arrival process, rather than consecutive analog signals such as sound waves. Consequently, when the sampling granularity gets finer, not only the sampling operation but also load required for arithmetic processing is increased.

The processing of detecting the burst period of the arriving packets requires quickness in quickly detecting the burst period, accuracy in accurately detecting the burst period, and lightness in reducing the processing load upon detection of the burst period.

Figure 6:
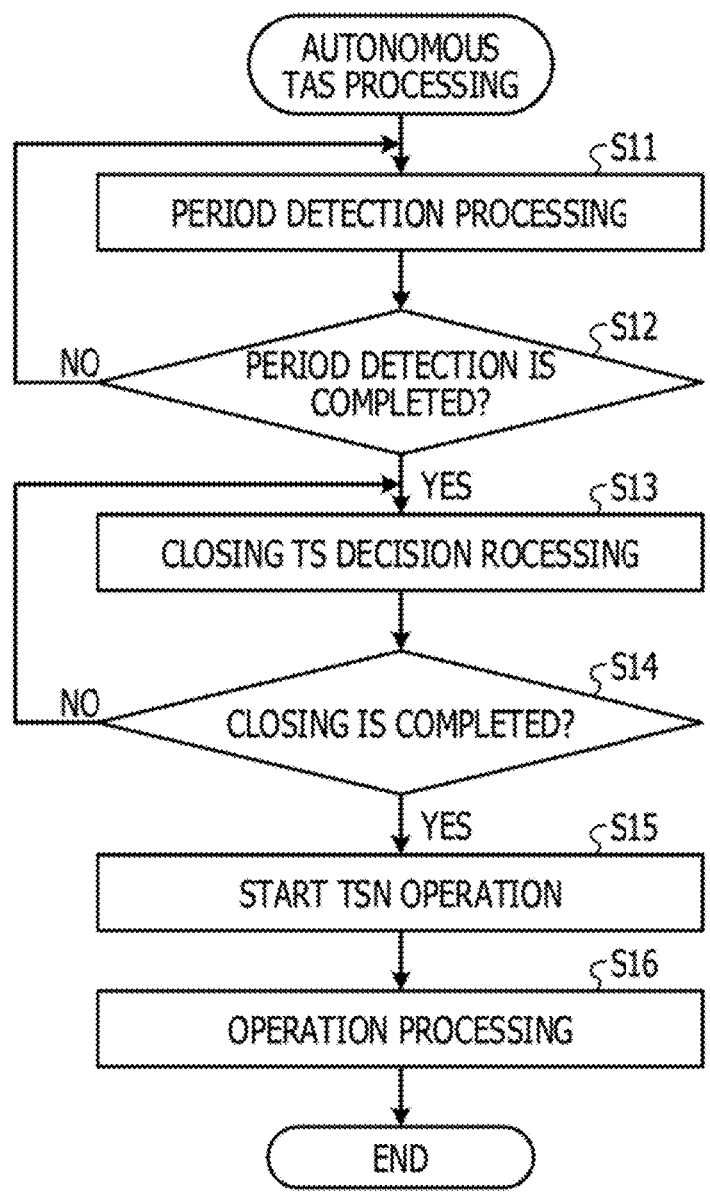
FIG. 6 is a flowchart illustrating an example of processing operations of the packet switch related to autonomous TAS processing.

FIG. 6 is a flowchart illustrating an example of processing operations of the packet switch 7 related to autonomous TAS processing. In FIG. 6, the analysis unit 25 in the packet switch 7 executes period detection processing (Step S11). The period detection processing is a learning period in a state where TSN is yet to be implemented. The analysis unit 25 determines whether or not period detection of deciding a burst period of arrival packets is completed (Step S12). The arrival packets are MFH packets or the like, for example. When the period detection is completed (Yes in Step S12), the control unit 27 executes closing TS decision processing (Step S13). The closing TS decision processing is also a learning period in a state where TSN is yet to be implemented. The control unit 27 determines whether or not the closing is completed (Step S14).

When the closing is completed (Yes in Step S14), the control unit 27 executes a TSN operation (Step S15). The control unit 27 executes operation processing (Step S16) and terminates the processing operations illustrated in FIG. 6. The operation processing is processing of executing the TSN operation.

In the autonomous TAS processing, the burst period of the MFH packets is decided by the period detection processing, and then the TSN operation is started to execute the operation processing based on the burst period. As a result, the packet switch 7 executes gate control of the packets based on the estimated burst period of the MFH packets, thus enabling suppression of MFH packet output delay.

Figure 7:
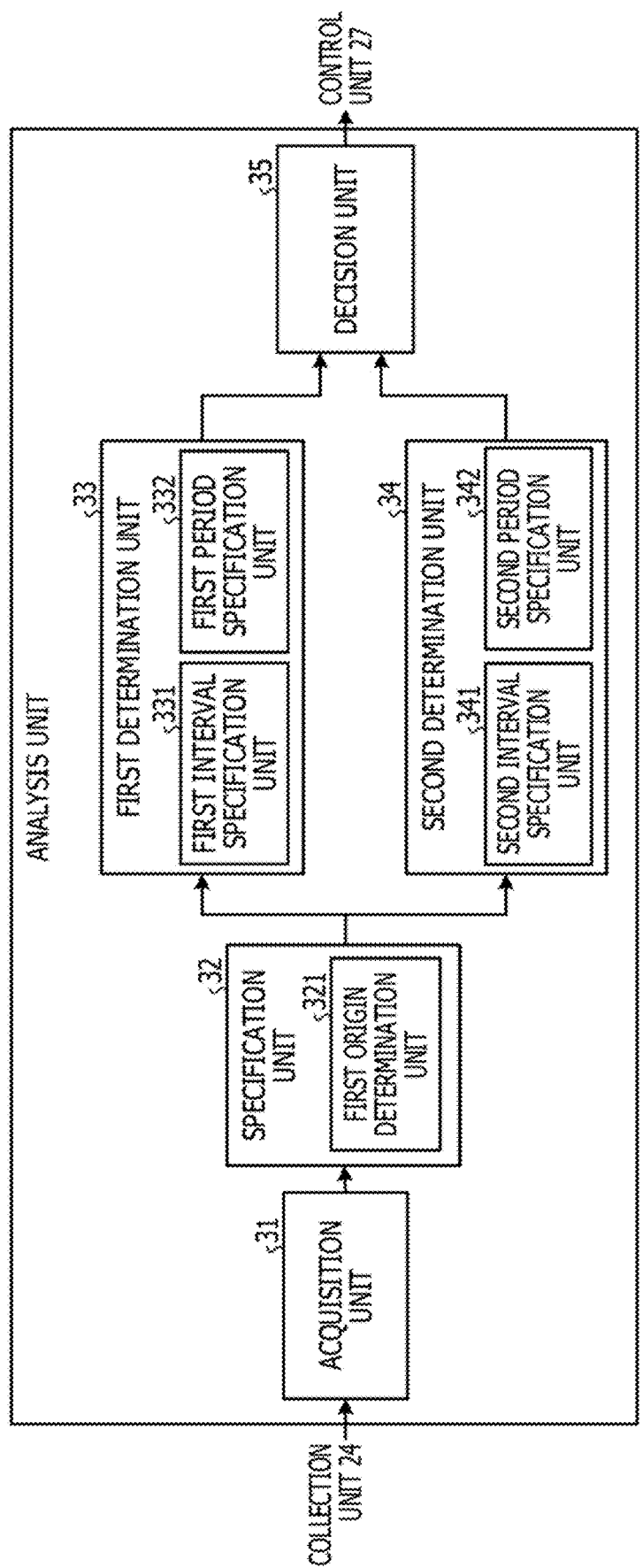
FIG. 7 is an explanatory diagram illustrating an example of a functional configuration of an analysis unit.

FIG. 7 is an explanatory diagram illustrating an example of a functional configuration of the analysis unit 25. The analysis unit 25 illustrated in FIG. 7 includes an acquisition unit 31, a specification unit 32, a first determination unit 33, a second determination unit 34, and a decision unit 35. The acquisition unit 31 samples statistical count values of the received packets collected by the collection unit 24 at each sampling interval. The acquisition unit 31 also acquires a time-series burst from the frame presence/absence information for each sampling time.

The specification unit 32 specifies the earliest head burst from the time-series burst as an origin burst. The specification unit 32 includes a first origin determination unit 321. After specifying the origin burst, the first origin determination unit 321 determines whether or not the interval between the origin burst and the burst immediately before the origin burst is one sample width. The first origin determination unit 321 shifts the origin burst by one burst until the interval is no longer one sample width. The shift means a shift to the next burst on the time axis, for example, a shift from the first burst to the second burst in the first one burst shift, and a shift from the second burst to the third burst in the second one burst shift. After specifying the origin burst, the first origin determination unit 321 determines whether or not the interval between the origin burst and the burst immediately after the origin burst is one sample width. The first origin determination unit 321 shifts the origin burst by one burst until the interval is no longer one sample width.

The first determination unit 33 specifies the interval between the front edges from the time-series burst and decides the period of the front edge based on the specified interval between the front edges. The first determination unit 33 includes a first interval specification unit 331 and a first period specification unit 332. The first interval specification unit 331 specifies the interval between the front edges where the intervals between the front edges are similar, while incrementing a burst interval. When the burst interval is incremented by +1, for example, from the first burst to the third burst, this means that the burst interval is extended from the first burst to the fourth burst, for example. The first period specification unit 332 specifies the period of the front edge from the average value of the front edge intervals that are continuously similar for the number of protection stages.

The second determination unit 34 specifies the interval between the rear edges from the time-series burst and decides the period of the rear edge based on the specified interval between the rear edges. The second determination unit 34 includes a second interval specification unit 341 and a second period specification unit 342. The second interval specification unit 341 specifies the interval between the rear edges where the intervals between the rear edges are similar, while incrementing a burst interval. The second period specification unit 342 specifies the period of the rear edge from the average value of the rear edge intervals that are continuously similar for the number of protection stages.

The decision unit 35 compares the period of the front edge specified by the first period specification unit 332 with the period of the rear edge specified by the second period specification unit 342, and decides the longer period as the burst period. The decision unit 35 also notifies the control unit 27 of the decided burst period.

Figure 8:
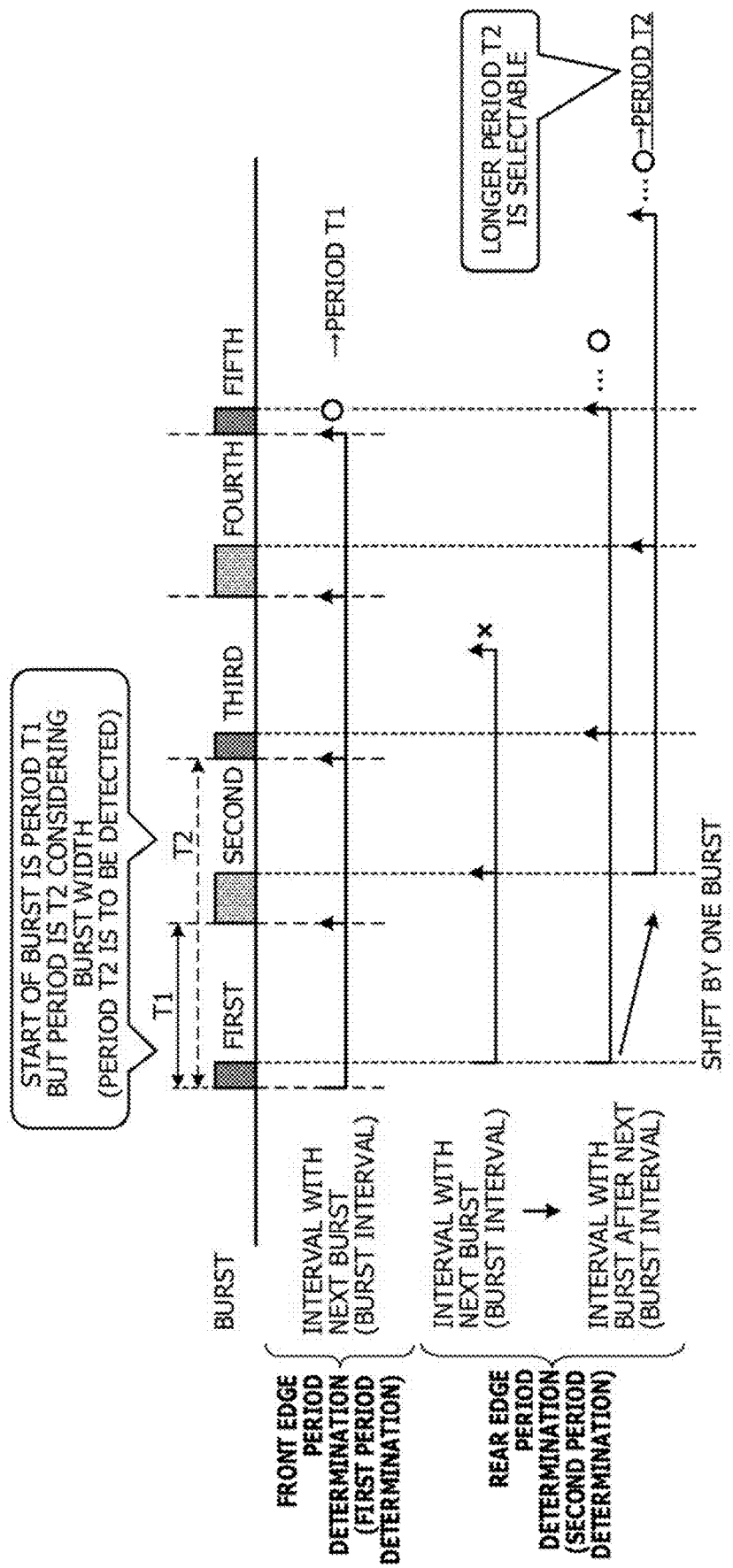
FIG. 8 is an explanatory diagram illustrating an example of a period determination operation for the interval between front edges and the interval between rear edges.

FIG. 8 is an explanatory diagram illustrating an example of a period determination operation for the interval between front edges and the interval between rear edges; For convenience of explanation, the time-series burst illustrated in FIG. 8 is a state where two types of bursts having different widths are mixed, for example, and it is assumed that there are five, first to fifth, bursts in total.

The first determination unit 33 specifies an arbitrary burst interval among a plurality of burst intervals. The burst interval is converted by the number of bursts present between adjacent bursts; when the burst interval N, there are N bursts between adjacent bursts. For example, when the burst interval N=1, adjacent bursts are next to each other. The first determination unit 33 specifies time-series bursts based on the burst interval (N=1). The first determination unit 33 sequentially calculates the interval between the front edges of adjacent bursts with the burst interval (N=1). That is, when the burst interval N=1, the first determination unit 33 sequentially calculates the interval between the front edges of the bursts next to each other. Then, the first determination unit 33 specifies the currently set burst interval when the intervals between the front edges of the bursts next to each other are similar for the number of protection stages. The number of protection stages is, for example, 10.

When having specified the burst interval, the first determination unit 33 shifts the origin burst by one burst, and sequentially calculates the interval between the front edges of the adjacent bursts from the shifted origin burst based on the specified burst interval. It is assumed that the shift for one burst is executed for all bursts in one period corresponding to the set burst interval (N=1). For convenience of explanation, the description is given of the case where the shift for one burst is executed for all bursts in one period corresponding to the set burst interval; however, such a shift may be accordingly changed, such as for any burst among the bursts in one period. When the intervals between the front edges of the bursts next to each other are similar continuously for the number of protection stages, the first determination unit 33 decides, for each origin burst after the shift, the average value of the front edge intervals determined to be similar continuously for the number of protection stages as the front edge period. In other words, the first determination unit 33 shifts the origin burst by the unit of burst even when the front edge interval corresponds to the burst period. When the front edge intervals are similar continuously for the number of protection stages for each origin burst after the shift, the first determination unit 33 decides the average value of the front edge intervals as the front edge period (T1).

The second determination unit 34 specifies an arbitrary burst interval among a plurality of burst intervals. The second determination unit 34 sequentially calculates the interval between the rear edges of adjacent bursts with the specified burst interval. In the example of FIG. 8, when the burst interval N=1, the second determination unit 34 calculates the interval between the rear edges of the bursts next to each other. In this event, when the burst interval N=1, the second determination unit 34 sequentially calculates the interval between the rear edges of the bursts next to each other. However, the second determination unit 34 increments the burst interval N by +1 and sets the burst interval N to 2 because the interval between the rear edges of the bursts next to each other is not continuously similar for the number of protection stages.

With the burst interval N=2, the second determination unit 34 sequentially calculates the interval between the rear edges of the bursts apart from each other by one burst. The second determination unit 34 specifies the currently set burst interval when the intervals between the rear edges of the bursts apart from each other by one burst are similar continuously for the number of protection stages. When having specified the burst interval, the second determination unit 34 shifts the origin burst by one burst, and sequentially calculates the interval between the rear edges of the adjacent bursts from the shifted origin burst based on the specified burst interval. It is assumed that the shift for one burst is executed for all bursts in one period corresponding to the set burst interval (N=1).

When the intervals between the rear edges of the bursts apart from each other by one burst are similar continuously for the number of protection stages, the second determination unit 34 decides, for each origin burst after the shift, the average value of the intervals between the rear edges of the bursts apart from each other by one burst as the rear edge period (12). In other words, the second determination unit 34 shifts the origin burst by the unit of burst even when the rear edge interval corresponds to the burst period. When the rear edge intervals are similar continuously for the number of protection stages, the second determination unit 34 decides, for each origin burst after the shift, the average value of the rear edge intervals as the rear edge period.

The decision unit 35 decides the longer period (T2) as the burst period between the front edge period (T1) obtained as a result of determination by the first determination unit 33 and the rear edge period (T2) obtained as a result of determination by the second determination unit 34.

In the example of FIG. 8, even when different burst widths are mixed, only the burst period T1 may be detected only by the front edge detection. However, by detecting not only the front edge but also the rear edge, the burst period T2 longer than the burst period T1 may be detected.

Figure 9:
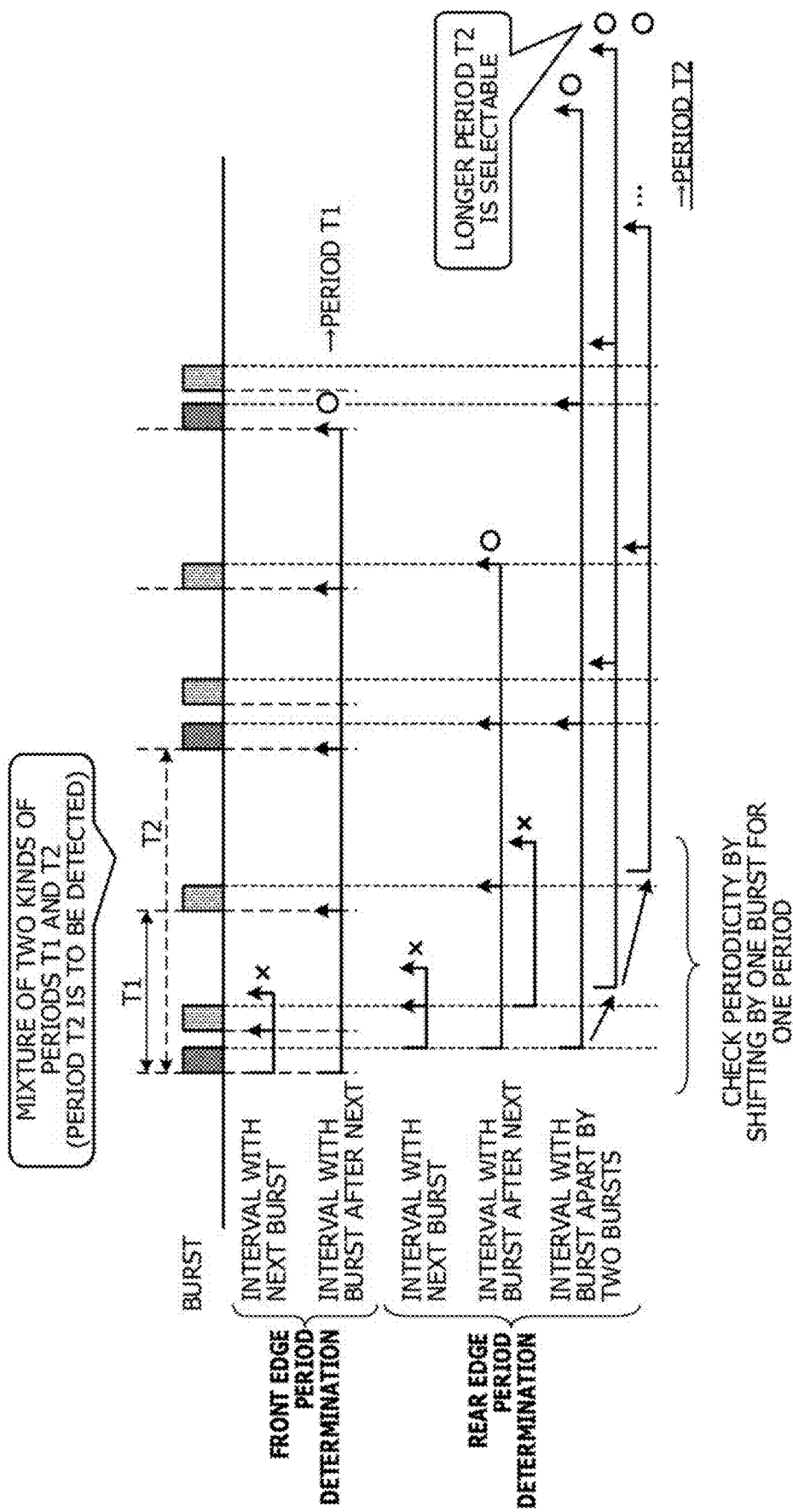
FIG. 9 is an explanatory diagram illustrating an example of a period determination operation for the interval between front edges and the interval between rear edges.

FIG. 9 is an explanatory diagram illustrating an example of a period determination operation for the interval between front edges and the interval between rear edges; For convenience of explanation, time-series bursts illustrated in FIG. 9 include bursts having the burst period T1 mixed with bursts having the burst period T2, assuming that there are eight, first to eighth, bursts in total.

When the burst interval N=1, the first determination unit 33 calculates the interval between the front edges of adjacent bursts with the burst interval N=1, but increments the burst interval by +1 since the intervals between the front edges of the bursts next to each other are not similar continuously for the number of protection stages. The first determination unit 33 sets the burst interval N=2 and sequentially calculates the interval between the front edges of adjacent bursts with the burst interval N=2. The first determination unit 33 specifies the currently set burst interval N=2 when the intervals between the front edges of the bursts apart from each other by one burst are similar continuously for the number of protection stages.

When having specified the burst interval, the first determination unit 33 shifts the origin burst by one burst, and sequentially calculates the interval between the front edges of the adjacent bursts from the shifted origin burst based on the specified burst interval. When the intervals of the front edges of the bursts apart from each other by one burst are similar continuously for the number of protection stages for each origin burst after the shift, the first determination unit 33 decides the average value of the front edge intervals of the bursts apart from each other by one burst as the front edge period (T1).

When the burst interval N=1, the second determination unit 34 also calculates the interval between the rear edges of adjacent bursts with the burst interval N=1, but increments the burst interval by +1 since the intervals between the rear edges of the bursts next to each other are not similar continuously for the number of protection stages. The second determination unit 34 sets the burst interval N=2 and sequentially calculates the interval between the rear edges of adjacent bursts with the burst interval N=2. Even though the intervals between the rear edges of the bursts apart from each other by one burst are similar continuously for the number of protection stages, the second determination unit 34 shifts the origin burst by one burst and sequentially calculates the interval between the rear edges of the bursts apart from each other by one burst from the shifted origin burst. The second determination unit 34 sequentially calculates the interval between the rear edges of the bursts apart from each other by one burst from shifted origin burst, and increments the burst interval by +1 since the intervals between the rear edges of the bursts apart from each other by one burst are not similar continuously for the number of protection stages.

The second determination unit 34 sets the burst interval N=3 and sequentially calculates the interval between the rear edges of adjacent bursts with the burst interval N=3. When the intervals between the rear edges of the bursts apart from each other by two bursts are similar continuously for the number of protection stages, the second determination unit 34 shifts the origin burst by one burst and sequentially calculates the interval between the rear edges of the bursts apart from each other by two bursts from the shifted origin burst. When the intervals between the rear edges of the bursts apart from each other by two bursts are similar continuously for the number of protection stages, the second determination unit 34 decides the average value of the intervals between the rear edges of the bursts apart from each other by two bursts as the rear edge period (T2).

The decision unit 35 decides the longer period (T2) as the burst period between the front edge period (T1) obtained as a result of decision by the first determination unit 33 and the rear edge period (T2) obtained as a result of decision by the second determination unit 34.

Even when the front edge interval corresponds to the burst period, the first determination unit 33 shifts the origin burst by the unit of burst within the range of one burst period, and determines whether or not the intervals between the front edges are similar continuously for the number of protection stages, for each origin burst after the shift. When the front edge intervals are similar continuously for the number of protection stages, the first determination unit 33 decides the average value of the front edge intervals as the front edge period. As a result, the front edge period may be decided even when a plurality of burst periods are mixed.

Even when the rear edge interval corresponds to the burst period, the second determination unit 34 shifts the origin burst by the unit of burst within the range of one burst period, and determines whether or not the intervals between the rear edges are similar continuously for the number of protection stages, for each origin burst after the shift. When the rear edge intervals are similar continuously for the number of protection stages, the second determination unit 34 decides the average value of the rear edge intervals as the rear edge period. As a result, the rear edge period may be decided even when a plurality of burst periods are mixed.

Figure 10:
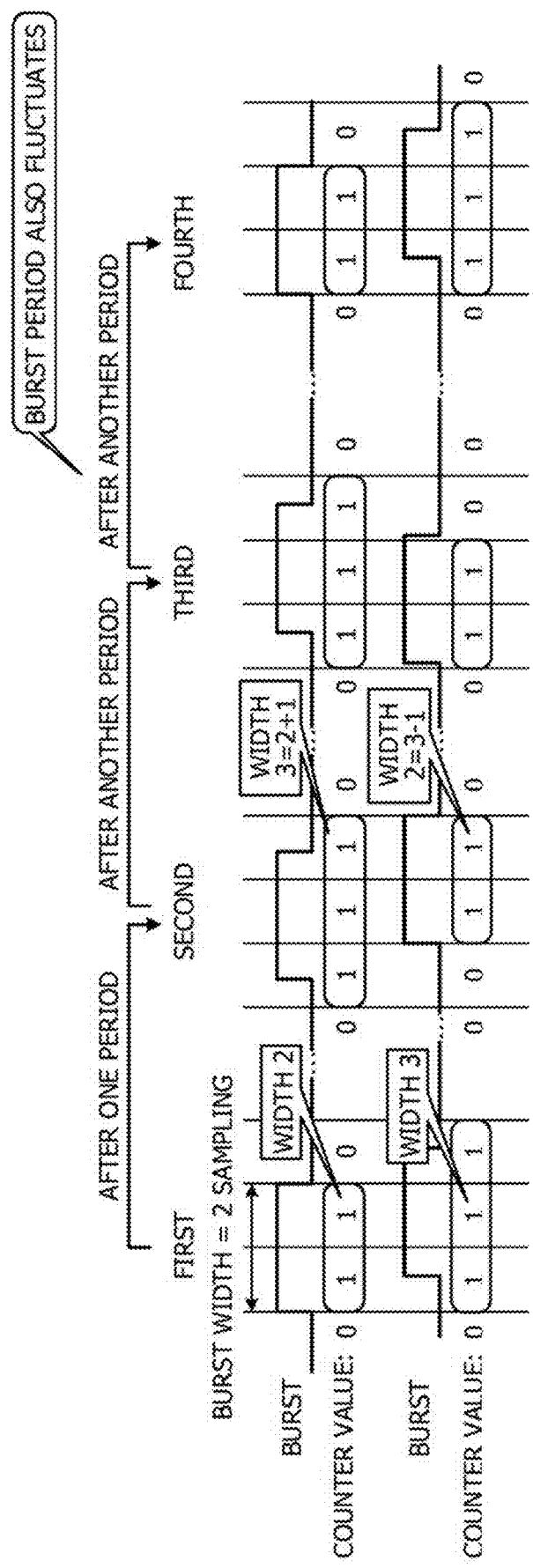
FIG. 10 is an explanatory diagram illustrating an example of occurrence of burst period fluctuations due to sampling errors.

FIG. 10 is an explanatory diagram illustrating an example of occurrence of burst period fluctuations due to sampling errors; For convenience of explanation, a burst width of bursts is two samples, for example. In the upper part of FIG. 10, since the first and fourth bursts match the sample phase, for example, the first and fourth bursts have a width of two samples. On the other hand, since the second and third bursts do not match the sample phase, the second and third bursts have a width of three samples. That is, the sampling width is not fixed due to sampling errors, and therefore, fluctuations occur in the burst, interval and burst period.

In the lower part of FIG. 10, since the first and fourth bursts do not match the sample phase, for example, the first and fourth bursts have a width of three samples. On the other hand, since the second and third bursts match the sample phase, the second and third bursts have a width of two samples. That is, the burst width is not fixed due to sampling errors, and therefore, fluctuations occur in the burst interval and burst period.

For example, when the burst width is two samples, the sample width of the second and subsequent bursts may be three samples or may be two samples even if the sample width of the first burst is two samples. Therefore, the burst period and the burst interval also fluctuate by −1 or +1 due to the sampling error. However, this sampling error is equivalent to one sample width, and the assumption that the burst has a periodicity leads to a characteristic that the fluctuation is only in one direction. Focusing on the time-series bursts in the upper part of FIG. 10, for example, when the sample width of the first burst is two samples, the sample width of the second and subsequent bursts is increased by +1 to be three samples and not reduced by −1 to be one sample. Similarly, focusing on the time-series bursts in the lower part of FIG. 10, for example, when the sample width of the first burst is three samples, the sample width of the second and subsequent bursts is reduced by −1 to be two samples and not increased by +1 to be four samples.

Figure 11:
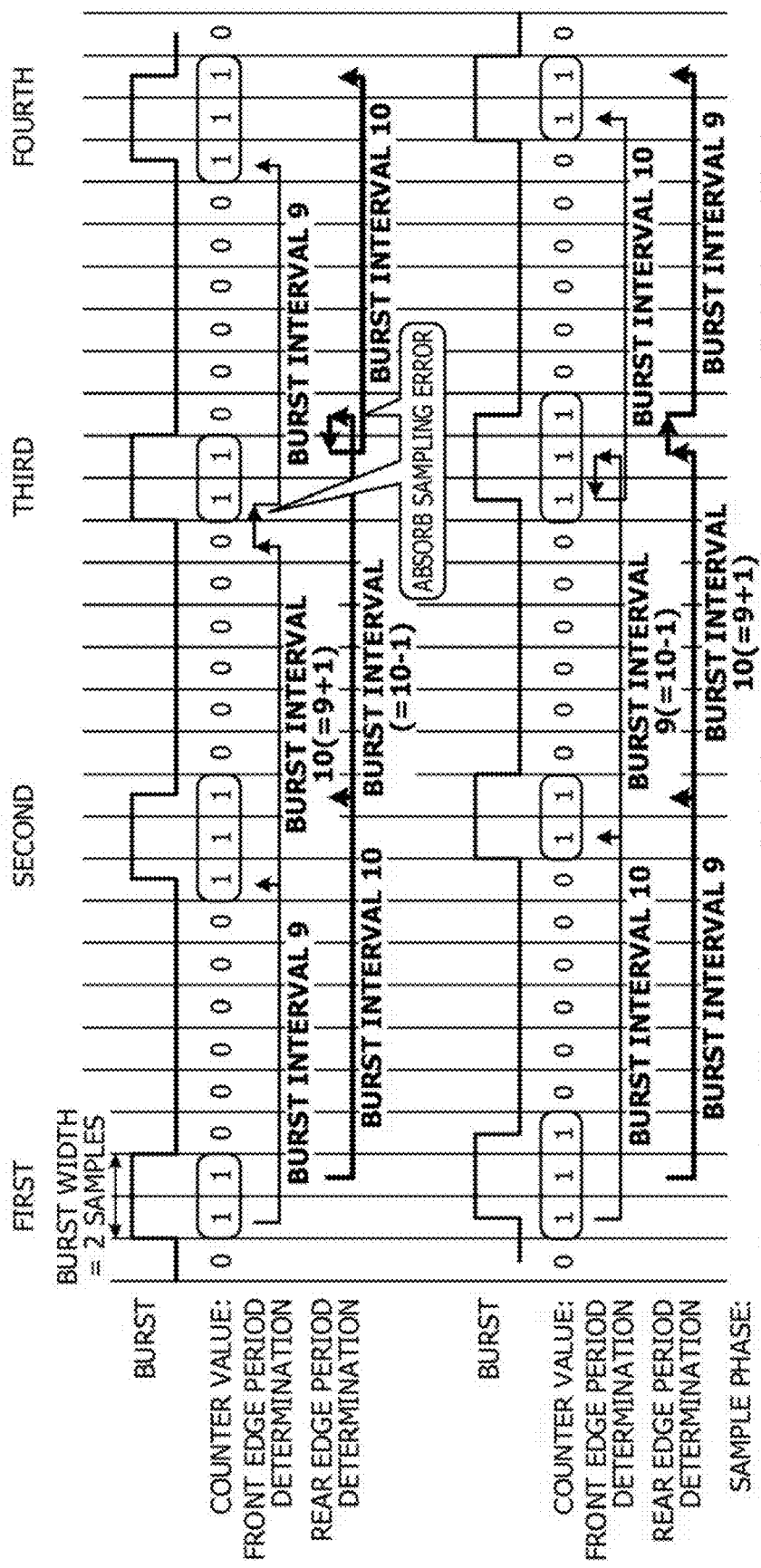
FIG. 11 is an explanatory diagram illustrating an example of an operation related to absorption of sampling errors in a burst period.

FIG. 11 is an explanatory diagram illustrating an example of an operation related to absorption of sampling errors in a burst period; For convenience of explanation, the burst interval N is set to "1" in terms of the number of bursts. In the time-series bursts illustrated in the upper part of FIG. 11, the sample width of the first burst is two samples, the sample width of the second burst is three samples, the sample width of the third burst is two samples, and the sample width of the fourth burst is three samples.

The first determination unit 33 calculates the interval between the front edge of the first burst and the front edge of the second burst to be "9" samples, and the interval between the front edge of the second burst and the front edge of the third burst to be "10" samples. The first determination unit 33 also calculates the interval between the front edge of the third burst and the front edge of the fourth burst to be "9" samples. As for the interval between the front edges, "9" samples is set as a reference. Even when the interval between the front edge of the second burst and the front edge of the third burst is "10" samples, the first determination unit 33 determines that the intervals between the front edges as the reference are similar with an error of "9" samples "+1", thus making it possible to absorb sampling errors.

On the other hand, the second determination unit 34 calculates the interval between the rear edge of the first burst and the rear edge of the second burst to be "10" samples, and the interval between the rear edge of the second burst and the rear edge of the third burst to be "9" samples. The second determination unit 34 also calculates the interval between the rear edge of the third burst and the rear edge of the fourth burst to be "10" samples. As for the interval between the rear edges, "10" samples is set as a reference. Even when the interval between the rear edge of the second burst and the rear edge of the third burst is "9" samples, the second determination unit 34 determines that the intervals between the rear edges as the reference are similar with an error of "10" samples "−1", thus making it possible to absorb sampling errors.

In the time-series bursts illustrated in the lower part of FIG. 11, the sample width of the first burst is three samples, the sample width of the second burst is two samples, the sample width of the third burst is three samples, and the sample width of the fourth burst is three samples.

The first determination unit 33 calculates the interval between the front edge of the first burst and the front edge of the second burst to be "10" samples, and the interval between the front edge of the second burst and the front edge of the third burst to be "9" samples. The first determination unit 33 also calculates the interval between the front edge of the third burst and the front edge of the fourth burst to be "10" samples. As for the interval between the front edges, "10" samples is set as a reference. Even when the interval between the front edge of the second burst and the front edge of the third burst is "9" samples, the first determination unit 33 determines that the intervals between the front edges as the reference are similar with an error of "10" samples "−1", thus making it possible to absorb sampling errors.

On the other hand, the second determination unit 34 calculates the interval between the rear edge of the first burst and the rear edge of the second burst to be "9" samples, and the interval between the rear edge of the second burst and the rear edge of the third burst to be "10" samples. The second determination unit 34 also calculates the interval between the rear edge of the third burst and the rear edge of the fourth burst to be "9" samples. As for the interval between the rear edges, "9" samples is set as a reference. Even when the interval between the rear edge of the second burst and the rear edge of the third burst is "10" samples, the second determination unit 34 determines that the intervals between the rear edges as the reference are similar with an error of "9" samples "+1", thus making it possible to absorb sampling errors.

When having determined, even once, whether or not the intervals between the front edges are similar with an error of "+1" in the number of protection stages, for example, the first determination unit 33 determines whether or not the intervals are similar with an error of "+1 or 0" in the number of protection stages. When having determined, even once, whether or not the intervals between the front edges are similar with an error of "−1" in the number of protection stages, for example, the first determination unit 33 determines whether or not the intervals are similar with an error of "−1 or 0" in the number of protection stages. When having determined, even once, whether or not the intervals between the rear edges are similar with an error of "+1" in the number of protection stages, for example, the second determination unit 34 determines whether or not the intervals are similar with an error of "+1 or 0" in the number of protection stages. When having determined, even once, whether or not the intervals between the rear edges are similar with an error of "−1" in the number of protection stages, for example, the second determination unit 34 determines whether or not the intervals are similar with an error of "−1 or 0" in the number of protection stages.

Figure 12:
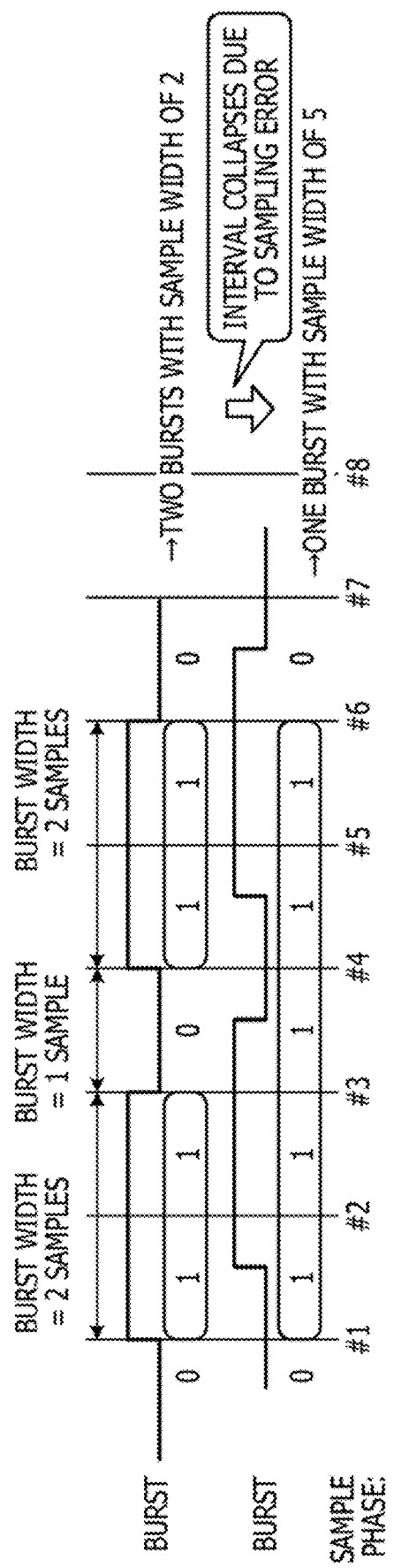
FIG. 12 is an explanatory diagram illustrating an example of occurrence of burst interval collapse.

FIG. 12 is n explanatory diagram illustrating an example of occurrence of burst interval collapse; For convenience of explanation, it is assumed that time-series bursts include, for example, an interval of one sample between a first burst having a 2-sample width and a second burst having a 2-sample width.

In the time-series bursts illustrated in the upper part of FIG. 12, when the sample phases of the first and second bursts match, for example, the bursts may be recognized as two bursts having a sample width of two samples. On the other hand, in the time-series bursts illustrated in the lower part of FIG. 12, when the sample phases of the first and second bursts do not match, the interval between the first and second bursts collapses, leading to the possibility of the bursts being recognized as one burst having a sample width of five samples. That is, when the burst interval N=1 and the interval between adjacent bursts is one sample width, the interval may be collapsed due to the sampling error caused by the relationship between the burst interval and the sample phase.

Figure 13:
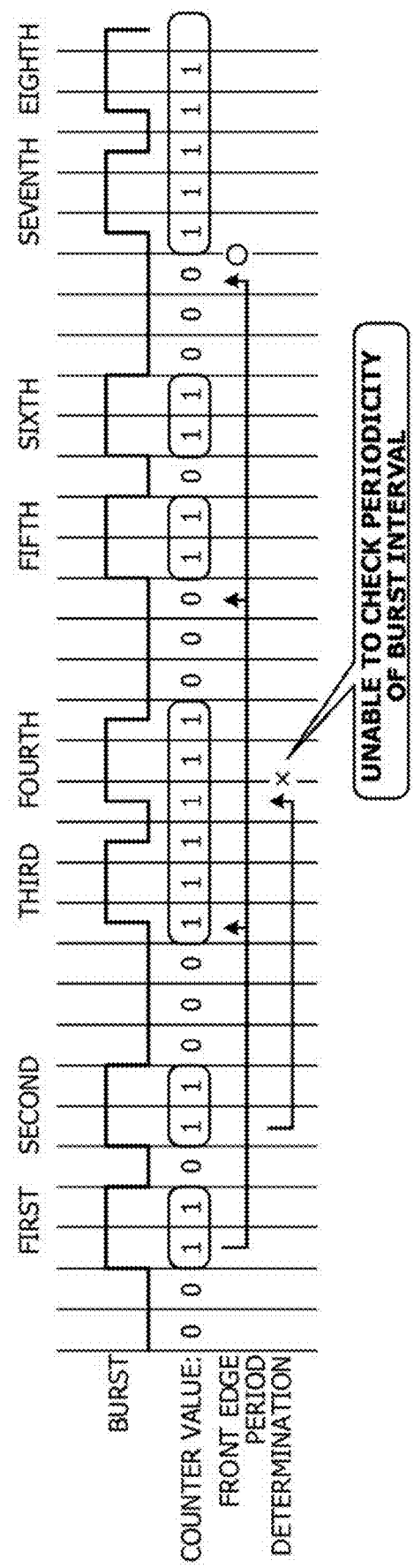
FIG. 13 is an explanatory diagram illustrating an example of operations related to suppression of burst interval collapse.

FIG. 13 is an explanatory diagram illustrating an example of operations related to suppression of burst interval collapse; For convenience of explanation, there are eight, first to eighth, bursts in total having a sample width of two samples. The interval between the first and second bursts, the interval between the third and fourth bursts, the interval between the fifth and sixth bursts, and the interval between the seventh and eighth bursts are each one sample width. The first, second, fifth, and sixth bursts match the sample phase, and thus may be recognized as four bursts having a sample width of two samples. On the other hand, the third and fourth bursts as well as the seventh and eighth bursts do not match the sample phase, and thus are recognized as two bursts having a sample width of five samples.

For example, the first determination unit 33 sets the burst interval N=2, and sets the second burst as the origin burst, wherein the interval between the origin burst (second burst) and the burst (first burst) immediately before the origin burst is one sample width. When the second burst is set as the origin burst, the first determination unit 33 may not specify the front edge of the fourth burst, and therefore, may not specify the interval between the front edge of the origin burst and the front edge of the fourth burst. That is, the first determination unit 33 may not specify the periodicity of the front edge when the interval between the origin burst and the burst immediately before the origin burst is one sample width.

On the other hand, the first determination unit 33 sets the burst interval N=2, and sets the first burst as the origin burst, wherein the interval between the burst immediately before the origin burst (first burst) and the origin burst is two samples or more. The first determination unit 33 may specify the front edge of the third burst, and thus may specify the interval between the front edge of the first burst and the front edge of the third burst. The first determination unit 33 may sequentially calculate the interval between the front edges of the third and fifth bursts and the interval between the front edges of the fifth and seventh bursts. Therefore, the first determination unit 33 may specify the periodicity of the front edges when the interval between the origin burst and the burst immediately before the origin burst is two samples or more.

For convenience of explanation, the description is given of the case where the first determination unit 33 uses the origin burst wherein the interval between the origin burst and the burst immediately before the origin burst is two samples or more. However, when the interval between the origin burst and the burst immediately after the origin burst is one sample, the second determination unit 34 does not use the burst as the origin burst. When the interval between the origin burst and the burst immediately after the origin burst is two samples or more, the second determination unit 34 uses the burst as the origin burst.

Figure 14:
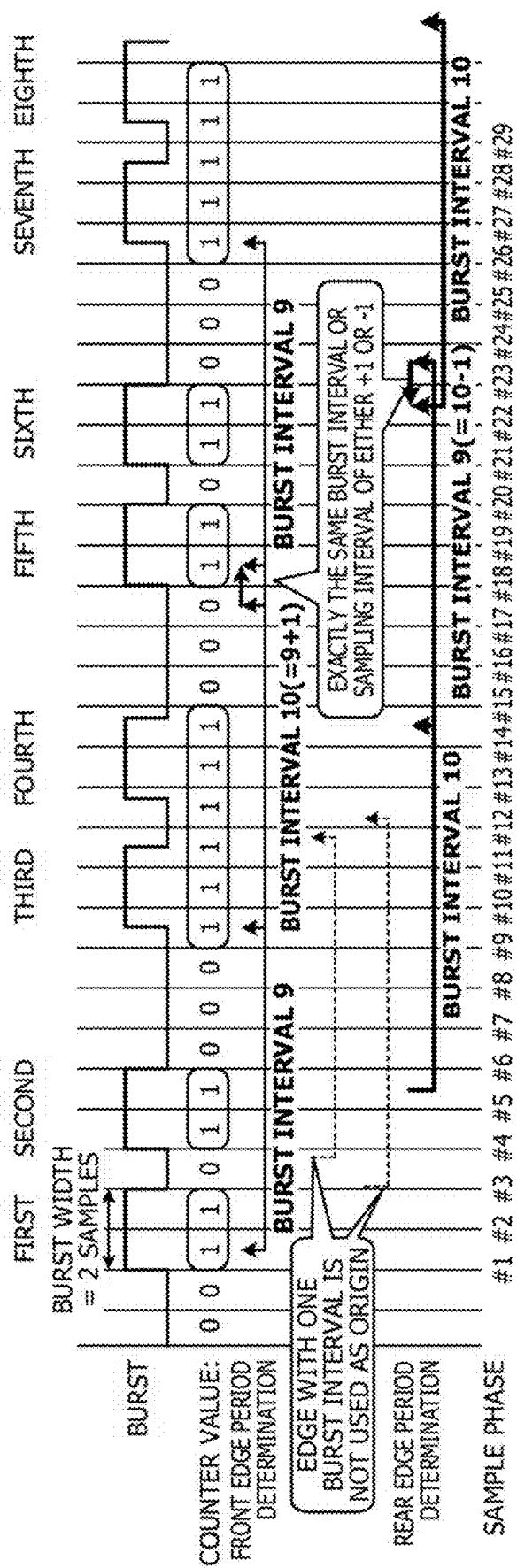
FIG. 14 is an explanatory diagram illustrating an example of operations related to period detection processing.

FIG. 14 is an explanatory diagram illustrating an example of operations related to period detection processing; For convenience of explanation, it is assumed that time-series bursts illustrated in FIG. 14 include the time-series eight, first to eighth, bursts in total described with reference to FIG. 13. When the first burst is adopted as the origin burst wherein the interval between the origin burst and the burst immediately before the origin burst is two samples or more, the first determination unit 33 uses the first burst as the origin burst. The first determination unit 33 do not use the bursts, for example, the second, fourth, sixth, and eighth bursts as the origin burst, wherein the interval between the origin burst and the burst immediately before the origin burst is one sample. After specifying the first burst as the origin burst, the first determination unit 33 calculates the interval between the front edges of the first and third bursts to be "9" samples. The first determination unit 33 also sequentially calculates the interval between the front edges of the third and fifth bursts to be "10" samples, and the interval between the front edges of the fifth and seventh bursts to be "9" samples.

When the second burst is adopted as the origin burst wherein the interval between the origin burst and the burst immediately after the origin burst is two samples or more, the second determination unit 34 adopts the second burst as the origin burst. The second determination unit 34 do not adopt the bursts, for example, the first, third, fifth, and seventh bursts as the origin burst, wherein the interval between the origin burst and the burst immediately after the origin burst is one sample. After specifying the second burst as the origin burst, the second determination unit 34 calculates the interval between the rear edges of the second and fourth bursts to be "10" samples. The second determination unit 34 also sequentially calculates the interval between the rear edges of the fourth and sixth bursts to be "9" samples, and the interval between the rear edges of the sixth and eighth bursts to be "10" samples.

FIG. 15 is a flowchart illustrating an example of processing operations of the analysis unit 25 related to period detection processing. In FIG. 15, the acquisition unit 31 in the analysis unit 25 samples count values of the received packets at a predetermined sampling interval (Step S21). The acquisition unit 31 also acquires a time-series burst from the frame presence/absence information obtained as a result of sampling for each predetermined sampling interval (Step S22). The specification unit 32 in the analysis unit 25 specifies the earliest burst from the time-series burst as an origin burst (Step S23).

After the origin burst is specified, the first determination unit 33 executes front edge determination processing of deciding a front edge period from the interval between the front edges of adjacent bursts at a specified burst interval based on the origin burst in the time-series burst (Step S24). In the example of FIG. 14, the first determination unit 33 calculates, for example, the interval (9 samples) between the front edges of the first and third bursts and the interval (10 samples) between the front edges of the third and fifth bursts. The first determination unit 33 also sequentially calculates the interval (9 samples) between the front edges of the fifth and seventh bursts, and the like.

After the origin burst is specified, the second determination unit 34 executes rear edge determination processing of deciding a rear edge period from the interval between the rear edges of adjacent bursts at a specified burst interval based on the origin burst in the time-series burst (Step S25). In the example of FIG. 14, the second determination unit 34 calculates, for example, the interval (10 samples) between the rear edges of the second and fourth bursts and the interval (9 samples) between the rear edges of the fourth and sixth bursts. The second determination unit 34 also sequentially calculates the interval (10 samples) between the rear edges of the sixth and eighth bursts, and the like.

The decision unit 35 in the analysis unit 25 compares the front edge period decide in Step S24 with the rear edge period decide in Step S25 to decide the longer period as the burst period (Step S26), and then the processing operations illustrated in FIG. 15 are terminated.

The analysis unit 25 that performs the period detection processing illustrated in FIG. 15 decides the front edge period and the rear edge period from the time-series burst, and decides the longer period between the front edge period and the rear edge period as the burst period. As a result, erroneous detection of the burst period may be reduced even when plurality of periods are mixed.

Figure 16A:
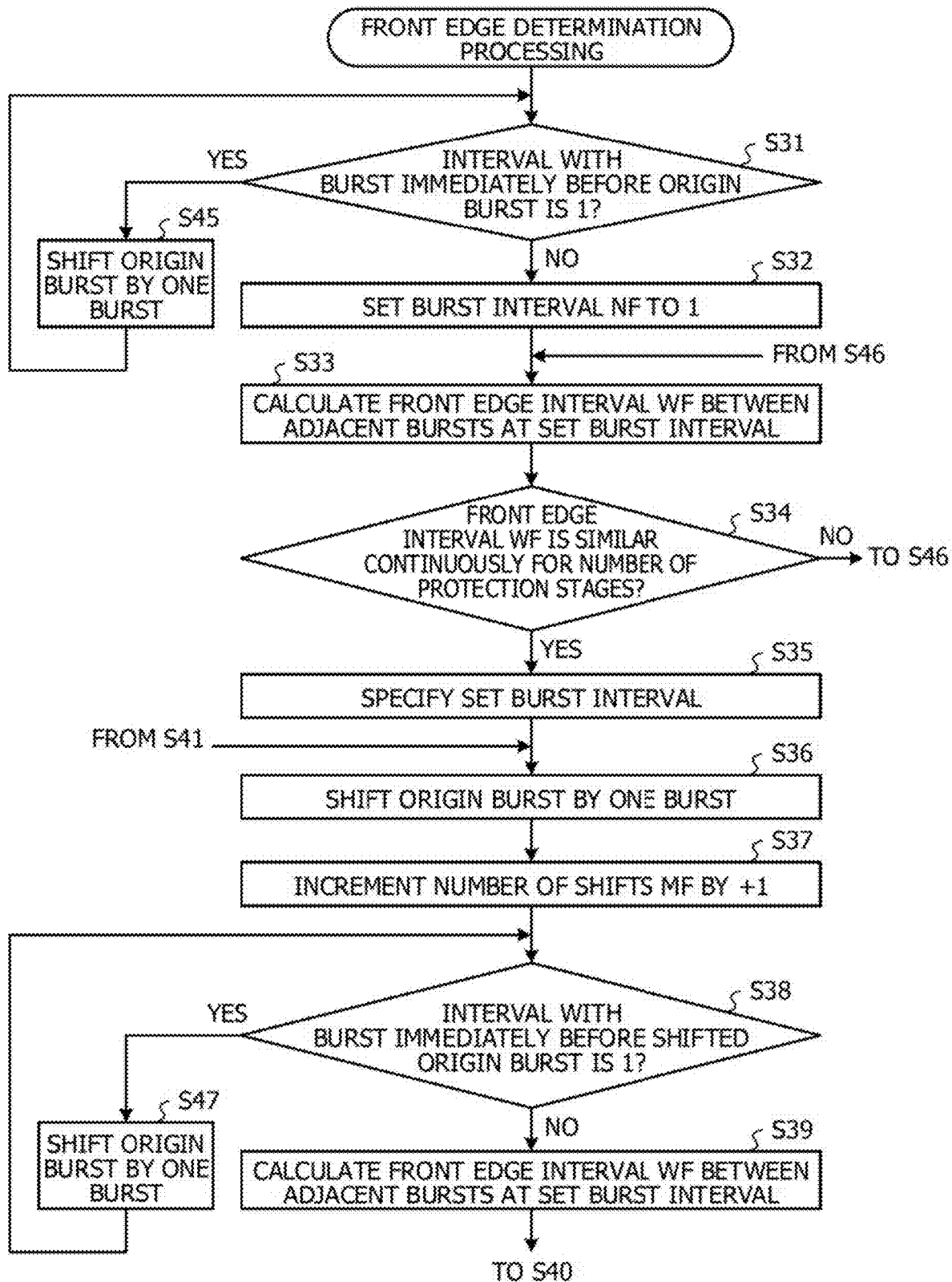
FIGS. 16A and 16B are flowcharts illustrating an example of processing operations of the analysis unit related to front edge determination processing.
Figure 16B:
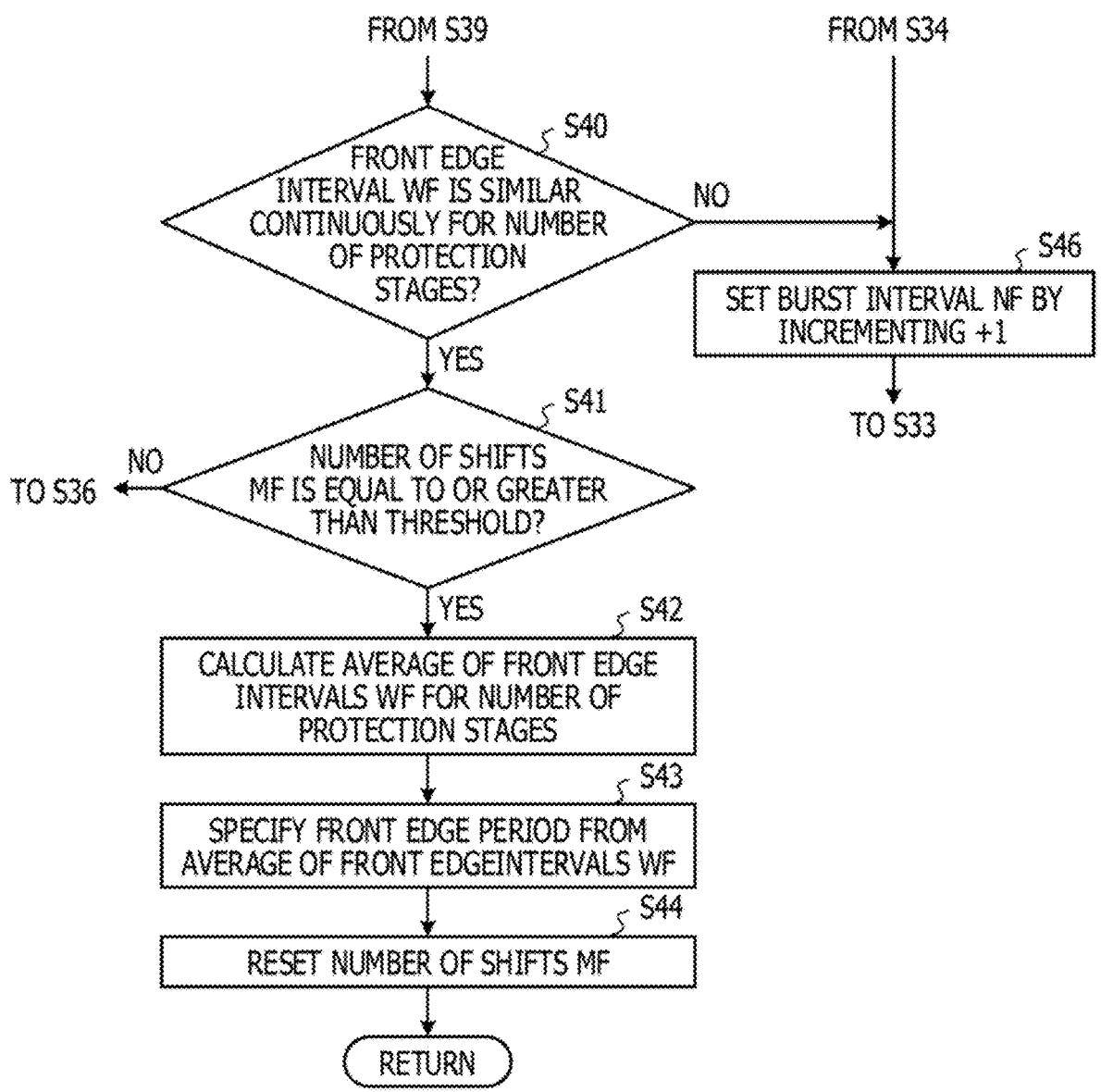

FIGS. 16A and 16B are flowcharts illustrating an example of processing operations of the analysis unit 25 related to front edge determination processing. In FIG. 16A, the first origin determination unit 321 in the specification unit 32 determines whether or not the interval between the origin burst and the burst immediately before the origin burst is one sample (Step S31). The immediately preceding burst is the burst immediately before the origin burst. When the origin burst is the second burst, for example, the immediately preceding burst may be said to be the first burst. The first interval specification unit 331 in the first determination unit 33 sets the burst interval NF to "1" when the interval is not one sample (No in Step S31), that is, when the interval is two samples or more (Step S32).

The first interval specification unit 331 sequentially calculates the interval WF between the front edges of adjacent bursts with the set burst interval NF (Step S33). The first interval specification unit 331 determines whether or not the sequentially calculated front edge intervals WF are similar continuously for the number of protection stages (Step S34). It is assumed that the number of protection stages is, for example, 10.

When the front edge intervals WF are continuously similar for the number of protection stages (Yes in Step S34), the first interval specification unit 331 specifies the set burst interval NF (Step S35). The first interval specification unit 331 shifts the origin burst by one burst while maintaining the specified burst interval NF (Step S36). The shift for one burst is, for example, a shift of the origin burst from the first burst to the second burst when the origin burst is the first burst. The first interval specification unit 331 increments the number of shifts MF by +1 (Step S37). The number of shifts MF may also be accordingly set.

The first origin determination unit 321 determines whether or not the interval between the origin burst after the shift and the burst immediately before the origin burst is one sample (Step S38). When the interval is not one sample (No in Step S38), the first interval specification unit 331 determines that the interval is two samples or more, and sequentially calculates the interval WF between the front edges of adjacent bursts with the set burst interval NF (Step S39). The first interval specification unit 331 determines whether or not the sequentially calculated front edge intervals WF are similar continuously for the number of protection stages (Step S40).

When the front edge intervals WF are continuously similar for the number of protection stages (Yes in Step S40), the first interval specification unit 331 determines whether or not the number of shifts MF is equal to or larger than a threshold (Step S41). When the number of shifts MF is equal to or larger than the threshold (Yes in Step S41), the first period specification unit 332 calculates an average value of the front edge intervals WF for the number of protection stages (Step S42).

After calculating the average value of the front edge intervals WF for the number of protection stages, the first period specification unit 332 decides the average value of the front edge intervals as the front edge period (Step S43), and then the processing operations illustrated in FIG. 16B are terminated. When the interval between the origin burst and the immediately preceding burst is one sample (Yes in Step S31), the first origin determination unit 321 shifts the origin burst by one burst (Step S45). After shifting the origin burst by one burst, the first origin determination unit 321 proceeds to Step S31 to determine whether or not the interval is one sample.

When the front edge intervals WF are not continuously similar for the number of protection stages (No in Step S34), the first interval specification unit 331 increments the set burst interval NF by +1 (Step S46). Incrementing the burst interval NF by +1 extends the burst interval by one burst. The first interval specification unit 331 proceeds to Step S33 to sequentially calculate the interval WF between the front edges of adjacent bursts with the burst interval NF incremented by +1.

When the interval between the shifted origin burst and the immediately preceding burst is one sample (Yes in Step S38), the first origin determination unit 321 shifts the shifted origin burst by one burst (Step S47). After shifting the origin burst by one burst, the first origin determination unit 321 proceeds to Step S38 to determine whether or not the interval is one sample.

When the front edge intervals WF are not continuously similar for the number of protection stages (No in Step S40), the first interval specification unit 331 proceeds to Step S46 to increment the set burst interval NF by +1. When the number of shifts MF is not equal to or larger than the threshold (No in Step S41), the first interval specification unit 331 proceeds to Step S36 to shift the origin burst by one burst based on the set burst interval NF.

The analysis unit 25 that executes the front edge determination processing illustrated in FIGS. 16A and 16B specifies the similar front edge interval when the intervals between the front edges of adjacent bursts at a specified burst interval from a time-series burst are similar continuously for the number of protection stages. After specifying the front edge interval, the analysis unit 25 shifts the origin burst by one burst and decides, as the front edge period, the average value of the front edge intervals that are similar continuously for the number of protection stages, the front edge intervals being the intervals between the front edges of the adjacent bursts at the shifted burst interval. As a result, the front edge period may be decided from the time-series burst.

Figure 17A:
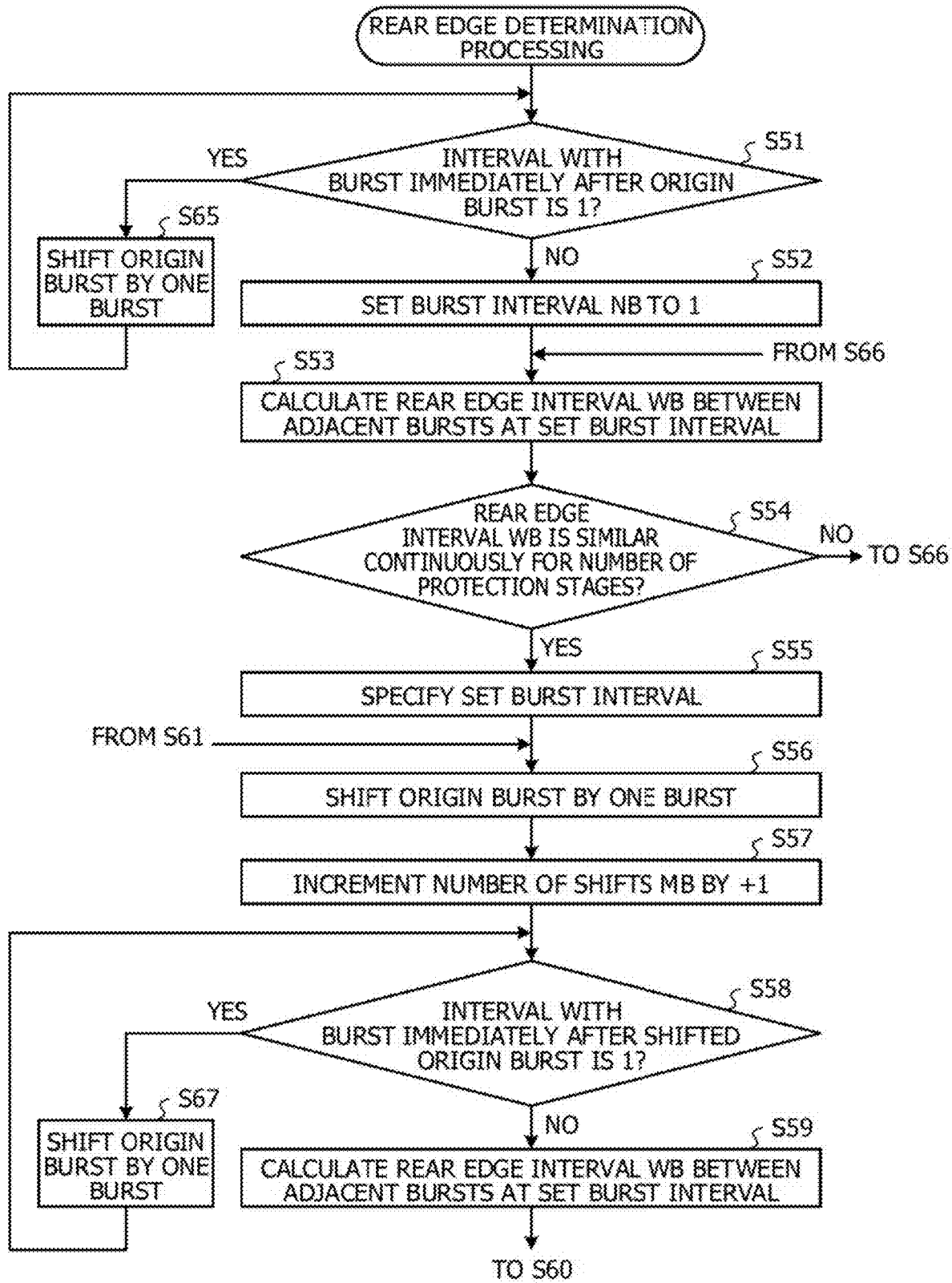
FIGS. 17A and 17B are flowcharts illustrating an example of processing operations of the analysis unit related to rear edge determination processing.
Figure 17B:
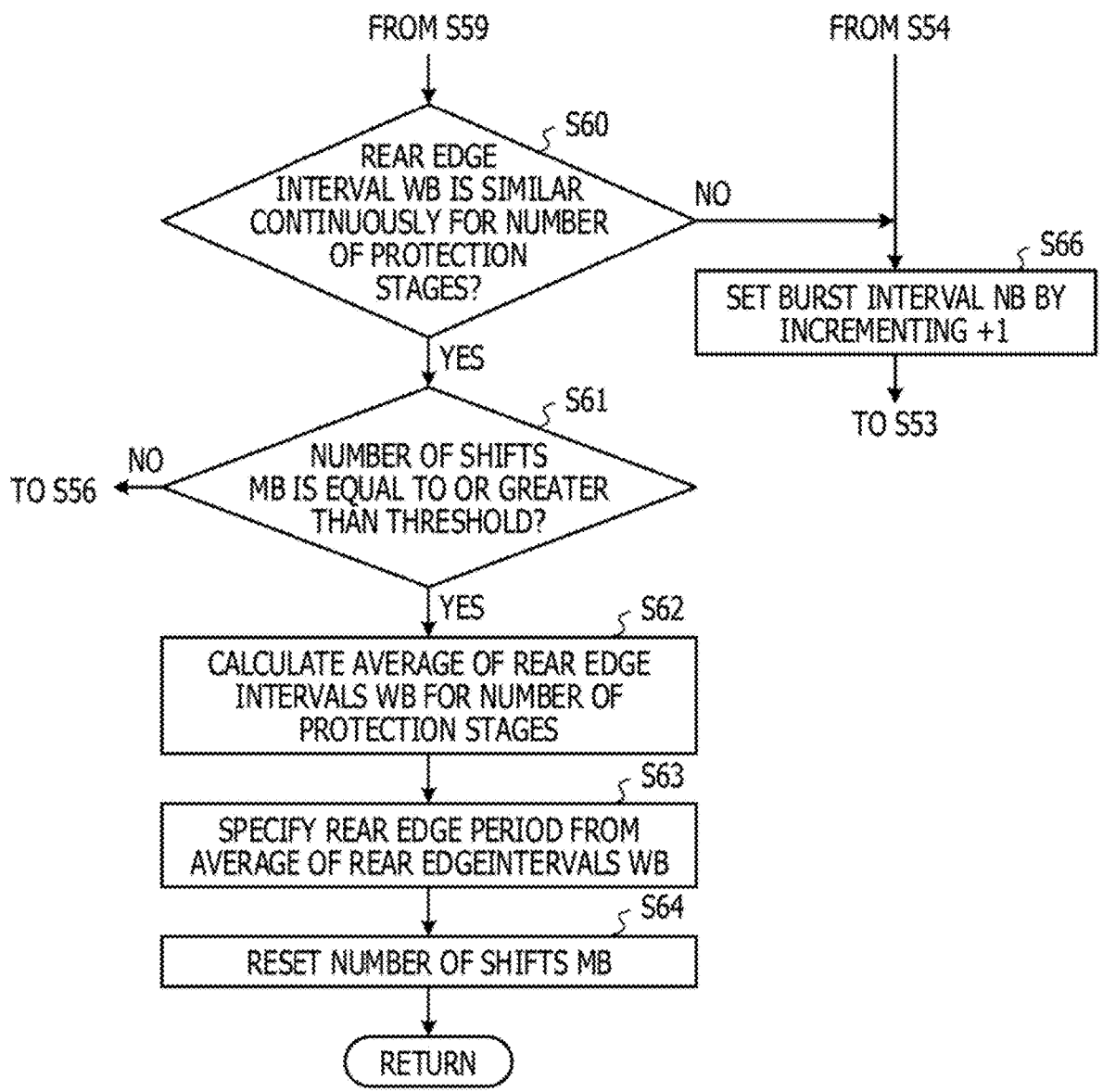

FIGS. 17A and 17B are flowcharts illustrating an example of processing operations of the analysis unit 25 related to rear edge determination processing. In FIG. 17A, the first origin determination unit 321 in the specification unit 32 determines whether or not the interval between the origin burst and the burst immediately after the origin burst is one sample (Step S51). The immediately following burst is the burst immediately after the origin burst. When the origin burst is the second burst, for example, the immediately following burst may be said to be the third burst. The second interval specification unit 341 in the second determination unit 34 sets the burst interval NB to "1" when the interval is not one sample (No in Step S51), that when the interval is two samples or more (Step S52).

The second interval specification unit 341 sequentially calculates the interval WB between the rear edges of adjacent bursts with the set burst interval NB (Step S53). The second interval specification unit 341 determines whether or not the sequentially calculated rear edge intervals WB are similar continuously for the number of protection stages (Step S54). It is assumed that the number of protection stages is, for example, 10.

When the rear edge intervals WB are continuously similar for the number of protection stages (Yes in Step S54), the second interval specification unit 341 specifies the set burst interval NB (Step S55). The second interval specification unit 341 shifts the origin burst by one burst while maintaining the specified burst interval NB (Step S56). The second interval specification unit 341 increments the number of shifts MB by +1 (Step S57). The number of shifts MF may also be accordingly set.

The first origin determination unit 321 determines whether or not the interval between the shifted origin burst and the burst immediately after the origin burst is one sample (Step S58). When the interval is not one sample (No in Step S58), the second interval specification unit 341 determines that the interval is two samples or more, and sequentially calculates the interval WB between the rear edges of adjacent bursts with the set burst interval NB (Step S59). The second interval specification unit 341 determines whether or not the sequentially calculated rear edge intervals WB are similar continuously for the number of protection stages (Step S60).

When the rear edge intervals WB are continuously similar for the number of protection stages (Yes in Step S60), the second interval specification unit 341 determines whether or not the number of shifts MB is equal to or larger than a threshold (Step S61). When the number of shifts MB is equal to or larger than the threshold (Yes in Step S61), the second interval specification unit 341 calculates an average value of the rear edge intervals WB for the number of protection stages (Step S62).

After calculating the average value of the rear edge intervals WB for the number of protection stages, the second period specification unit 342 decides the average value of the rear edge intervals as the rear edge period (Step S63), and then the processing operations illustrated in FIG. 17B are terminated. When the sampling interval between the origin burst and the it immediately following burst is one sample (Yes in Step S51), the first origin determination unit 321 shifts the origin burst by one burst (Step S65). After shifting the origin burst by one burst, the first origin determination unit 321 proceeds to Step S51 to determine whether or not the interval is one sample.

When the rear edge intervals WB are not continuously similar for the number of protection stages (No in Step S54), the second interval specification unit 341 increments the set burst interval NB by +1 (Step S66). Incrementing the burst interval NB by +1 extends the burst interval by one burst. The second interval specification unit 341 proceeds to Step S53 to sequentially calculate the interval WB between the rear edges of adjacent bursts with the burst interval NB incremented by +1.

When the interval between the shifted origin burst and the immediately following burst is one sample (Yes in Step S58), the first origin determination unit 321 shifts the shifted origin burst by one burst (Step S67). After shifting the origin burst by one burst, the first origin determination unit 321 proceeds to Step S58 to determine whether or not the interval is one sample.

When the rear edge intervals WB are not continuously similar for the number of protection stages (No in Step S60), the second interval specification unit 341 proceeds to Step S66 to increment the set burst interval NB by +1. When the number of shifts MB is not quay to or larger than the threshold (No in Step S61), the second interval specification unit 341 proceeds to Step S56 to shift the origin burst by one burst based on the set burst interval NB.

The analysis unit 25 that executes the rear edge determination processing illustrated in FIGS. 17A and 17B specifies the rear edge interval when the intervals between the rear edges of adjacent bursts at a specified burst interval from a time-series burst are similar continuously for the number of protection stages. After specifying the rear edge interval, the analysis unit 25 shifts the origin burst by one burst and decides, as the rear edge period, the average value of the rear edge intervals that are similar continuously for the number of protection stages, the rear edge intervals being the intervals between the rear edges of the adjacent bursts at the shifted burst interval. As a result, the rear edge period may be decided from the time-series burst.

The analysis unit 25 of Embodiment 1 specifies the front edge period and the rear edge period from the time-series burst, and decides the longer period between the front edge period and the rear edge period as the burst period. As a result, traffic efficiency is improved while reducing erroneous detection of the burst period even when a plurality of periods are mixed. MFH packet output delay may be suppressed.

The analysis unit 25 may detect the periodicity of the burst while coping with the sampling error. Since it is possible to perform efficient low-delay transfer (MFH packet transfer) while accurately detecting the burst period, load on the CPU 12E may be reduced.

The analysis unit 25 decides the similar front edge interval as the front edge period when the intervals between the front edges of adjacent bursts at a specified burst interval, with the origin burst in the time-series burst as the starting point, are similar continuously for the number of protection stages. The analysis unit 25 decides the similar rear edge interval as the rear edge period when the intervals between the rear edges of adjacent bursts at a specified burst interval, with the origin burst in the time-series burst as the starting point, are similar continuously for the number of protection stages. The analysis unit 25 decides the longer period between the front edge period and the rear edge period as the burst period. The control unit 27 controls transfer of the received packets based on the decided burst period. As a result, traffic efficiency is improved while reducing erroneous detection of the burst period even when a plurality of periods are mixed. MFH packet output delay may be suppressed.

When the interval between the origin burst and the burst immediately before or after the origin burst is equal to or less than one sample, the analysis unit 25 shifts from the origin burst and specifies the shifted burst as the origin burst. As a result, it is possible to reduce burst interval collapse due to sampling errors.

The analysis unit 25 shifts the burst interval when the front edge intervals are similar continuously for the number of protection stages. The analysis unit 25 decides the front edge interval as the front edge period when the intervals between the front edges of adjacent bursts with the burst interval after the shift are similar continuously for the number of protection stages. The analysis unit 25 shifts the burst interval when the rear edge intervals are similar continuously for the number of protection stages, and decides the rear edge interval as the rear edge period when the intervals between the rear edges of adjacent bursts with the burst interval after the shift are similar continuously for the number of protection stages. As a result, it is possible to acquire the front edge period and the rear edge period with high accuracy.

When determining whether or not the front edge intervals or the rear edge intervals are continuously similar for the number of protection stages, the analysis unit 25 sets the similarity range to "zero or +1" until the number of protection stages ends if the error is determined to be similar with +1 even once during the number of protection stages. On the other hand, the analysis unit 25 sets the similarity range to "zero or –1" until the number of protection stages ends if the error is determined to be similar with –1 even once during the number of protection stages. As a result, it is possible to absorb sampling errors related to the front edge interval and the rear edge interval.

Figure 18:
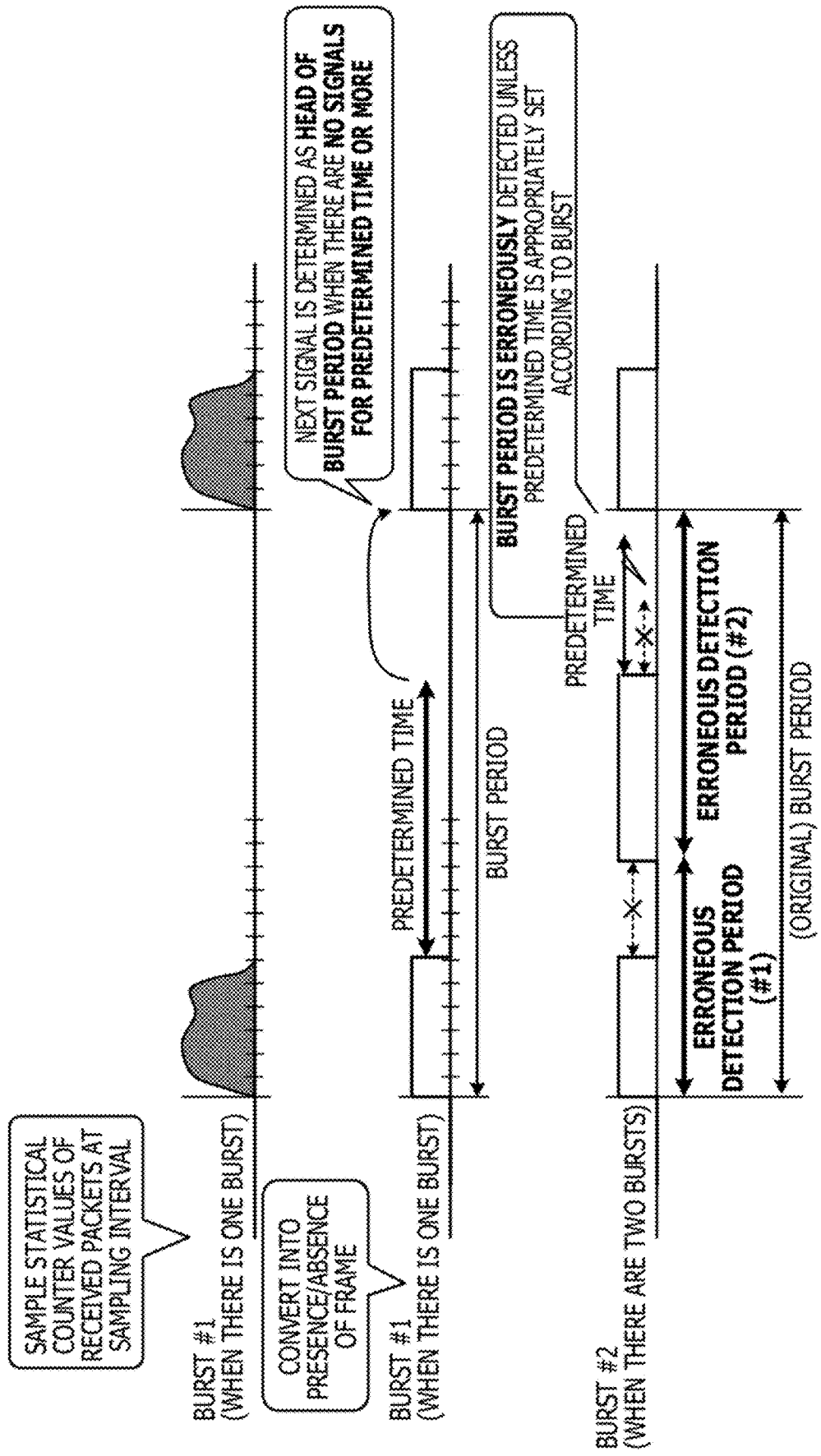
FIG. 18 is an explanatory diagram illustrating an example of operations when a burst period is erroneously detected in a comparative example (burst edge method)

FIG. 18 is an explanatory diagram illustrating an example of operations when a burst period is erroneously detected in a comparative example (burst edge method); The burst edge method is a period determination method in which a signal after no signals for a predetermined period of time set after burst input is set as the head of the burst period. When the burst edge method is adopted, a plurality of bursts exist in one period, and a time exceeding a predetermined time only once has to be set in one period. However, when the predetermined time is not set appropriately, when there are two signal-free sections equivalent to the predetermined time in one period, for example, two burst periods are detected in one period. To counter this problem, in Embodiment 1, even when there are a plurality of signal-free sections equivalent to the predetermined time in one period, the optimum burst period may be decided without setting the predetermined time.

Figure 19:
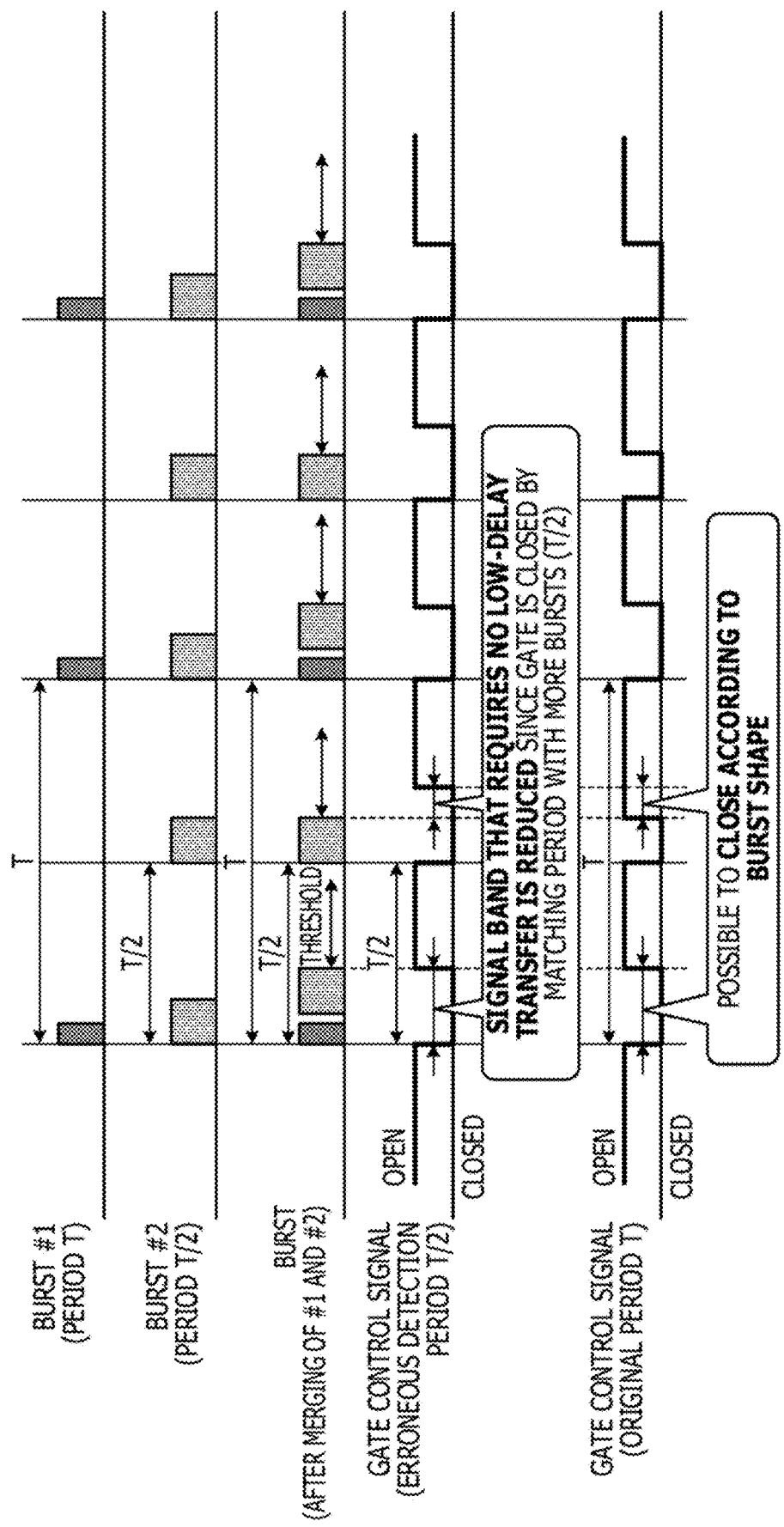
FIG. 19 is an explanatory diagram illustrating an example of gate control operations when a burst period is erroneously detected in the comparative example (burst edge method)

FIG. 19 is an explanatory diagram illustrating an example of gate control operations when a burst period is erroneously detected in the comparative example (burst edge method); In the fifth generation mobile communication system (5G), a sub-frame period may be set to 250µ seconds, 500µ seconds, 1 m seconds, or the like, and bursts of different sub-frame periods are merged, leading to mixture of a burst period of a period T and a burst period of a period T/2. In this case, for example, the shorter period (T/2) determined to have more bursts may be decided as the burst period. As a result, when the list table is updated with the shorter burst period, the gate is closed needlessly for the actual burst. That is, since the gate is closed in accordance with the shorter period (T/2) with more bursts, the signal band of the MFH packet that requires no low-delay transfer is reduced. To counter this problem, in Embodiment 1, the longer period between the front edge period and the rear edge period is decided as the burst period. As a result, even when bursts with different periods are mixed, the gates may be closed according to the burst shape without being closed needlessly.

Figure 20:
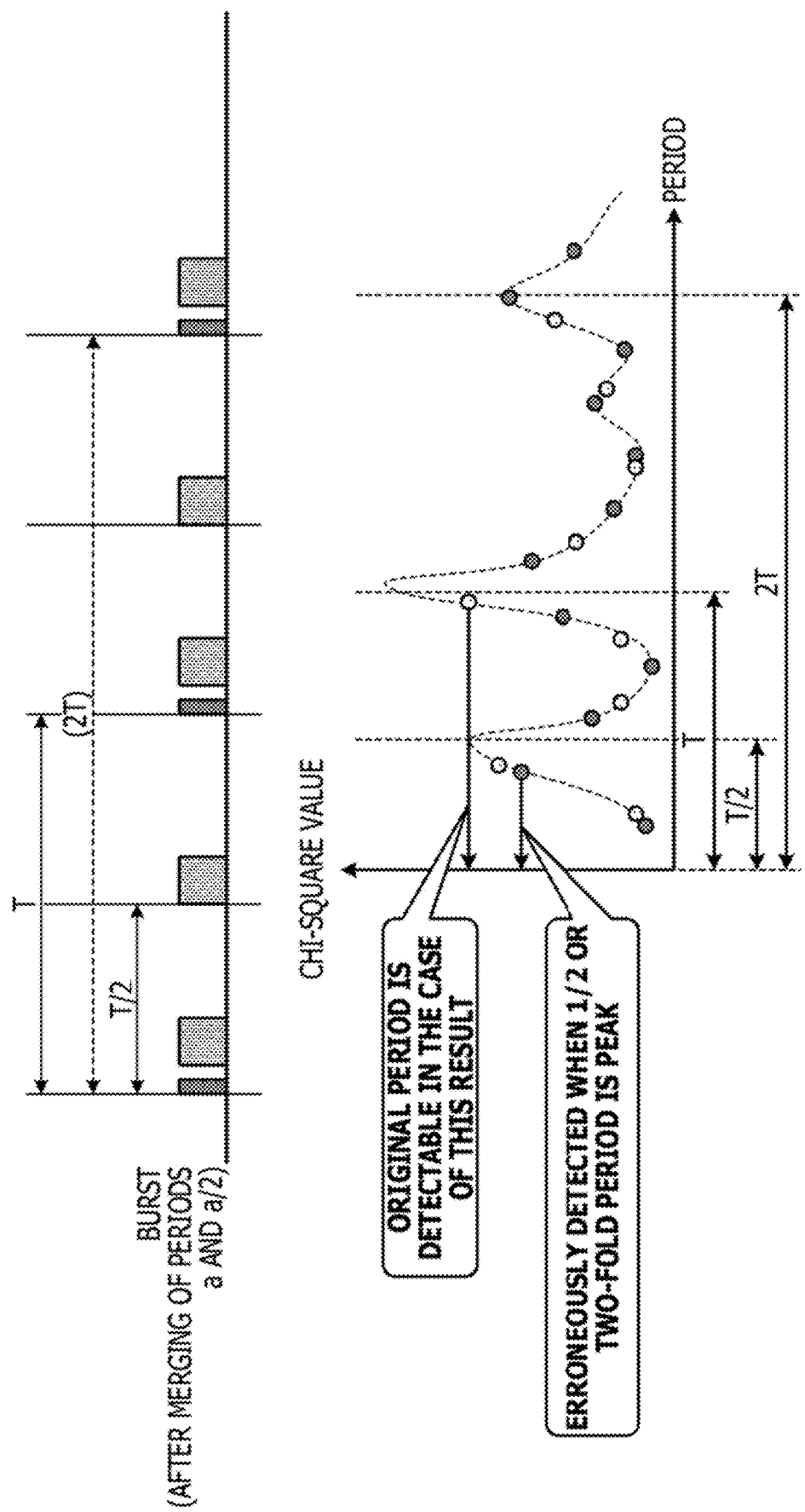
FIG. 20 is an explanatory diagram illustrating an example of operations when a burst period is erroneously detected in a comparative example (folding method)

FIG. 20 is an explanatory diagram illustrating an example of operations when a burst period is erroneously detected in a comparative example (folding method). The folding method is a method for determining a burst period is determined from a peak of a chi-square test by sampling burst signals at an arbitrary sampling period and then sequentially convolving the burst period with the integral multiple of the sampling period. The peak is obtained by quantifying the deviation and have a local maximum value at high periodicity. However, since bursts having periodicity also have signals in the integral multiple of the period, such as twofold or threefold, there is a local maximum point not only in the actual period but also in the N-fold period. The period in the horizontal axis of the chi-square test is discrete because the period is the integral multiple of the sampling period. The chi-square graph varies depending on the burst signal pattern. As a result, there is a possibility that the burst period is erroneously detected as the integral multiple. Therefore, by performing convolution many times while finely changing the sampling period, the probability of reducing erroneous detection is increased with decrease in discreteness, leading, however, to high processing load and time consumption. That is, a period that is the integral multiple of the actual burst period is erroneously detected, and a short period is erroneously detected in the case of a burst in which periods of 1/integer of the burst period are mixed. To counter this problem, in Embodiment 1, it is possible to reduce erroneous detection of a period that is the integral multiple of the actual burst, period, or erroneous detection of a short period in the case of a burst in which periods of 1/integer of the burst period are mixed.

As for the similarity range of the second determination unit 34 in Embodiment 1, the similarity range is set to "zero or +1" until the number of protection stages ends when the error is determined to be similar with +1 even once during the number of protection stages. On the other hand, as for the similarity range of the second determination unit 34, the similarity range is set to "zero or −1" until the number of protection stages ends when the error is determined to be similar with −1 even once during the number of protection stages. However, the similarity range of the second determination unit 34 is not limited to this, and embodiment thereof be described below as Embodiment 2.

Embodiment 2

Figure 21:
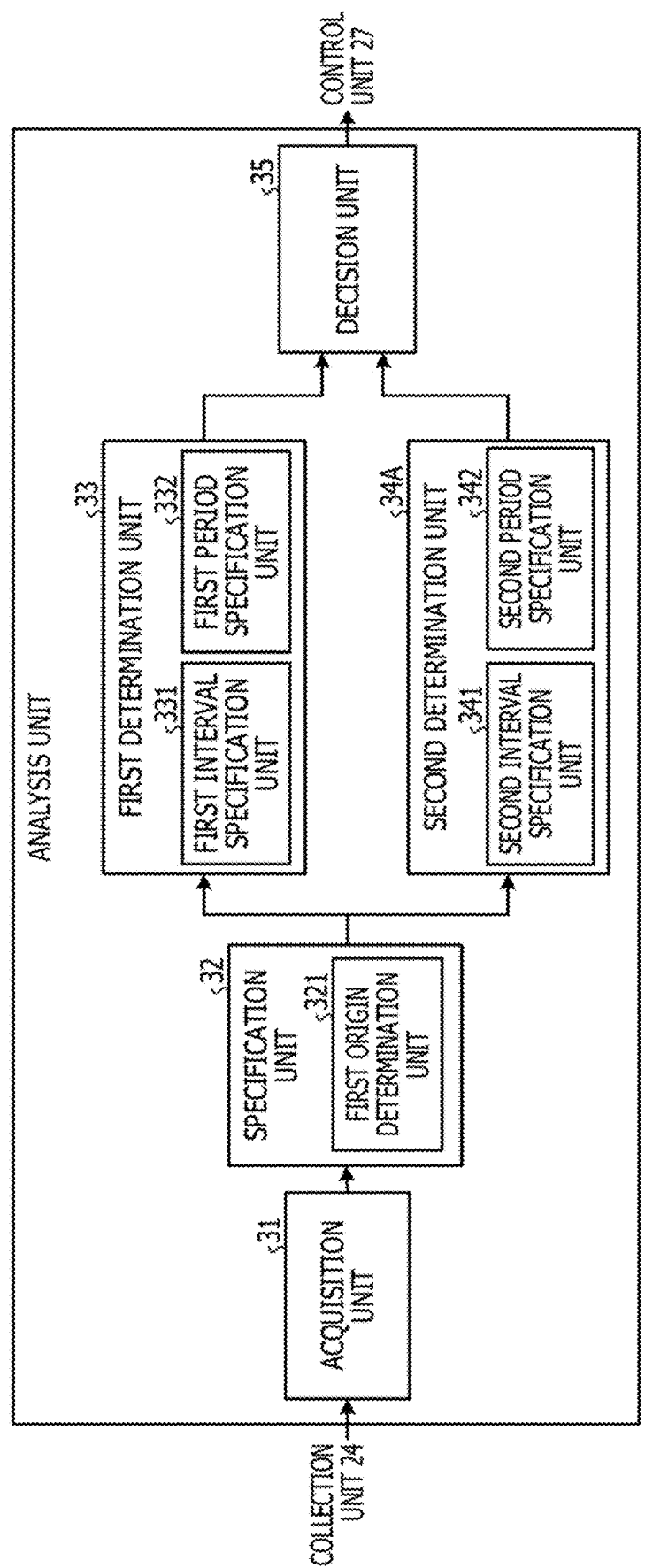
FIG. 21 is an explanatory diagram illustrating an example of a functional configuration of an analysis unit of Embodiment 2.

FIG. 21 is an explanatory diagram illustrating an example of a functional configuration of an analysis unit 25 of Embodiment 2. For convenience of explanation, the same configurations as those in the packet switch 7 according to Embodiment 1 are denoted by the same reference numerals, and thus repetitive description of such configurations and operations is omitted.

The second determination unit 34 in the analysis unit 25 of Embodiment 1 is different from a second determination unit 34A in the analysis unit 25 of Embodiment 2 in having a different similarity range to absorb the sampling error of the rear edge interval. The second determination unit 34A of Embodiment 2 has a wider similarity range for determining whether or not the intervals between the rear edges are similar. When the base station division layer is high, the fluctuation of the rear edge of the burst tends to be increased, and therefore the sampling error of the interval between the rear edges tends to be increased. Therefore, the similarity range to absorb errors is set wider for the second determination unit 34A.

Figure 22:
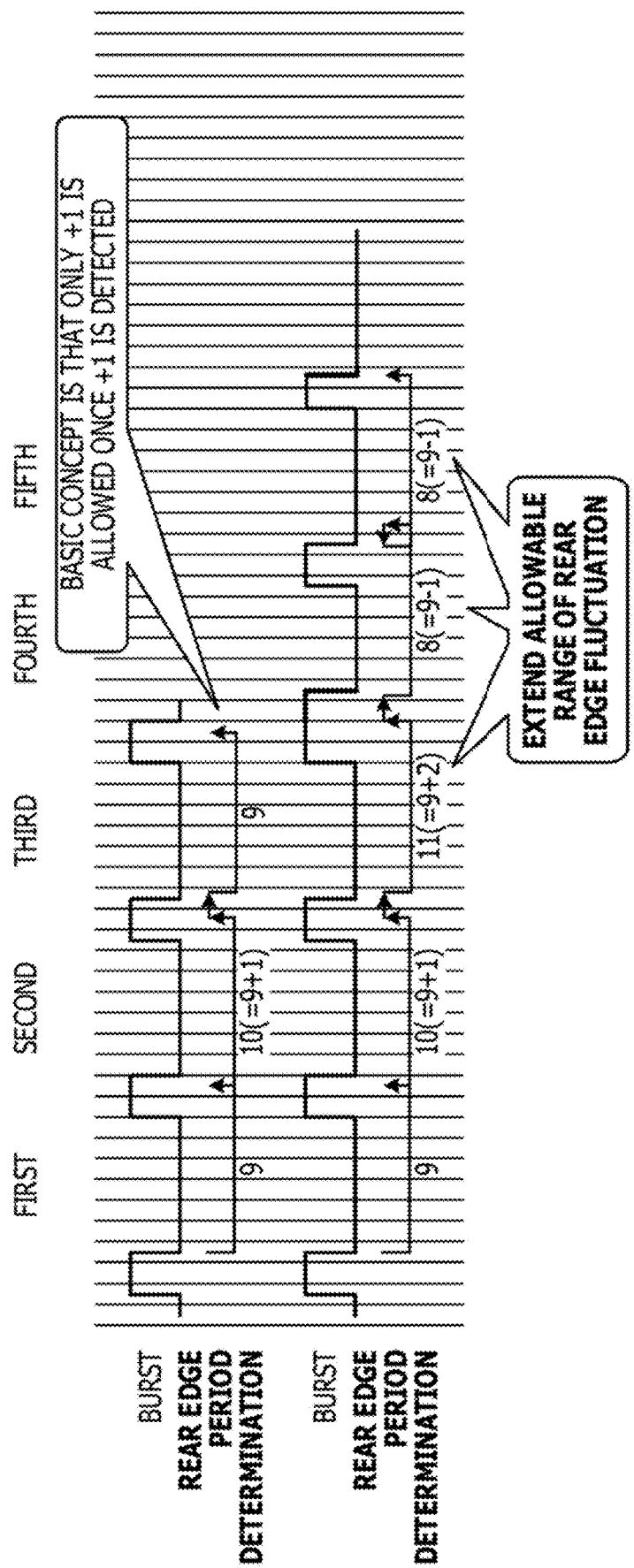
FIG. 22 is an explanatory diagram illustrating an example of similarity determination of the interval between rear edges.

FIG. 22 is an explanatory diagram illustrating an example of similarity determination of the interval between rear edges; As illustrated in the upper part of FIG. 22, the second determination unit 34 of Embodiment 1 calculates the first rear edge interval as "9" samples, the second rear edge interval as "10" samples, and the third rear edge interval as "9" samples. The second rear edge interval is "10" samples, which is within a similarity range of +1 from "9" samples as the reference.

On the other hand, as illustrated in the lower part of FIG. 22, the second determination unit 34A of Embodiment 2 sequentially calculates the first rear edge interval as "9" samples, the second rear edge interval as "10" samples, and the third rear edge interval as "11" samples. The second determination unit 34A also sequentially calculates the fourth rear edge interval as "8" samples and the fifth rear edge interval as "8" samples. However, the similarity range of the second determination unit 34A is, for example, −2 to +2. Therefore, when the reference of the rear edge interval is set to "9" samples, the second determination unit 34A determines that the first to fifth rear edge intervals are similar because the intervals are within the similarity range.

Figure 23A:
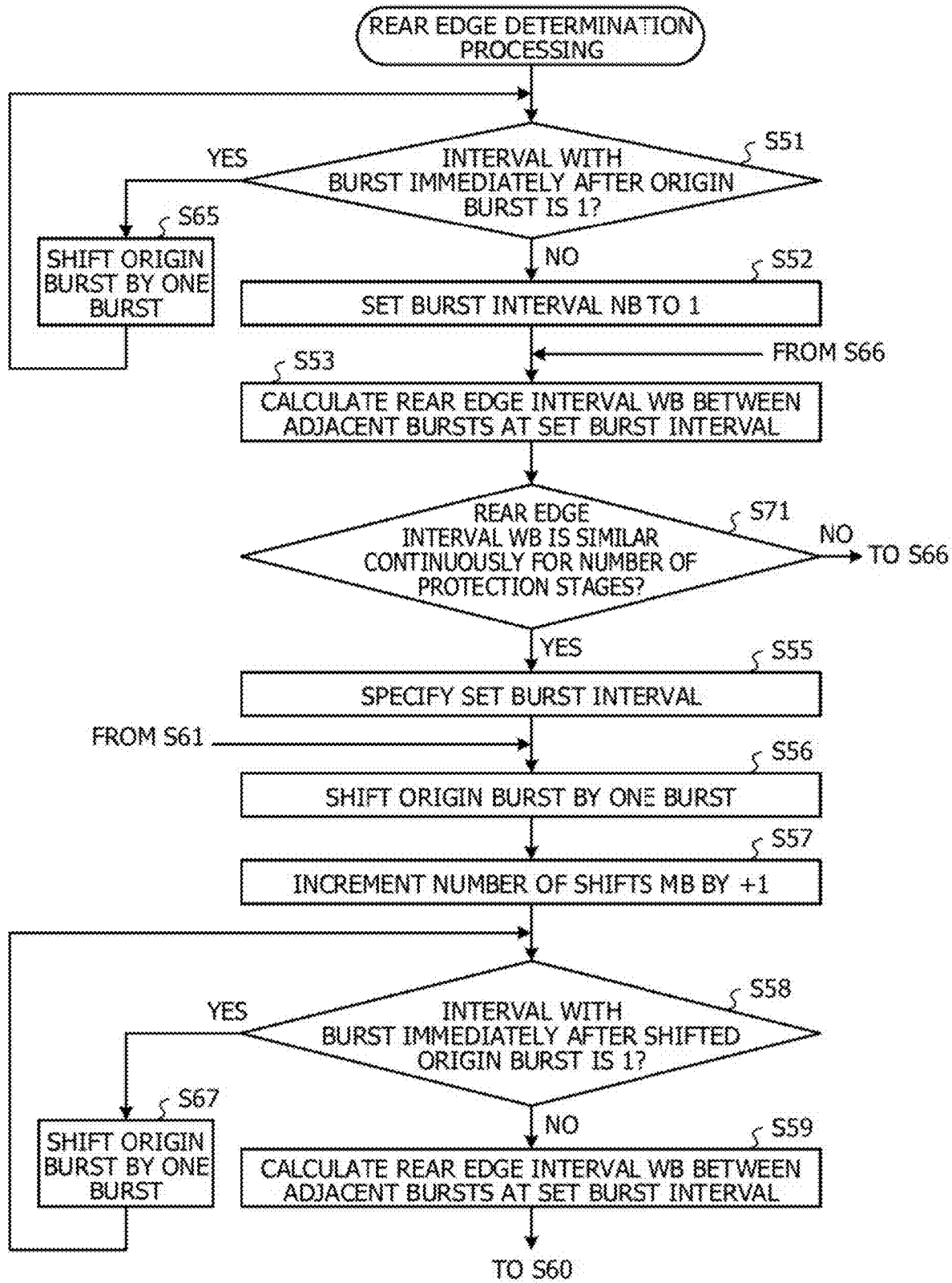
FIGS. 23A and 23B are flowcharts illustrating an example of processing operations of the analysis unit related to rear edge determination processing of Embodiment 2.
Figure 23B:
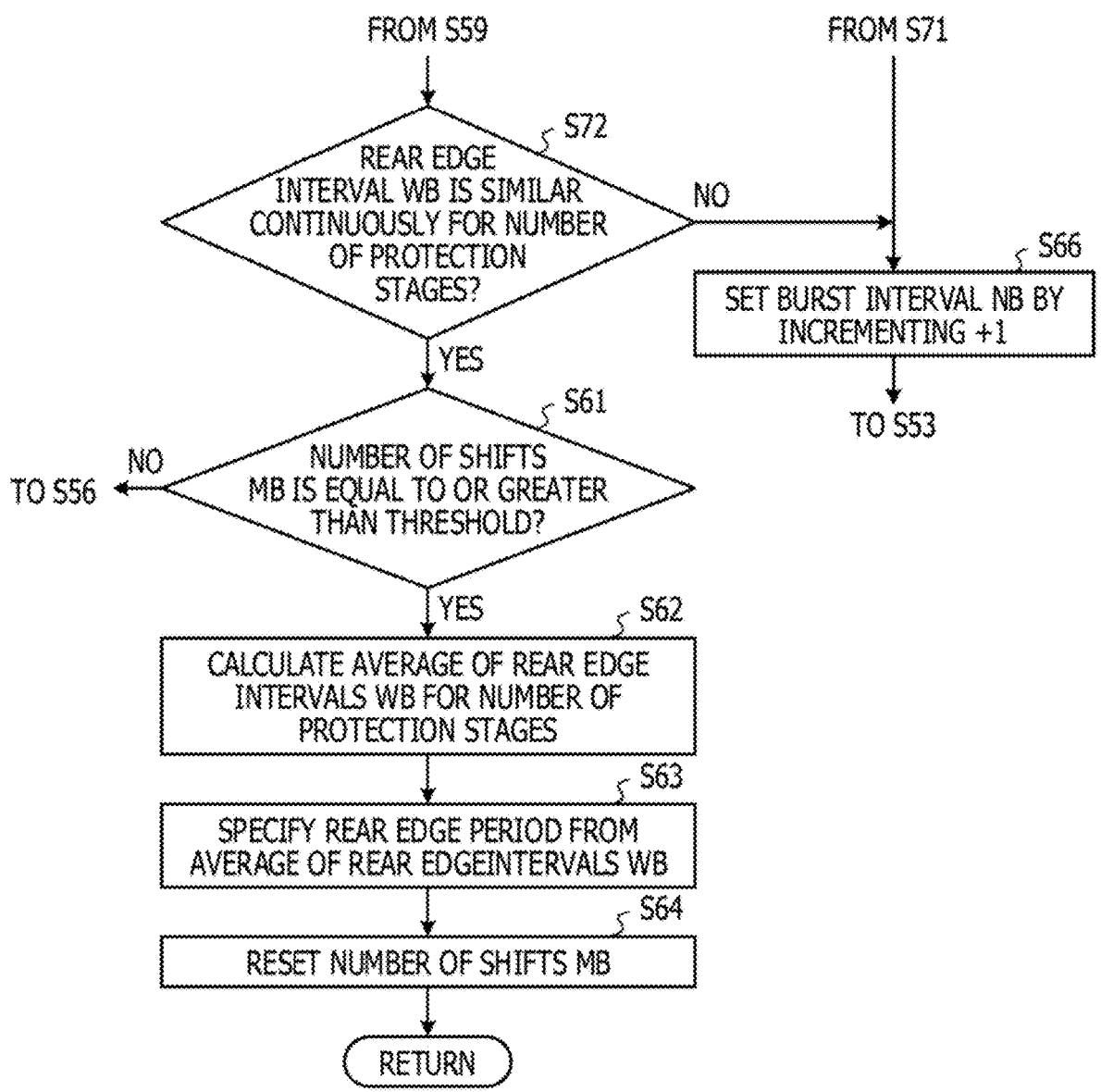

FIGS. 23A and 23B are flowcharts illustrating an example of processing operations of the analysis unit 25 related to rear edge determination processing of Embodiment 2. In FIG. 23A, the second determination unit 34A sequentially calculates the rear edge interval WB between adjacent bursts at the burst interval NB set in Step S53, and then determines whether or not the rear edge interval WB continuously falls within the similarity range for the number of protection stages (Step S71). The similarity range is, for example, −2 to +2. When the rear edge interval WB continuously falls within the similarity range for the number of protection stages (Yes in Step S71), the second determination unit 34A proceeds to Step S55 to specify the set burst interval NB. When the rear edge interval WB does not continuously fall within the similarity range for the number of protection stages (No in Step S71), the second determination unit 4A proceeds to Step S66 to increment the set burst interval NB by +1.

The second determination unit 34A sequentially calculates the rear edge interval WB between adjacent bursts at the burst interval NB set in Step S59, and then determines whether or not the rear edge interval WB continuously falls within the similarity range for the number of protection stages (Step S72). When the rear edge interval WB continuously falls within the similarity range for the number of protection stages (Yes in Step S72), the second determination unit 34A proceeds to Step S61 to determine whether or not the number of shifts MB is equal to or larger than a threshold. When the rear edge interval WB does not continuously fall within the similarity range for the number of protection stages (No in Step S72), the second determination unit 34A proceeds to Step S66 to increment the set burst interval NB by +1.

Since the analysis unit 25 of Embodiment 2 has extended the similarity range for determining whether or not the rear edge intervals are similar, the rear edge period may be flexibly specified while absorbing the sampling error of the rear edge interval even when the base station division layer is high.

For convenience of explanation, the description is given of the case where the second determination unit 34A extends the similarity range for determining whether or not the rear edge intervals are similar, and the first determination unit 33 determines the similarity of the front edge intervals with the error of +1 or −1. However, any changes may be accordingly made such that the first determination unit 33 extends the similarity range for determining whether or not the front edge intervals are similar, and the second determination unit 34 determines the similarity of the rear edge intervals with the error of +1 or −1.

Embodiment 3

Figure 24:
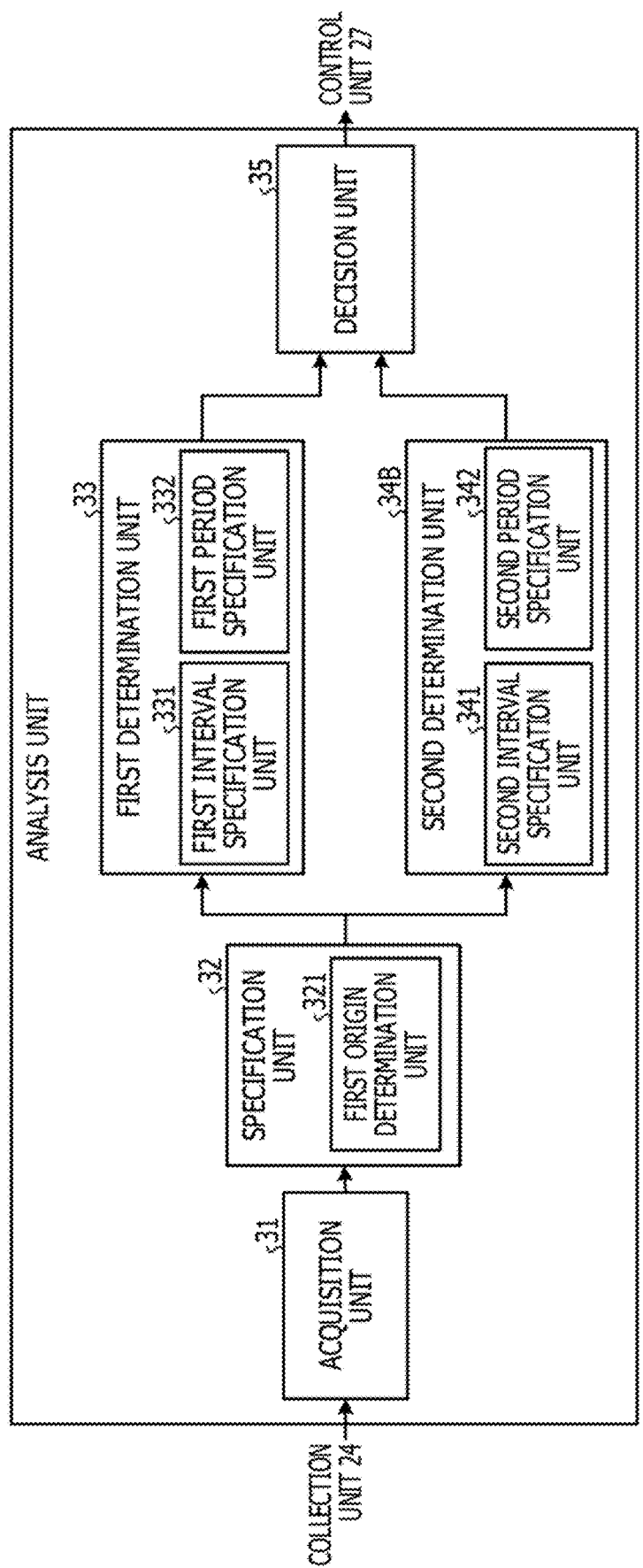
FIG. 24 is an explanatory diagram illustrating an example a functional configuration of an analysis unit of Embodiment 3.

FIG. 24 is an explanatory diagram illustrating an example of a functional configuration of an analysis unit 25 of Embodiment 3. For convenience of explanation, the same configurations as those in the packet switch 7 according to Embodiment 1 are denoted by the same reference numerals, and thus repetitive description of such configurations and operations is omitted.

The second determination unit 34 of Embodiment 1 is different from a second determination unit 34B of Embodiment 3 in determining whether or not the number of times of determining that the rear edge intervals are similar, among the number of times of determining whether or not the rear edge intervals are similar for the number of protection stages, is equal to or more than a predetermined number of times X. When the number of times of determining that the rear edge intervals are similar is equal to or more than the predetermined number of times X, the second determination unit 34B determines that the rear edge intervals are similar continuously for the number of protection stages. For example, when the number of times of determining that the rear edge intervals are similar is 8 or more, out of the number of protection stages of 10, the second determination unit 34B determines that the rear edge intervals are similar continuously for the number of protection stages.

Figure 25:
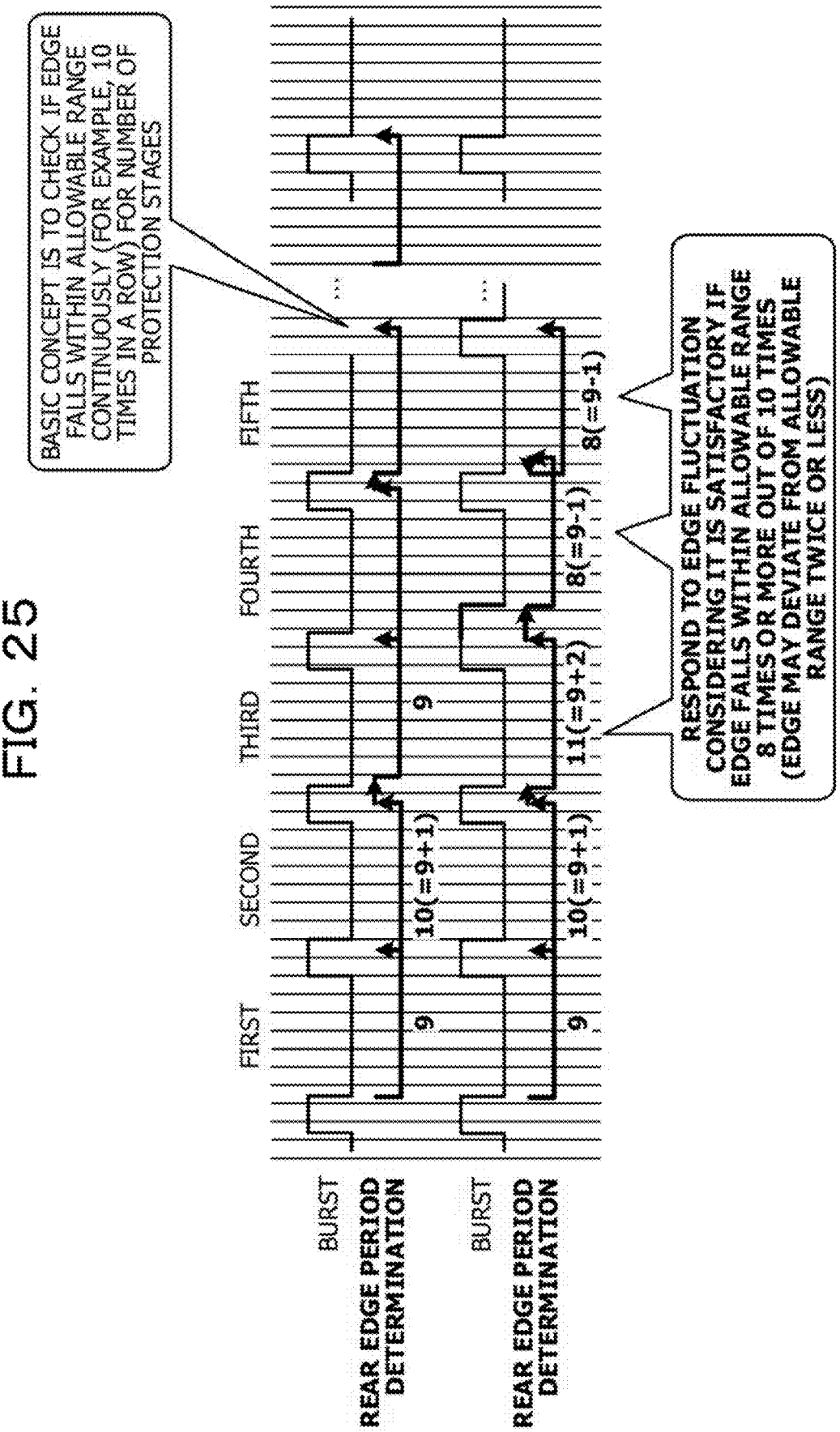
FIG. 25 is an explanatory diagram illustrating an example of similarity determination of the interval between rear edges.

FIG. 25 is an explanatory diagram illustrating an example of similarity determination of the interval between rear edges; As illustrated in the upper part of FIG. 25, the second determination unit 34 of Embodiment 1 sequentially calculates the first rear edge interval as "9" samples, the second rear edge interval as "10" samples, and the third rear edge interval as "9" samples.

On the other hand, as illustrated in the lower part of FIG. 22, the second determination unit 34B of Embodiment 3 sequentially calculates the first rear edge interval as "9" samples, the second rear edge interval as "10" samples, and the third rear edge interval as "11" samples. The second determination unit 34B also sequentially calculates the fourth rear edge interval as "8" samples and the fifth rear edge interval as "8" samples. For convenience of explanation, when the reference of the rear edge interval is set to "9" samples, the first and second rear edge intervals are determined to be similar, but the third to fifth rear edge intervals are determined not to be similar. Therefore, since the rear edge intervals are outside the similarity range three times out of the number of protection stages of 10, the second determination unit 34B determines that the rear edge intervals are not similar continuously for the number of protection stages. When the number of times that the rear edge intervals are similar is 8 or more, out of the number of protection stages of 10, the second determination unit 34B determines that the rear edge intervals are similar continuously for the number of protection stages.

Figure 26A:
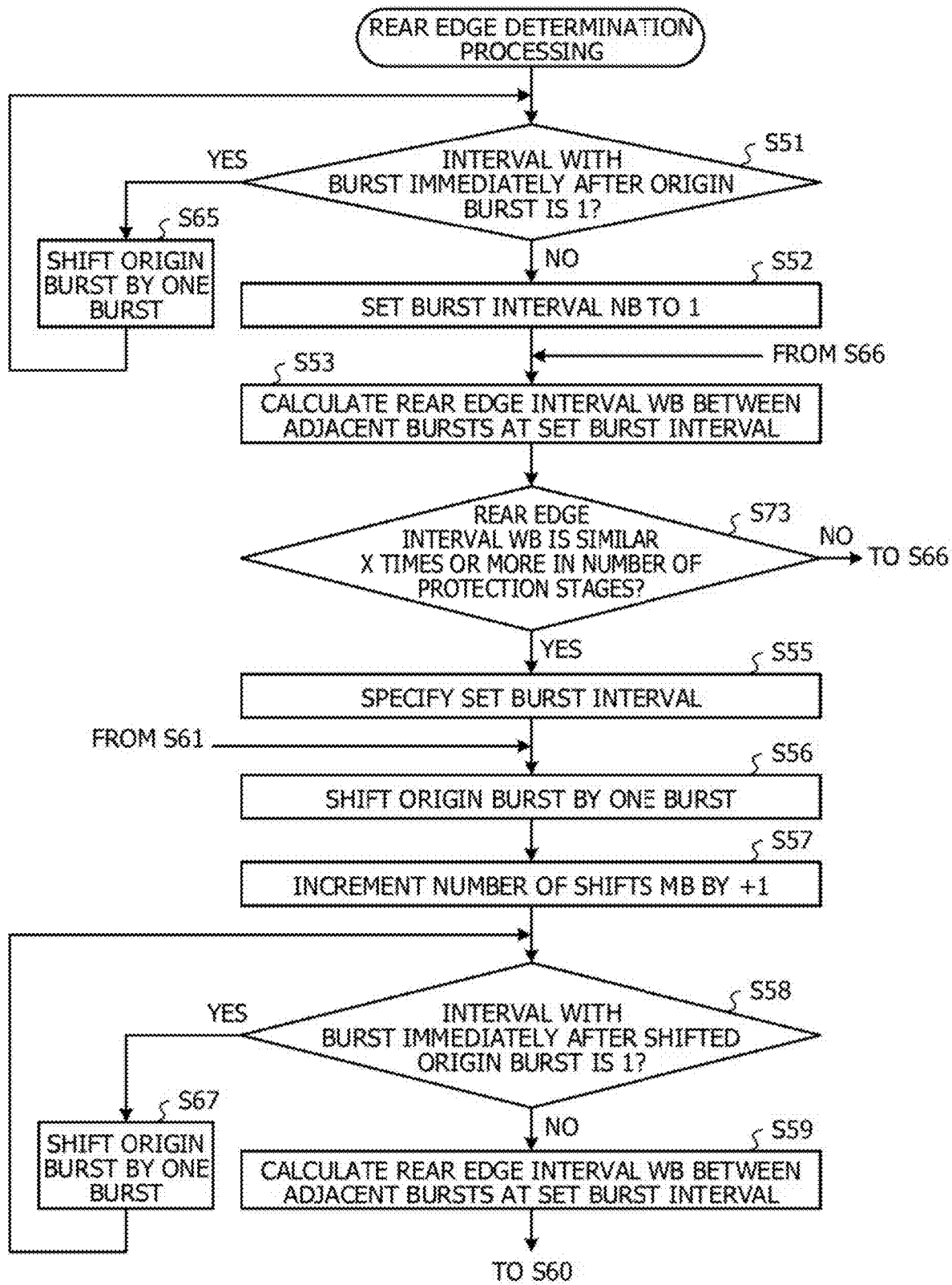
FIGS. 26A and 26B are flowcharts illustrating an example of processing operations of the analysis unit related to rear edge determination processing of Embodiment 3.
Figure 26B:
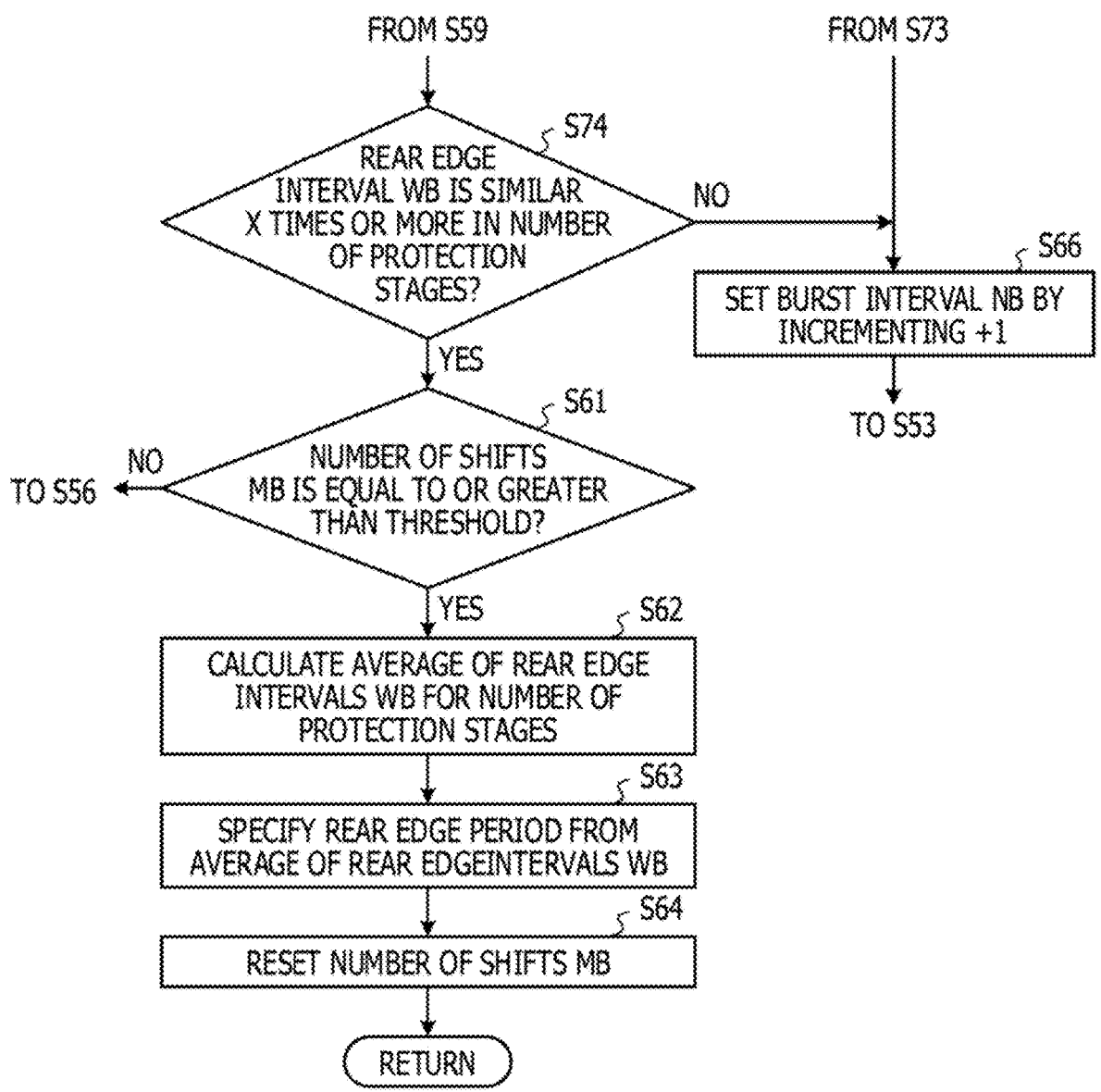

FIGS. 26A and 26B are flowcharts illustrating an example of processing operations of the analysis unit 25 related to rear edge determination processing of Embodiment 3. In FIG. 26A, the second determination unit 34B sequentially calculates the rear edge interval WB in Step S53, and then determines whether or not the number of times of determining that the rear edge intervals WB are similar within the number of protection stages is equal to or more than the predetermined number of times X (Step S73). When the number of times of determining that the rear edge intervals WB are similar is equal to or more than the predetermined number of times X (Yes in Step S73), the second determination unit 34B proceeds to Step S55 to specify the set burst interval NB. When the number of times of determining that the rear edge intervals WB are similar is not equal to or more than the predetermined number of times X (No in Step S73), the second determination unit 34B proceeds to Step S66 to increment the set burst interval NB by +1.

The second determination unit 34B sequentially calculates the rear edge interval WB between adjacent bursts at the burst interval NB set in Step S53, and then determines whether or not the number of times of determining that the rear edge intervals WB are similar is equal to or more than the predetermined number of times X (Step S74). When the number of times of determining that the rear edge intervals WB are similar is equal to or more than the predetermined number of times X (Yes in Step S74), the second determination unit 34B proceeds to Step S61 to determine whether or not the number of shifts MB is equal to or larger than a threshold. When the number of times of determining that the rear edge intervals WB are similar is not equal to or more than the predetermined number of times X (No in Step S74), the second determination unit 34B proceeds to Step S66 to increment the set burst interval NB by +1.

When the number of times that the rear edge intervals are similar is equal to or more than the predetermined number of times, out of the number of protection stages, the second determination unit 34B of Embodiment 3 determines that the rear edge intervals are similar continuously, even if not continuously, for the number of protection stages. As a result, the second determination unit 34B may flexibly specify the rear edge period even if the rear edge intervals are not continuous.

Embodiment 4

Figure 27:
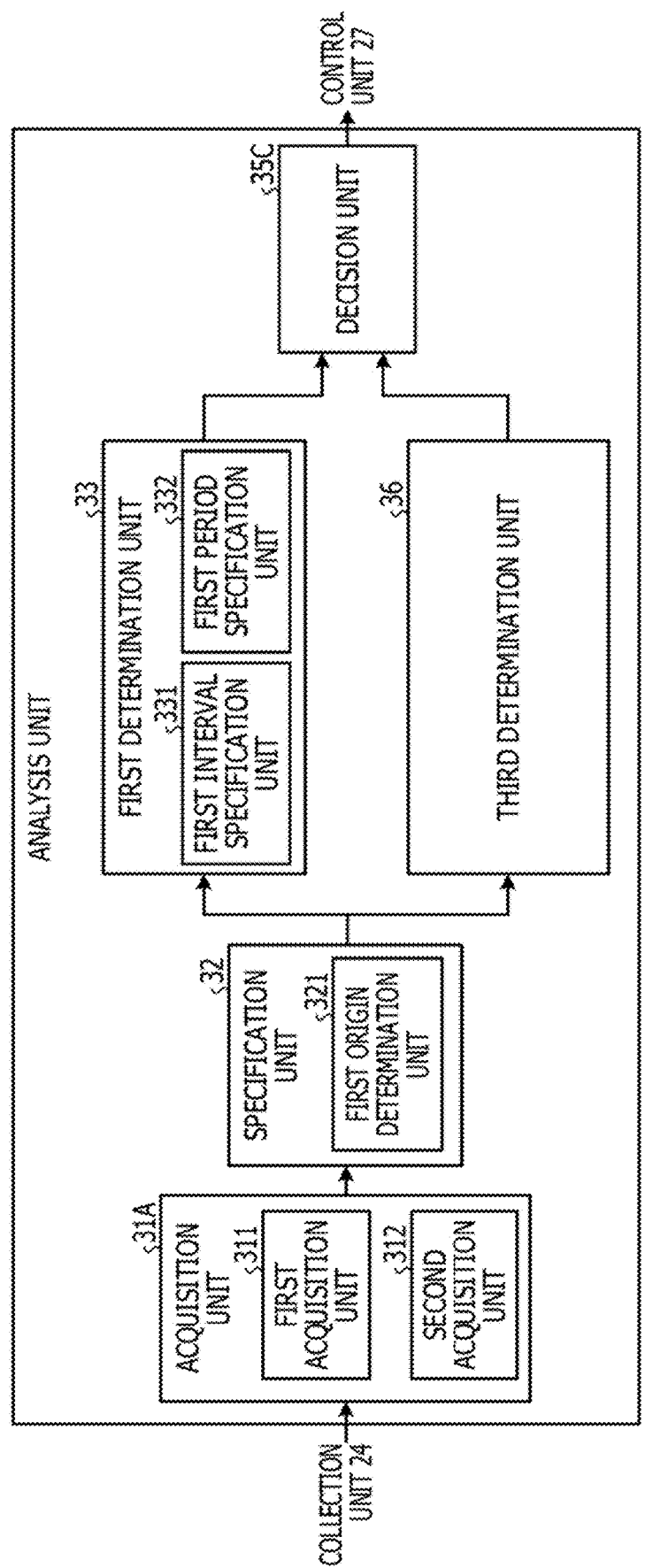
FIG. 27 is an explanatory diagram illustrating an example of a functional configuration of an analysis unit of Embodiment 4.

FIG. 27 is an explanatory diagram illustrating an example of a functional configuration of an analysis unit 25 of Embodiment 4. For convenience of explanation, the same configurations as those in the packet switch 7 according to Embodiment 1 are denoted by the same reference numerals, and thus repetitive description of such configurations and operations is omitted. The analysis unit 25 illustrated in FIG. 27 includes an acquisition unit 31A instead of the acquisition unit 31 and a third determination unit 36 instead of the second determination unit 34. The acquisition unit 31A in the analysis unit 25 includes a first acquisition unit 311 and a second acquisition unit 312. The first acquisition unit 311 acquires a time-series burst from the frame presence/absence information at each sampling interval from the count of received packets. The second acquisition unit 312 acquires the number of frames for each time-series burst.

The third determination unit 36 acquires the number of frames for each time-series burst while shifting the burst interval. The third determination unit 36 determines, for each burst interval, whether or not the number of frames in the origin burst and the number of frames in adjacent bursts at the burst interval are similar continuously for the number of protection stages. When the number of frames in each burst corresponding to the number of protection stages is continuously similar to the number of frames in the origin burst, the third determination unit 36 determines the burst interval with the similar number of frames. When determining the burst interval with the similar number of frames, the decision unit 35C notifies the control unit 27 of the front edge period decided by the first determination unit 33 as the burst period. For convenience of explanation, it is assumed that the front edge period (front edge interval) is the same as the burst interval with the similar number of frames determined by the third determination unit 36.

Figure 28:
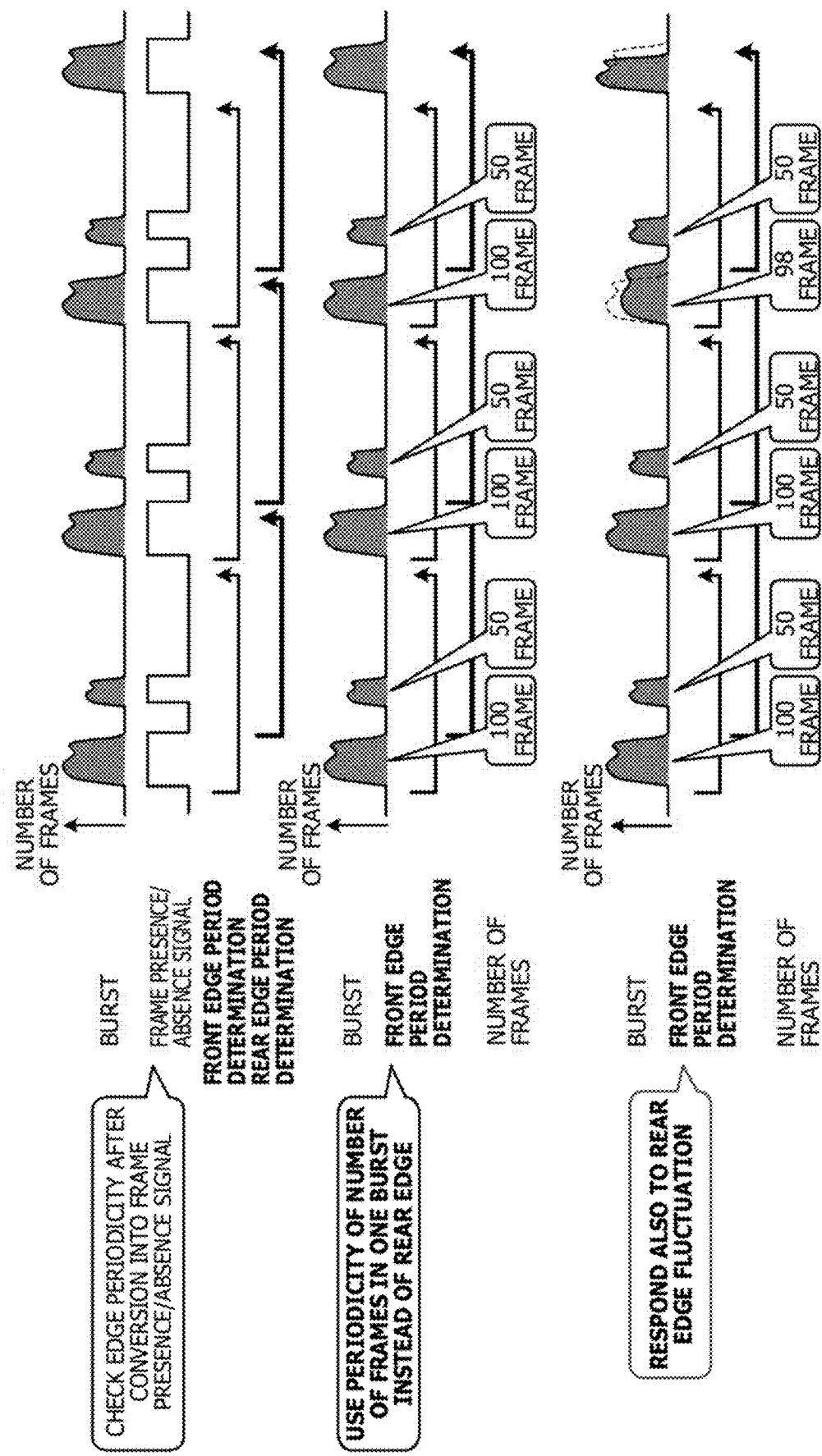
FIG. 28 is an explanatory diagram illustrating an example of a period determination operation for the interval between front edges and the interval between rear edges.

FIG. 28 is an explanatory diagram illustrating an example of a period determination operation for the interval between front edges and the interval between rear edges; The first determination unit 33 specifies time-series bursts based on the burst interval (N=1). The first determination unit 33 sequentially calculates the interval between the front edges of adjacent bursts with the burst interval (N=1). That is, when the burst interval N=1, the first determination unit 33 sequentially calculates the interval between the front edges of the bursts next to each other. Then, the first determination unit 33 specifies the currently set burst interval when the intervals between the front edges of the bursts next to each other are similar for the number of protection stages. The number of protection stages is, for example, 10.

When having specified the burst interval, the first determination unit 33 shifts the origin burst by one burst, and sequentially calculates the interval between the front edges of the adjacent bursts from the shifted origin burst based on the specified burst interval. It is assumed that the shift for one burst is executed for all bursts in one period corresponding to the set burst interval (N=1). For convenience of explanation, the description is given of the case where the shift for one burst is executed for all bursts in one period corresponding to the set burst interval; however, such a shift may be accordingly changed, such as for any burst among the bursts in one period. When the intervals between the front edges of the bursts next to each other are similar continuously for the number of protection stages, the first determination unit 33 decides, for each origin burst after the shift, the average value of the front edge intervals determined to be similar continuously for the number of protection stages as the front edge period. In other words, the first determination unit 33 shifts the origin burst by the unit of burst even when the front edge interval corresponds to the burst period. When the front edge intervals are similar continuously for the number of protection stages for each origin burst after the shift, the first determination unit 33 decides the front edge interval as the front edge period.

The second acquisition unit 312 acquires the number of frames. In adjacent bursts at the set burst interval. The third determination unit 36 determines whether or not the number of frames in the origin burst and the number of frames in each burst corresponding to the number of protection stages are continuously similar. The similarity range is ±5 frames of the number of frames in the origin burst. For example, the number of frames in the first burst in the third row in FIG. 28 is 100 frames, the number of frames in the second burst is 100 frames, and the number of frames in the third burst is 98 frames. When the origin burst is the first burst, the numbers of frames in the first, second, and third bursts are determined to be continuously similar. When the number of frames in each burst corresponding to the number of protection stages is continuously similar to the number of frames in the origin burst, the third determination unit 36 determines the burst interval with the similar number of frames. When determining the burst interval with the similar number of frames, the decision unit 35C decides the front edge period decided by the first determination unit 33 as the burst period and notifies the control, unit 27 of the decided burst period.

Figure 29A:
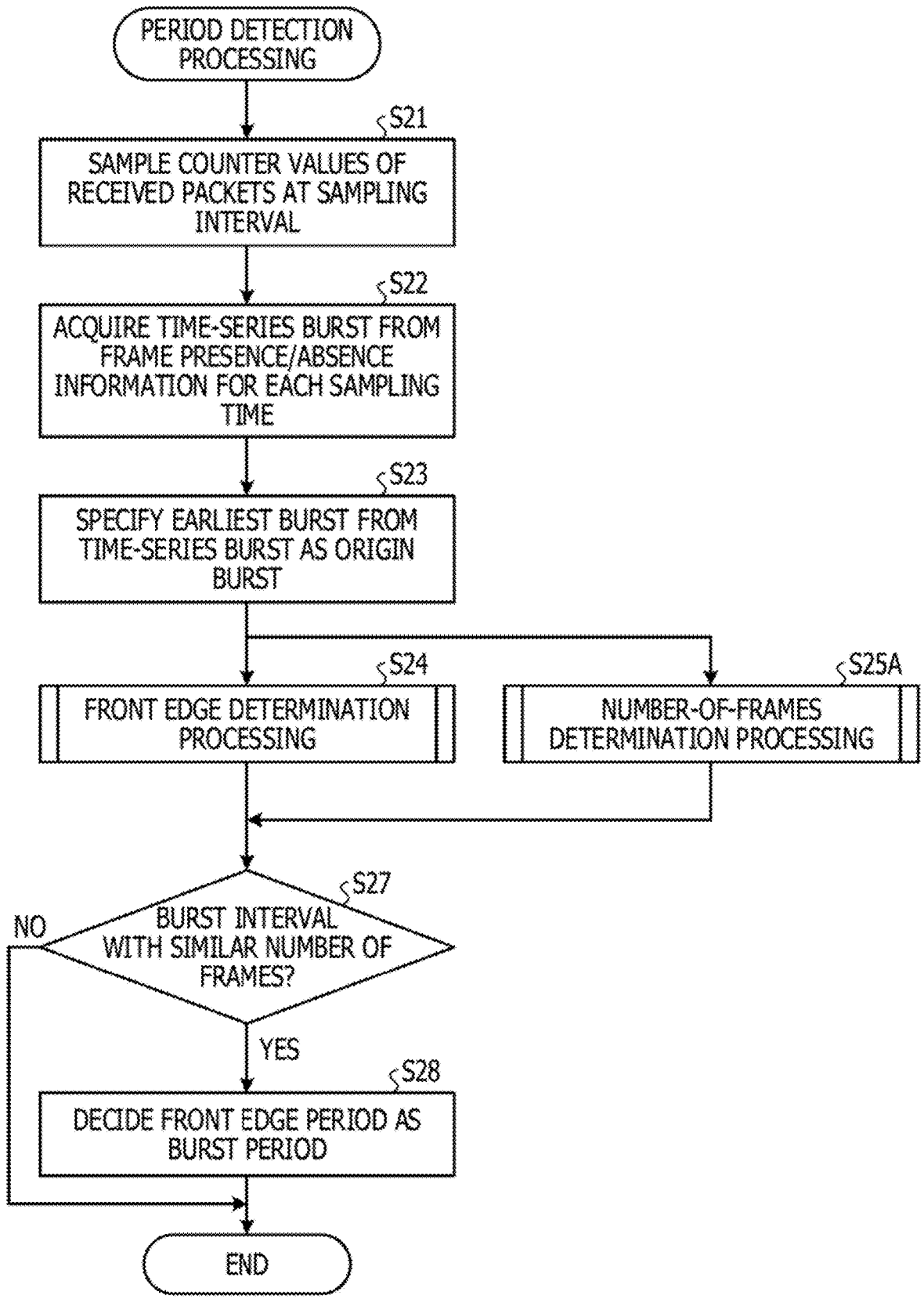
FIG. 29A is a flowchart illustrating an example of processing operations of the analysis unit related to period detection processing of Embodiment 4.

FIG. 29A is a flowchart illustrating an example of processing operations of the analysis unit 25 related to period detection processing of Embodiment 4. In FIG. 29A, the analysis unit 25 specifies the origin burst in Step S23, and then executes front edge determination processing in Step S24. After specifying the origin burst in Step S23, the analysis unit 25 executes number-of-frames determination processing to be described later (Step S25A).

After acquiring the front edge period decided by the front edge determination processing in Step S24 and the determination result of the number-of-frames determination processing in Step S25A, the analysis unit 25 determines whether or not the burst interval is the one with the similar number of frames (Step S27). When the burst interval is the one with the similar number of frames (Yes in Step S27), the analysis unit 25 decides the front edge period decided in Step S24 as the burst period (Step S28), and then terminates the processing operations illustrated in FIG. 29A. When the burst interval is not the one with the similar number of frames (No in Step S27), the analysis unit 25 terminates the processing operations illustrated in FIG. 29A.

The analysis unit 25 that executes the period detection processing illustrated in FIG. 29A specifies the front edge period from the interval between the front edges adjacent to each other at the burst interval from the time-series burst. When the numbers of frames in adjacent bursts at the burst interval are similar continuously for the number of protection stages, the analysis unit 25 decides the front edge period as the burst period. As a result, the burst period may also be acquired with the similarity of the number of frames in the burst instead of the periodicity of the rear edge.

Figure 29B:
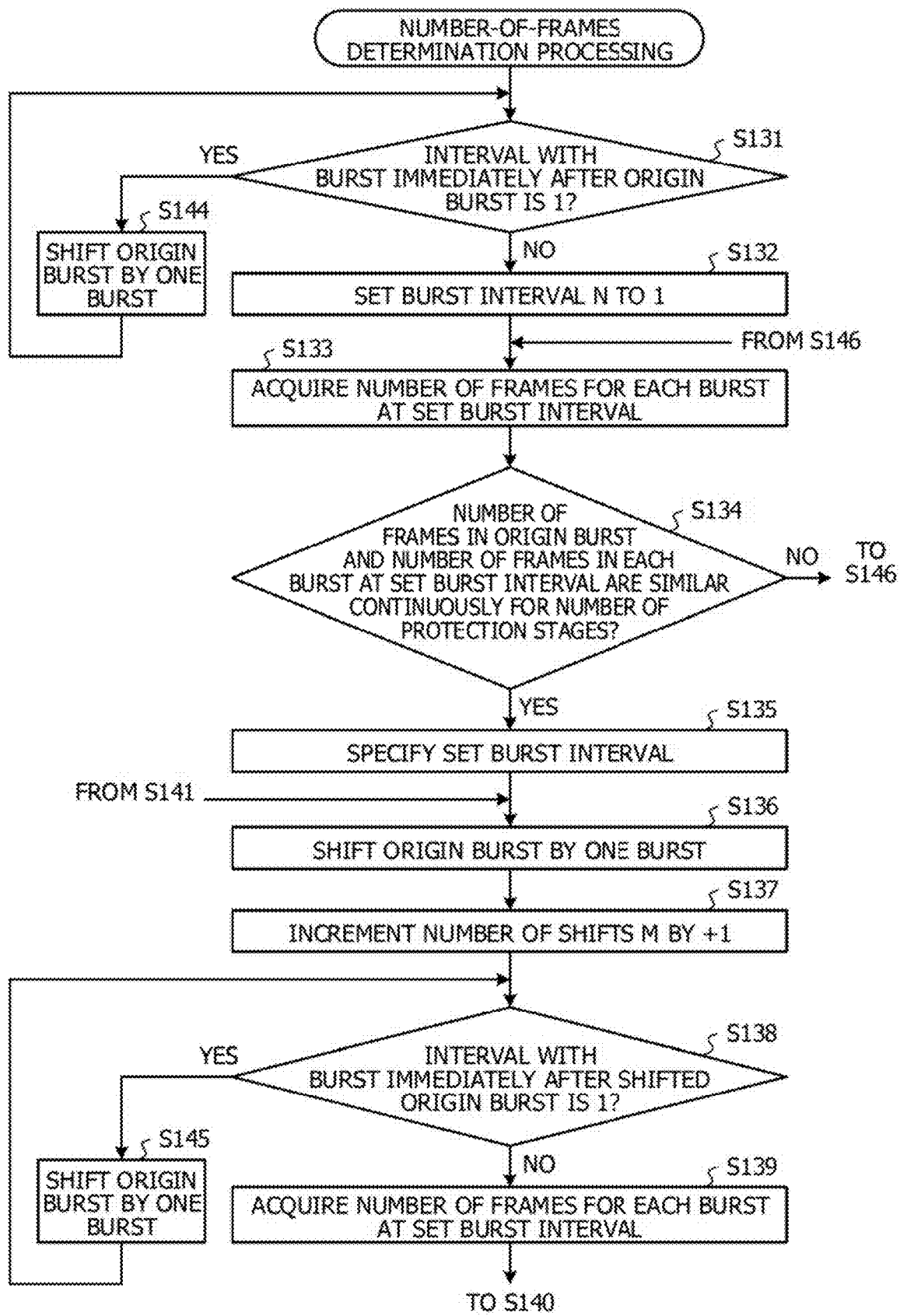
FIGS. 29B and 29C are flowcharts illustrating an example of processing operations of the analysis unit related to number-of-frames determination processing of Embodiment 4.
Figure 29C:
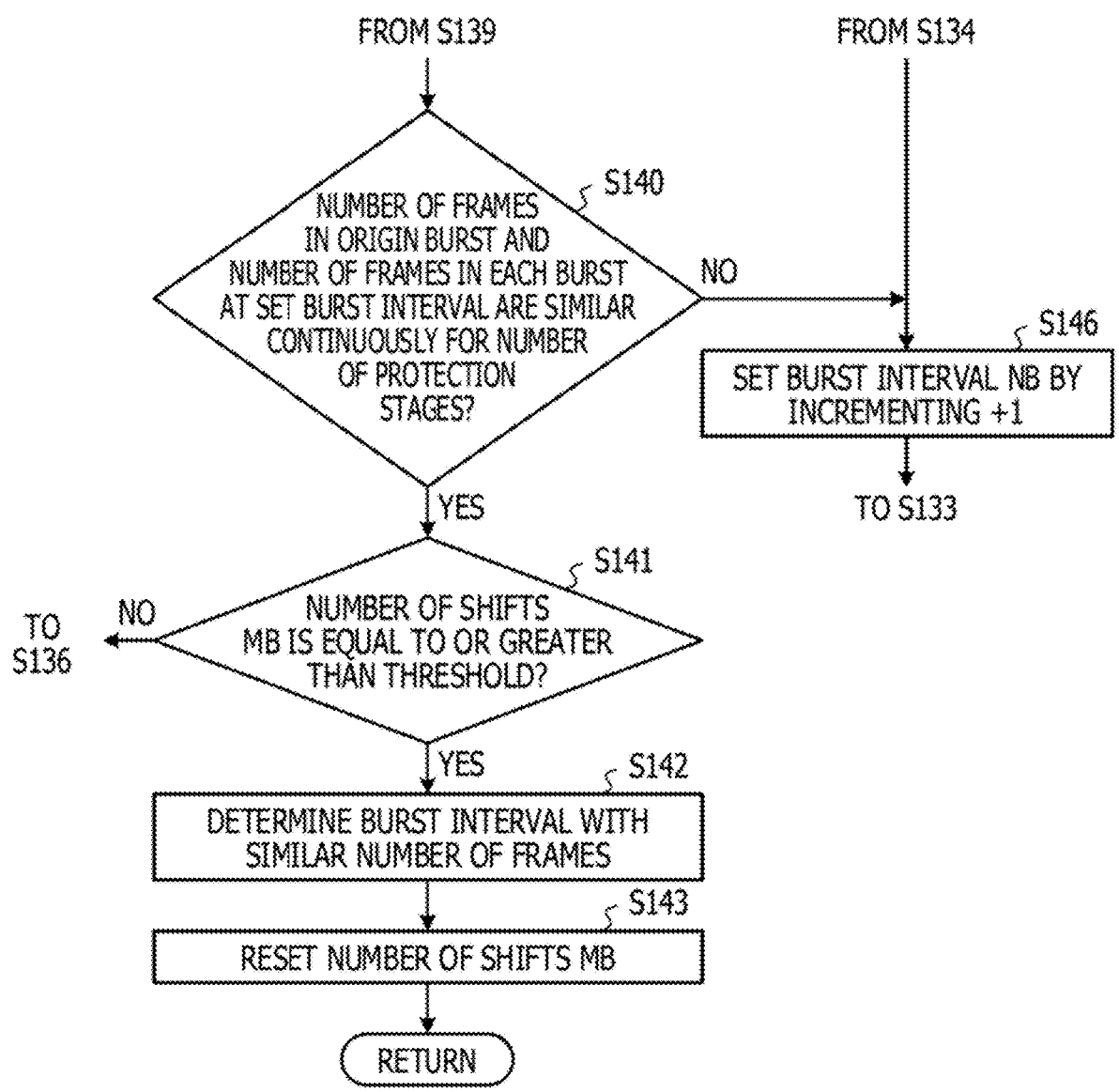

FIGS. 29b and 29C are flowcharts illustrating an example of processing operations of the analysis unit 25 related to number-of-frames determination processing of Embodiment 4. In FIG. 29B, the first, origin determination unit 321 in the specification unit 32 determines whether or not the interval between the origin burst and the burst immediately after the origin burst is one sample (Step S131). When the interval is not one sample (No in Step S131), the third determination unit 36 determines that the interval is two samples or more and sets the burst interval N to "1" (Step S132).

The third determination unit 36 acquires the number of frames for each burst of the set burst interval N (Step S133). The third determination unit 36 determines whether or not the number of frames in the origin burst and the number of frames in adjacent bursts at the set burst interval are similar continuously for the number of protection stages (Step S134). When the number of frames in the origin burst and the number of frames in adjacent bursts at the set burst interval are similar continuously for the number of protection stages (Yes in Step S134), the third determination unit 36 specifies the set burst interval N (Step S135).

The third determination unit 36 shifts the origin burst by one burst while maintaining the specified burst interval N (Step S136). The third determination unit 36 increments the number of shifts M by +1 (Step S137). The first origin determination unit 321 determines whether or not the interval between the shifted origin burst and the burst immediately after the origin burst is one sample (Step S138). When the interval is not one sample (No in Step S138), the third determination unit 36 determines that the interval is two samples or more, and acquires the number of frames for each burst of the set burst interval N (Step S139). The third determination unit 36 determines whether or not the number of frames in the origin burst and the number of frames in adjacent bursts at the set burst interval are similar continuously for the number of protection stages (Step S140).

When the number of frames in the origin burst and the number of frames in adjacent bursts at the set burst interval are similar continuously for the number of protection stages (Yes in Step S140), the third determination unit 36 determines whether or not the number of shifts MB is equal to or larger than a threshold (Step S141). When the number of shifts MB is equal to or larger than the threshold (Yes in Step S141), the third determination unit 36 determines the burst interval with the similar number of frames (Step S142) and then terminates the processing operations illustrated in FIG. 29C.

When the interval between the origin burst and the immediately following burst is one sample (Yes in Step S131), the first origin determination unit 321 shifts the origin burst by one burst (Step S144). The first origin determination unit 321 proceeds to Step S131 to determine whether or not the interval between the shifted origin burst and the immediately following burst is one sample. When the interval between the shifted origin burst and the immediately following burst is one sample (Yes in Step S138), the first origin determination unit 321 shifts the shifted origin burst by one burst (Step S145). The first origin determination unit 321 proceeds to Step S138 to determine whether or not the interval between the shifted origin burst and the immediately following burst is one sample.

When the number of frames in origin burst and the number of frames in adjacent bursts at the set burst interval are not similar continuously for the number of protection stages (No in Step S134), the third determination unit 36 increments the set burst interval N by +1 (Step S146). The third determination unit 36 proceeds to Step S133 to acquire the number of frames for each time-series burst of the burst interval N incremented by +1.

When the numbers of frames are not similar continuously for the number of protection stages (No in Step S140), the third determination unit 36 proceeds to Step S146 to increment the set burst interval NB by +1. When the number of shifts MB is not equal to, or larger than the threshold (No in Step S141), the third determination unit 36 proceeds to Step S136 to shift the origin burst by one burst based on the set burst interval N.

The analysis unit 25 that executes the number-of-frames determination processing illustrated in FIGS. 29B and 29C acquires the number of frames in adjacent bursts at the set burst interval, and determines whether or not the number of frames in each burst for the number of protection stages is continuously similar to the number of frames in the origin burst. When the number of frames in each burst corresponding to the number of protection stages is continuously similar to the number of frames in the origin burst, the analysis unit 25 may specify the burst interval with the similar number of frames.

The analysis unit 25 of Embodiment 4 acquires the number of frames in bursts adjacent to each other at the set burst interval, and when the number of frames in each burst corresponding to the number of protection stages is continuously similar to the number of frames in the origin burst, determines the burst interval with the similar number of frames. When determining the burst interval with the similar number of frames, the analysis unit 25 decides the front edge period decided by the first determination unit 33 as the burst period. As a result, even when the rear edge intervals are not similar, for example, the burst period may be determined when the number of frames in the burst is similar.

The description is given of the case where analysis unit 25 of Embodiment 4 uses the number of frames in a burst to determine the similarity of the number of frames between adjacent bursts; however, the embodiments are not limited to the number of frames, but the number of received bytes in the burst may be used and any changes may be accordingly made.

The description is given of the case where the third determination unit 36 determines the burst interval with the similar number of frames when the number of frames in the origin burst and the number of frames in adjacent bursts at the set burst interval are similar continuously for the number of protection stages. However, the embodiments are not limited to the case where the numbers of frames are similar continuously for the number of protection stages, and any changes may be accordingly made thereto such that the burst interval with the similar number of frames may be determined when the number of frames is determined to be similar for a predetermined number of times or more with respect to the number of determinations for the number of protection stages.

Embodiment 5

Figure 30:
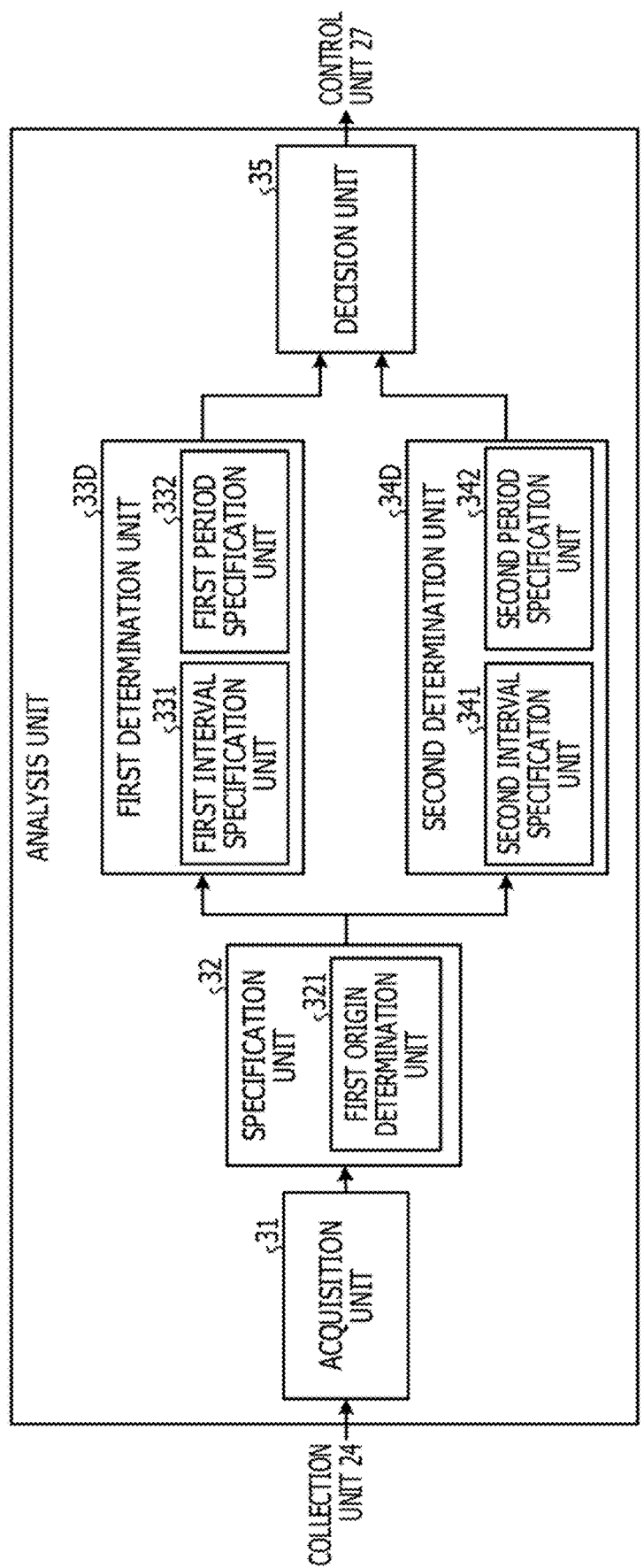
FIG. 30 is an explanatory diagram illustrating an example of a functional configuration of an analysis unit of Embodiment 5.

FIG. 30 is an explanatory diagram illustrating an example of a functional configuration of an analysis unit 25 of Embodiment 5. For convenience of explanation, the same configurations as those in the packet switch 7 according to Embodiment 1 are denoted by the same reference numerals, and thus repetitive description of such configurations and operations is omitted. The analysis unit 25 illustrated in FIG. 30 includes a first determination unit 33D instead of the first determination unit 33 and a second determination unit 34D instead of the second determination unit 34. When the input burst period is known in advance to be equal to or greater than the period T1, the first determination unit 33D does not check for burst intervals of less than the shortest period T1 of the input burst period. The second determination unit 34D also does not check for burst intervals of less than the period T1.

When the front edge interval is less than the input burst period T1, the first determination unit 33D determines whether or not the front edge intervals are similar continuously for the number of protection stages. When the front edge interval is not less than the input burst period T1, the first determination nit 33D does not execute the operation of determining whether or not the front edge intervals are similar continuously for the number of protection stages.

When the rear edge interval is less than the input burst period T1, the second determination unit 34D determines whether or not the rear edge intervals are similar continuously for the number of protection stages. When the rear edge interval is not less than the input burst period T1, the second determination unit 34D does not execute the operation of determining whether or not the rear edge intervals are similar continuously for the number of protection stages.

Figure 31:
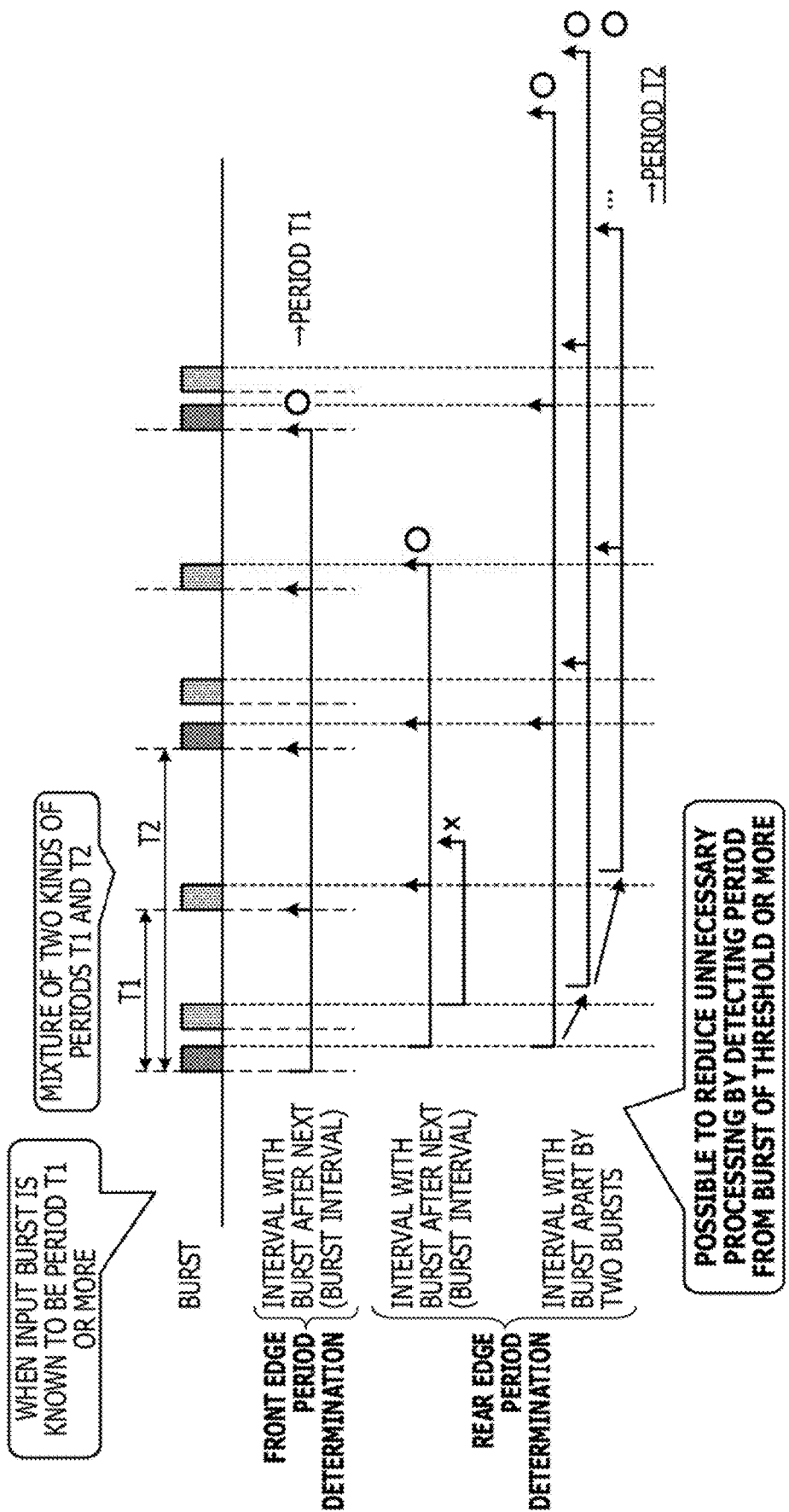
FIG. 31 is an explanatory diagram illustrating an example of a period determination operation for the interval between front edges and the interval between rear edges.

FIG. 31 is an explanatory diagram illustrating an example of a period determination operation for the interval between front edges and the interval between rear edges; When checking for the front edge interval, the first determination unit 33D sets the shortest period T1 among the input burst periods, thereby reducing unnecessary processing, such as specification of the front edge interval of less than the input burst period T1, to accelerate the processing. Likewise, when checking for the rear edge interval, the second, determination unit 34D sets the shortest period T1 among the input burst periods, thereby reducing unnecessary processing, such as specification of the front edge interval of less than the input burst period T1, to accelerate the processing. For example, in the 5G specification, the shortest sub-frame is determined to be 250µ seconds. Therefore, since the edge interval required for period detection is known in advance to be equal to or greater than the input burst period T1, detecting the period from the burst interval of equal to or greater than the burst period T1 may reduce unnecessary processing and accelerate the processing.

Figure 32A:
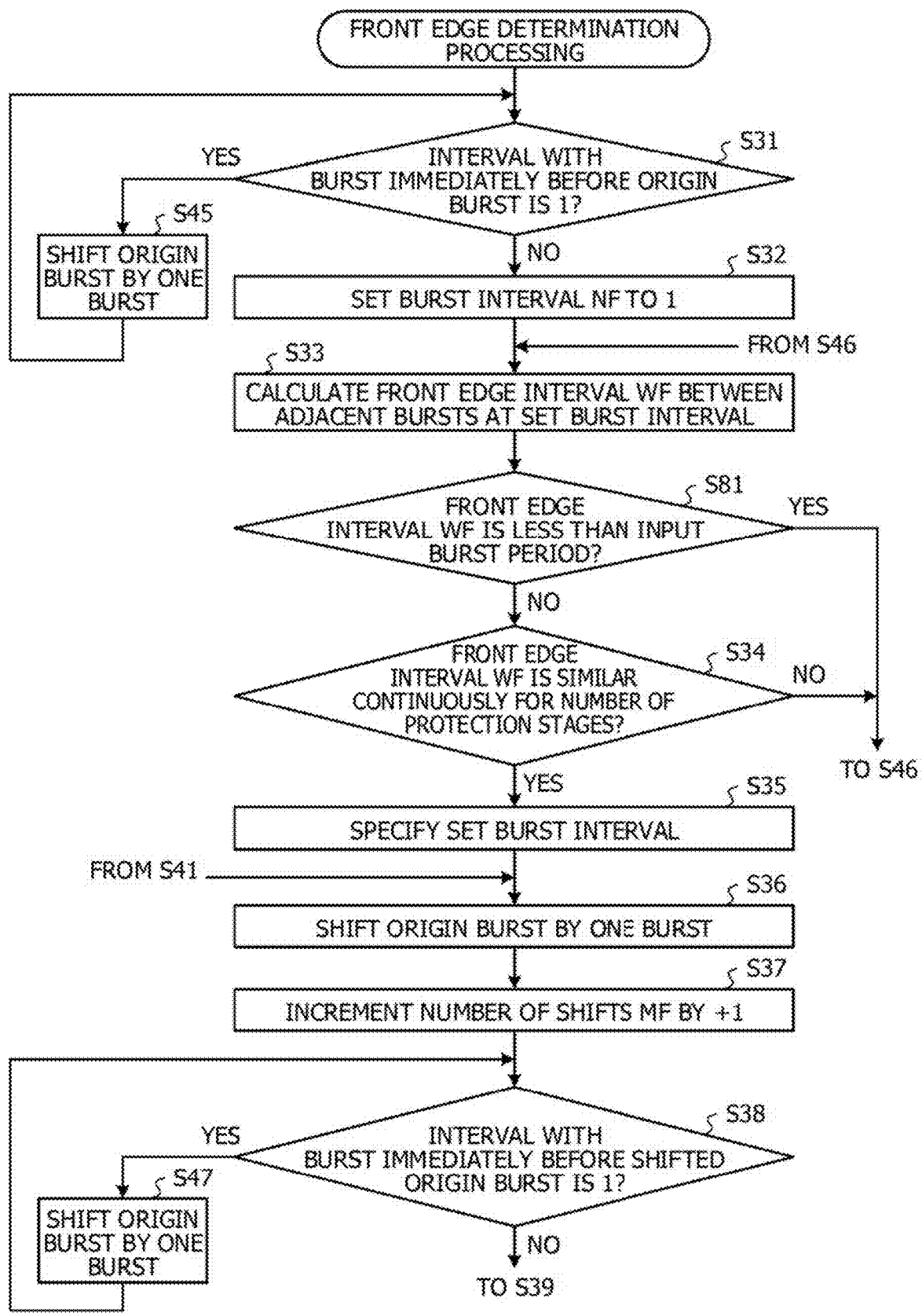
FIGS. 32A and 32B are flowcharts illustrating an example of processing operations of the analysis unit related to front edge determination processing of Embodiment 5.
Figure 32B:
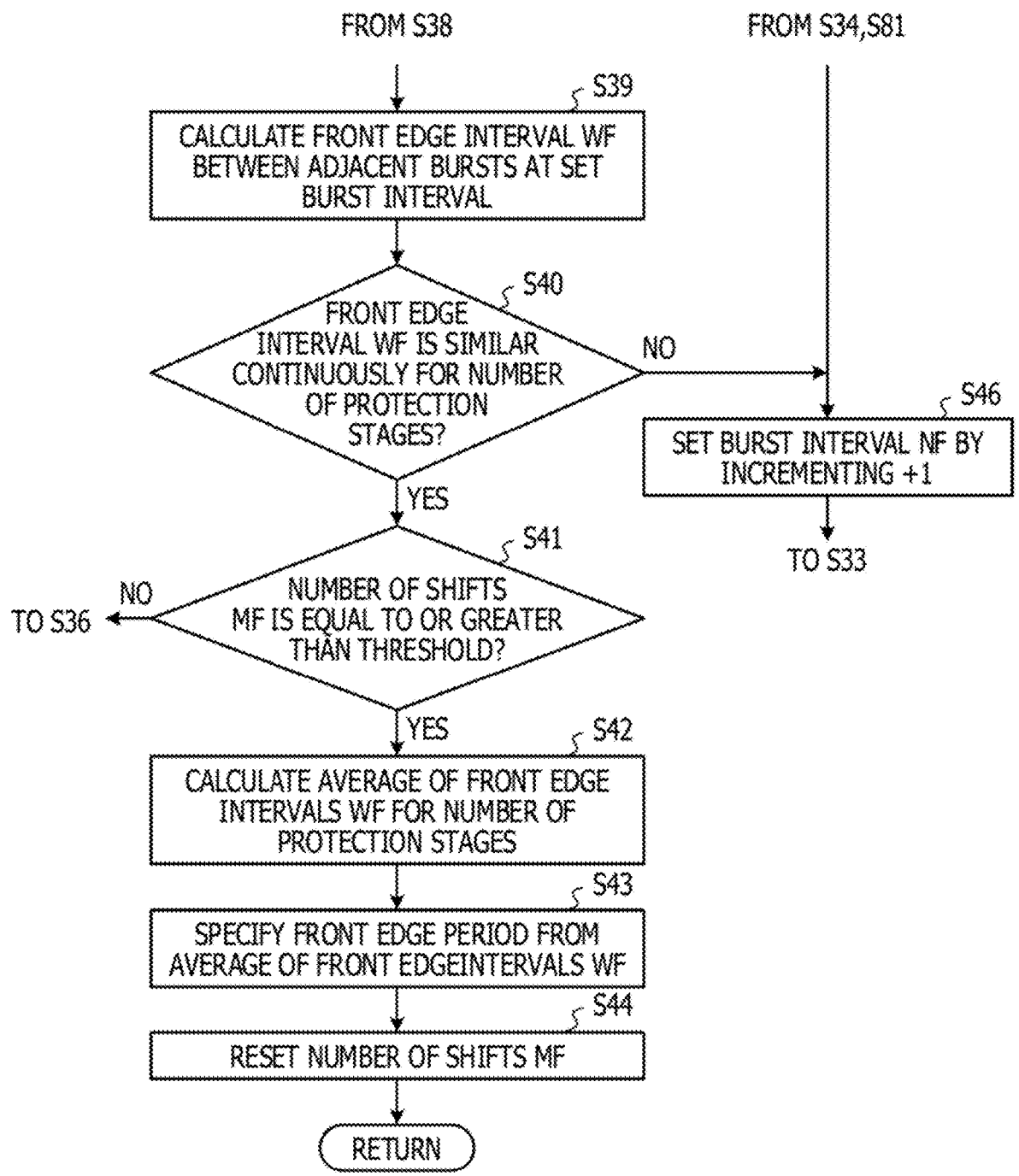

FIGS. 32A and 32B are flowcharts illustrating an example of processing operations of the analysis unit 25 related to front edge determination processing of Embodiment 5. In FIG. 32A, the first determination unit 33D calculates the front edge interval WF between adjacent bursts at the burst interval NF set in Step S33, and then determines whether or not the front edge interval WF is less than the input shortest burst period T1 (Step S81). When the front edge interval WF is not less than the input shortest burst period T1 (No in Step S81), the first determination unit 33D proceeds to Step S34 to determine whether or not the front edge intervals WF are similar continuously for the number of protection stages. When the front edge interval WF is less than the input shortest burst period T1 (Yes in Step S81), the first determination unit 33D proceeds to Step S46 to increment the set burst interval NF by +1.

When the front edge interval is not less than the input shortest burst period T1, the analysis unit 25 that executes the front edge determination processing illustrated in FIGS. 32A and 32B determines whether or not the front edge intervals are similar continuously for the number of protection stages. On the other hand, when the front edge interval is less than the input shortest burst period T1, the analysis unit 25 increments the set burst interval by +1. As a result, unnecessary processing may be omitted, such as checking for the front edge interval of less than the shortest burst period T1.

Figure 33A:
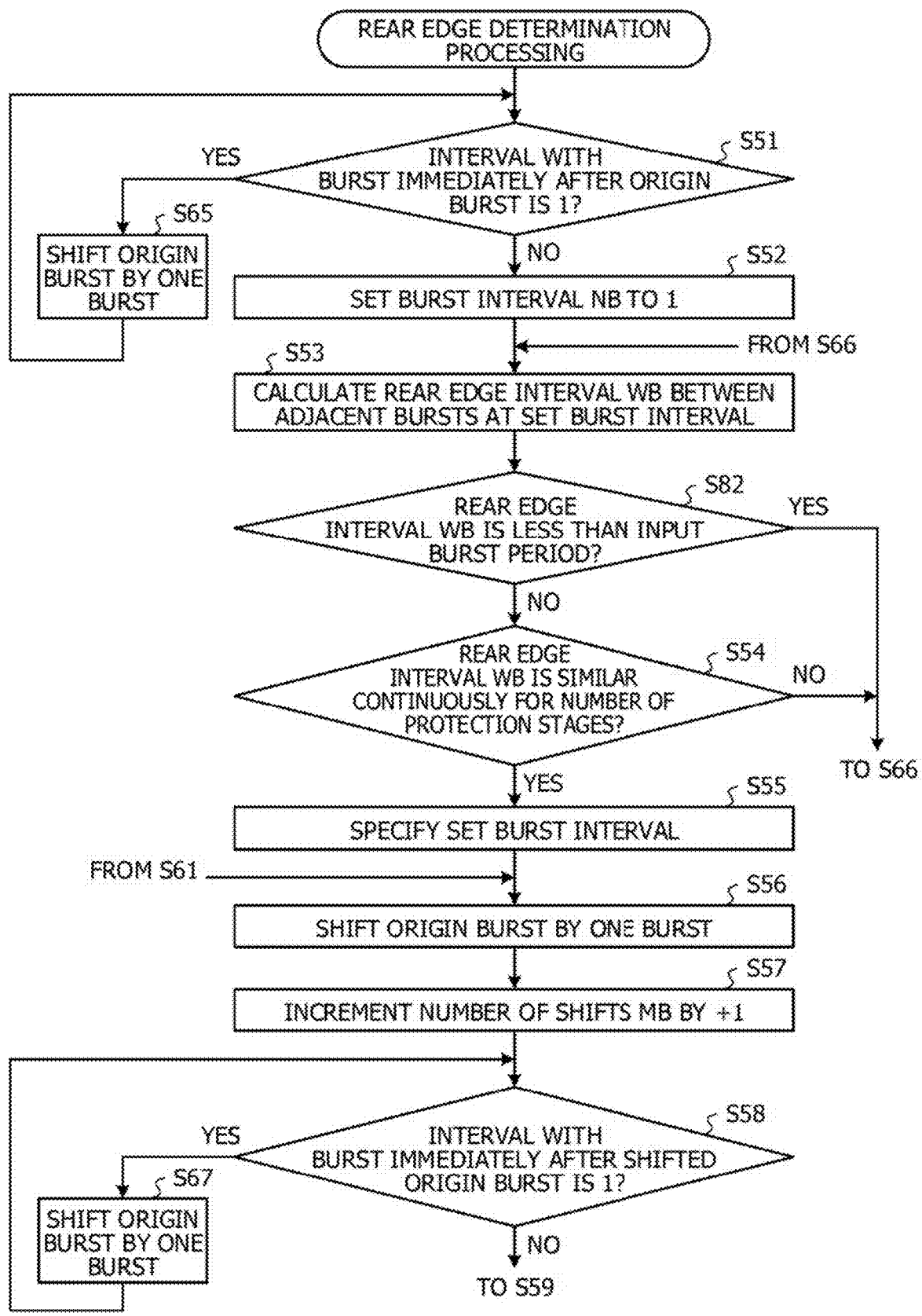
FIGS. 33A and 33B are flowcharts illustrating an example of processing operations of the analysis unit related to rear edge determination processing of Embodiment 5.
Figure 33B:
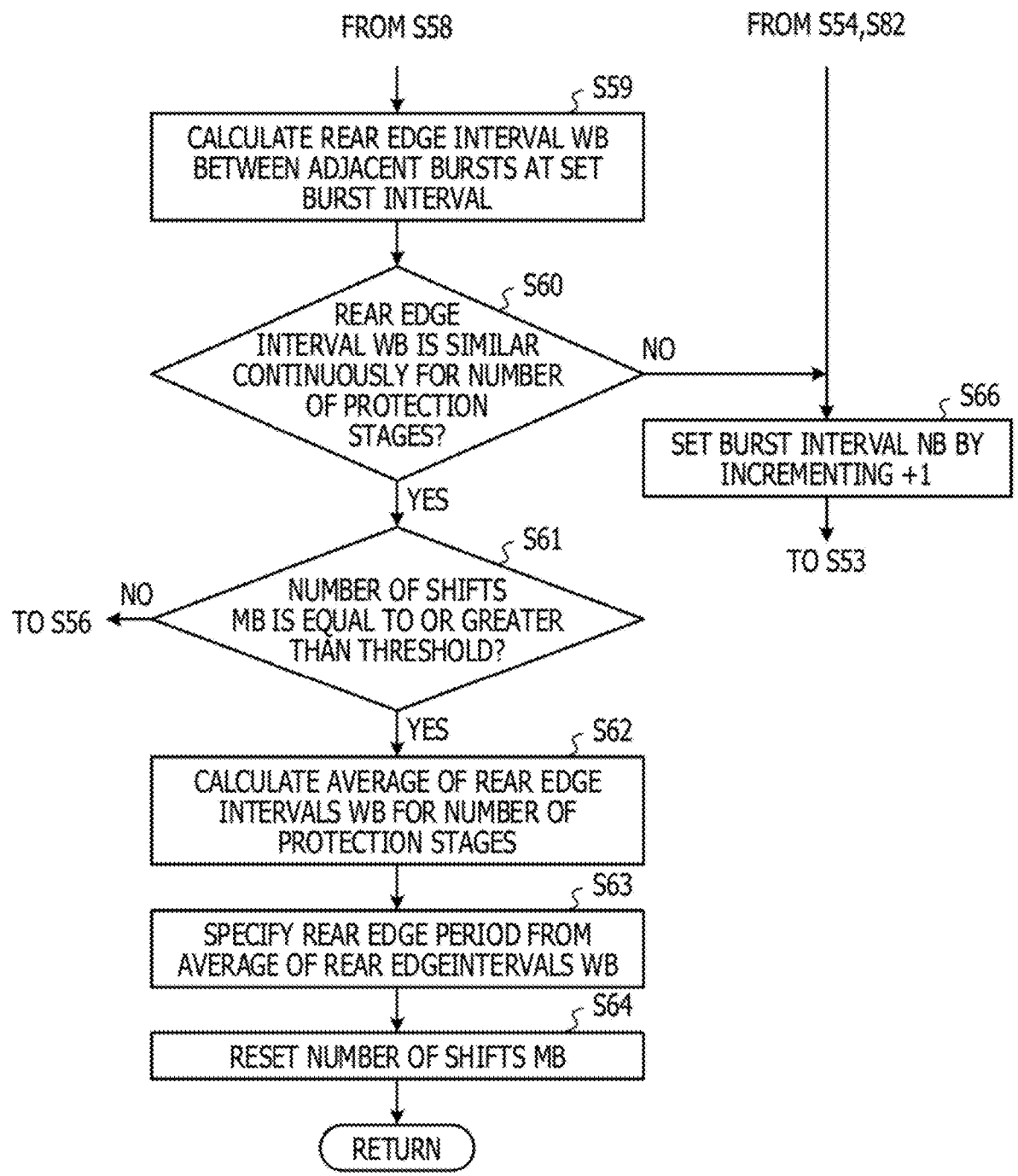

FIGS. 33A and 33B are flowcharts illustrating an example of processing operations of the analysis unit 25 related to rear edge determination processing of Embodiment 5. In FIG. 33A, the second determination unit 34D calculates the rear edge interval WB between adjacent bursts at the burst interval NB set in Step S53, and then determines whether or not the rear edge interval WB is less than the input shortest burst period T1 (Step S82). When the rear edge interval WB is not less than the input shortest burst period T1 (No in Step S82), the second determination unit 34D proceeds to Step S54 to determine whether or not the rear edge intervals WB are similar continuously for the number of protection stages.

When the rear edge interval WB is less than the input shortest burst period T1 (Yes in Step S82), the second determination unit 34D proceeds to Step S66 to increment the set burst interval NB by +1.

When the rear edge interval is not less than the input shortest burst period T1, the analysis unit 25 that executes the rear edge determination processing illustrated in FIGS. 33A and 33B determines whether or not the rear edge intervals are similar continuously for the number of protection stages. On the other hand, when the rear edge interval is less than the input shortest burst period T1, the analysis unit 25 increments the set burst interval by +1. As a result, unnecessary processing may be omitted, such as checking for the rear edge interval of less than the shortest burst period T1.

When checking for the front edge interval, the analysis unit 25 of Embodiment 5 may set the shortest period T1 among the input burst periods, thereby reducing unnecessary processing, such as specification of the front edge interval of less than the input burst period T1, to accelerate the processing. When checking for the rear edge interval, the analysis unit 25 may set the shortest period T1 among the input burst, periods, thereby reducing unnecessary processing, such as specification of the front edge interval of less than the input burst period T1, to accelerate the processing.

Embodiment 6

Figure 34:
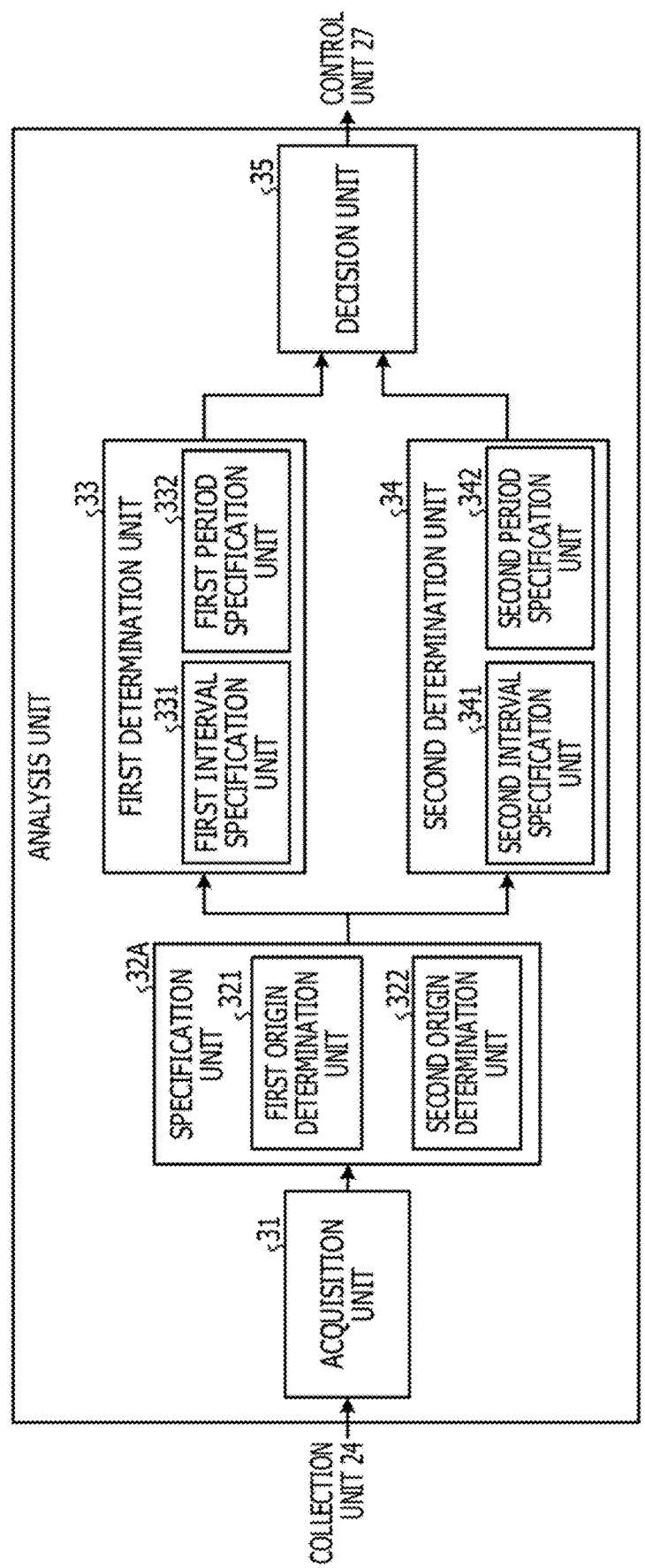
FIG. 34 is an explanatory diagram illustrating an example of a functional configuration of an analysis unit of Embodiment 6.

FIG. 34 is an explanatory diagram illustrating an example of a functional configuration of an analysis unit 25 of Embodiment 6. For convenience of explanation, the same configurations as those in the packet switch 7 according to Embodiment 1 are denoted by the same reference numerals, and thus repetitive description of such configurations and operations is omitted. The analysis unit 25 illustrated in FIG. 34 includes a specification unit 32A instead of the specification unit 32. The specification unit 32A includes a first origin determination unit 321 and a second origin determination unit 322. The first origin determination unit 321 specifies the earliest burst from the time-series burst as an origin burst. The second origin determination unit 322 determines whether or not the burst width of the specified origin burst is equal to or greater than a set threshold. When the burst width of the origin burst is not equal to or greater than the set threshold, the first origin determination unit 321 shifts the origin burst by one burst and specifies the shifted burst as the origin burst.

Figure 35:
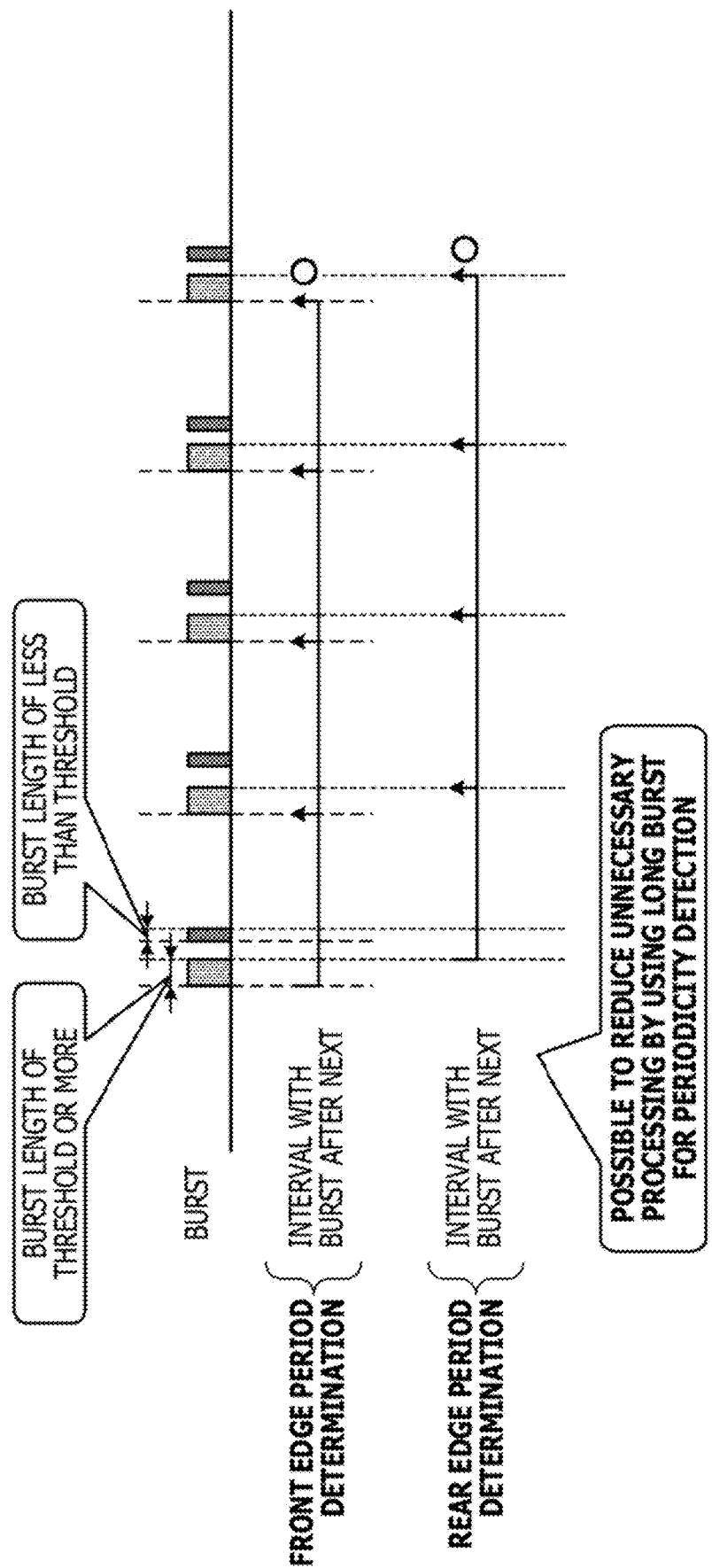
FIG. 35 is an explanatory diagram illustrating an example of a period determination operation for the interval between front edges and the interval between rear edges.

FIG. 35 is an explanatory diagram illustrating an example of a period determination operation for the interval between front edges and the interval between rear edges; When the burst width of the origin burst of the time-series burst is equal to or greater than the set threshold, the specification unit 32A specifies the burst as the origin burst. When the burst width of the origin burst is not equal to or greater than the set threshold, that is, is less than the set threshold, the specification unit 32A shifts the origin burst by one burst. As a result, by using a burst having a long burst width for periodicity detection, unnecessary processing due to a burst having a short burst width may be reduced to accelerate the processing.

Figure 36:
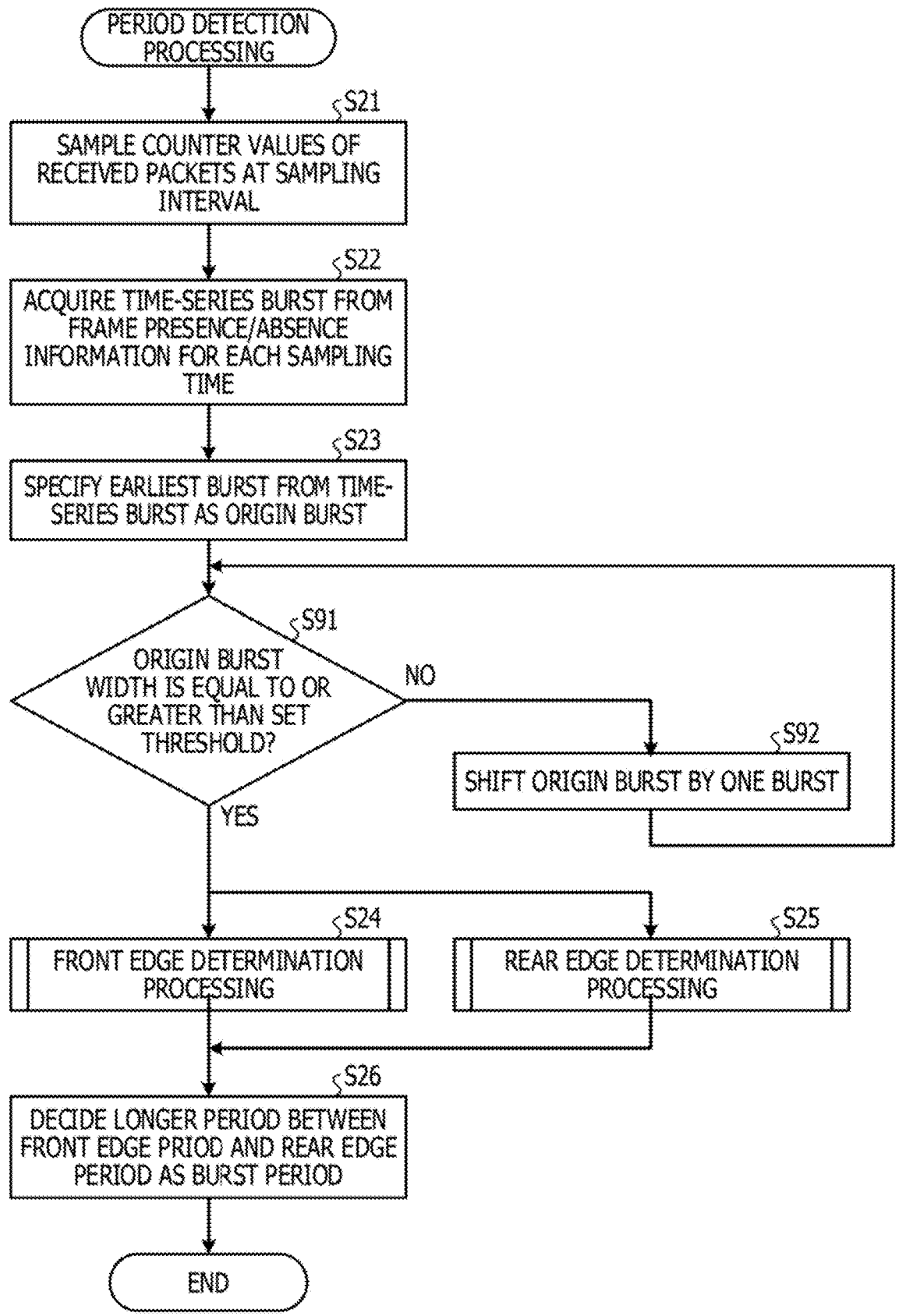
FIG. 36 is a flowchart illustrating an example of processing operations of the analysis unit related to period detection processing of Embodiment 6.

FIG. 36 is a flowchart illustrating an example of processing operations of the analysis unit 25 related to period detection processing of Embodiment 6. In FIG. 36, the second origin determination unit 322 in the analysis unit 25 specifies the earliest burst from the time-series burst as the origin burst in Step S23, and then determines whether or not the burst width of the origin burst is equal to or greater than the set threshold (Step S91). When the burst width of the origin burst is equal to or greater than the set threshold (Yes in Step S91), the first origin determination unit 321 in the analysis unit 25 executes the front edge determination processing in Step S24 and the rear edge determination processing in Step S25.

When the burst width of the origin burst is not equal to or greater than the set threshold (No in Step S91), the first origin determination unit 321 shifts the origin burst by one burst (Step S92). After shifting the origin burst by one burst, the second origin determination unit 322 proceeds to Step S91 to determine whether or not the burst width of the shifted origin burst is equal to or greater than the set threshold.

When the burst width of the origin burst of the time-series burst is equal to or greater than the set threshold, the analysis unit 25 of Embodiment 6 specifies the burst as the origin burst. When the burst width of the origin burst is not equal to or greater than the set threshold, that is, is less than the set threshold, the analysis unit 25 shifts the origin burst by one burst. As a result, by using a burst having a tong burst width for periodicity detection, unnecessary processing due to a burst having a short burst width may be reduced to accelerate the processing.

Embodiment 7

Figure 37:
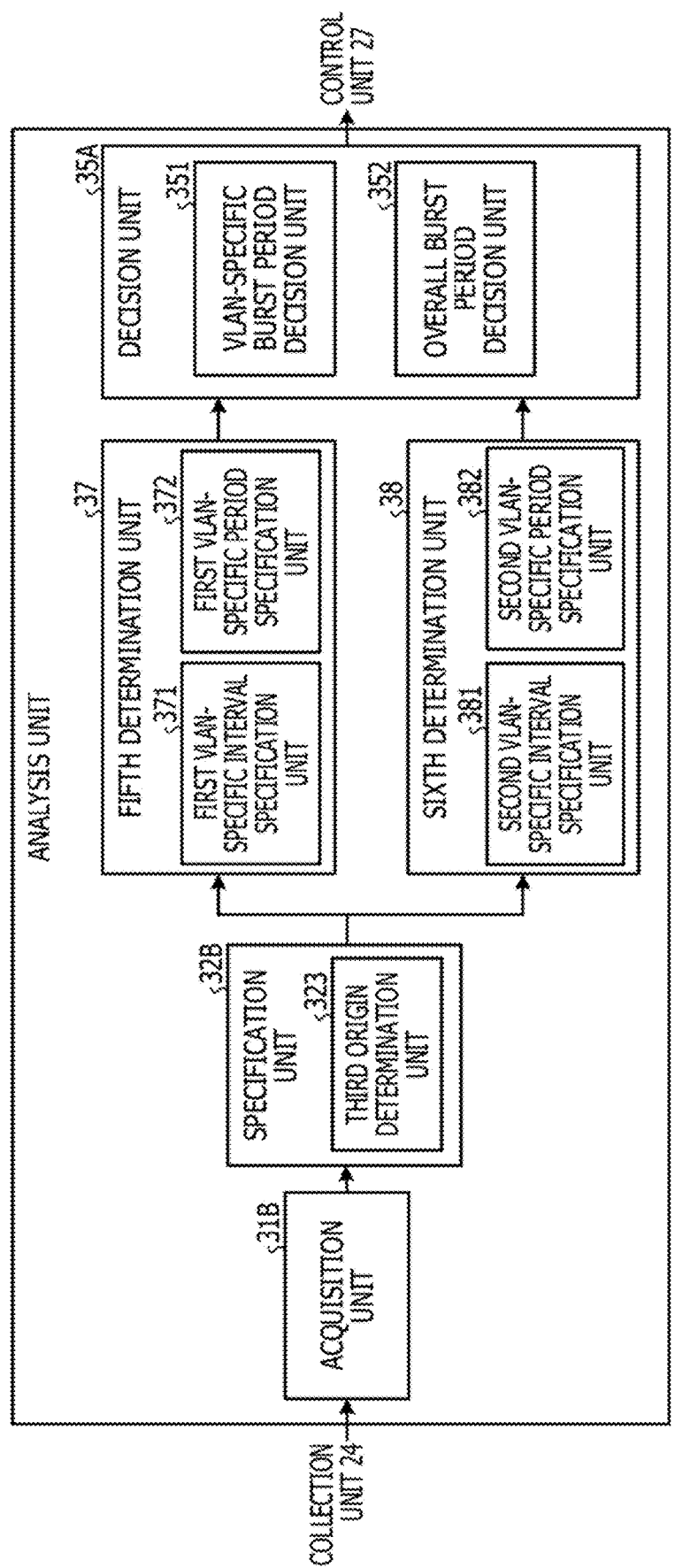
FIG. 37 is an explanatory diagram illustrating an example of a functional configuration of an analysis unit of Embodiment 7.

FIG. 37 is an explanatory diagram illustrating an example of a functional configuration of an analysis unit 25 of Embodiment 7. For convenience of explanation, the same configurations as those in the packet switch 7 according to Embodiment 1 are denoted by the same reference numerals, and thus repetitive description of such configurations and operations is omitted. The analysis unit 25 illustrated in FIG. 37 includes an acquisition unit 31B instead of the acquisition unit 31, a specification unit 32B instead of the specification unit 32, a fifth determination unit 37 instead of the first determination unit 33, a sixth determination unit 38 instead of the second determination unit 34, and a decision unit 35A instead of the decision unit 35.

The acquisition unit 31B acquires a burst for each VLAN type from the time-series burst. The specification unit 32B includes a third origin determination unit 323 instead of the first origin determination unit 321. The third origin determination unit 323 specifies the origin burst as the earliest burst for each VLAN type from the time-series bursts for each VLAN type.

The fifth determination unit 37 includes a first VLAN-specific interval specification unit 371 and a first VLAN-specific period specification unit 372. The first VLAN-specific interval specification unit 371 specifies the front edge interval for each VLAN type from the time-series burst. The first VLAN-specific period specification unit 372 specifies the front edge period for each VLAN type from the front edge interval specified for each VLAN type.

The sixth determination unit 38 includes a second VLAN-specific interval specification unit 381 and a second VLAN-specific period specification unit 382. The second VLAN-specific interval specification unit 381 specifies the rear edge interval for each VLAN type from the time-series burst. The second VLAN-specific period specification unit 382 specifies the rear edge period for each VLAN type from the rear edge interval specified for each VLAN type.

The decision unit 35A includes a VLAN-specific burst period decision unit 351 and an overall burst period decision unit 352. The VLAN-specific burst period decision unit 351 decides the longer period between the front edge period and the rear edge period as the VLAN type burst period for each VLAN type. The overall burst period decision unit 352 decides the longer period among the decided VLAN type burst periods as the overall burst period, and notifies the control unit 27 of the decided overall burst period.

Figure 38:
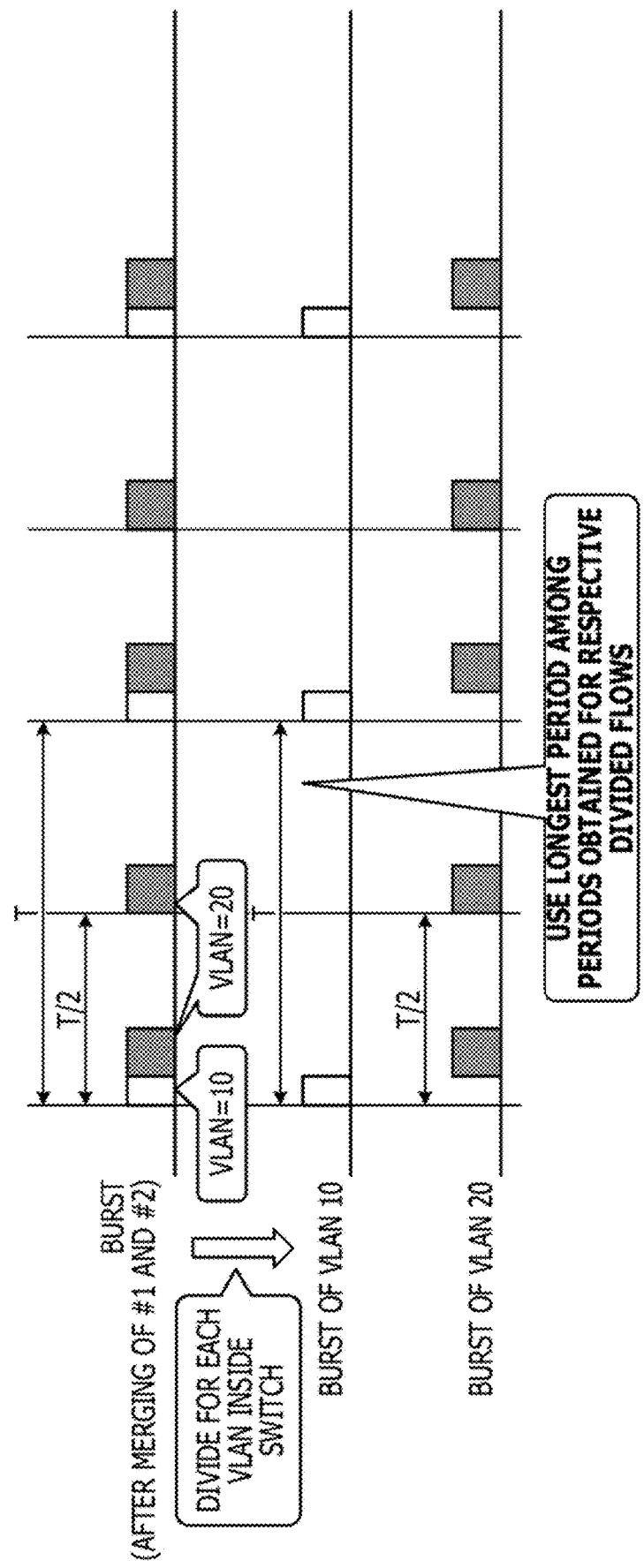
FIG. 38 is an explanatory diagram illustrating an example of an operation of acquiring a burst of VLAN type.

FIG. 38 is an explanatory diagram illustrating an example of an operation of acquiring a burst of VLAN type; When a state where bursts of different VLAN types (VLAN 10 and VLAN 20) are mixed in the time-series input burst illustrated in FIG. 38 may be recognized in advance, the burst period is decided for each VLAN type. The acquisition unit 31B separates the burst into the time-series burst of the VLAN 10 and the time-series burst of the VLAN 20. The first VLAN-specific interval specification unit 371 specifies the front edge interval of the VLAN 10 from the time-series burst of the VLAN 10 and also specifies the front edge interval of the VLAN 20 from the time-series burst of the VLAN 20. It is assumed that the first VLAN-specific interval specification unit 371 executes the same processing as that executed by the first interval specification unit 331 for each VLAN type. The first VLAN-specific period specification unit 372 specifies the front edge period of the VLAN 10 from the front edge interval of the VLAN 10 and also specifies the front edge period of the VLAN 20 from the front edge interval of the VLAN 20. It is assumed that the first VLAN-specific period specification unit 372 executes the same processing as that executed by the first period specification unit 332 for each VLAN type.

The second VLAN-specific interval specification unit 381 specifies the rear edge interval of the VLAN 10 from the time-series burst of the VLAN 10 and also specifies the rear edge interval of the VLAN 20 from the time-series burst of the VLAN 20. It is assumed that the second VLAN-specific interval specification unit 381 executes the same processing as that executed by the second interval specification unit 341 for each VLAN type. The second VLAN-specific period specification unit 382 specifies the rear edge period of the VLAN 10 from the rear edge interval of the VLAN 10 and also specifies the rear edge period of the VLAN 20 from the rear edge interval of the VLAN 20. It is assumed that the second VLAN-specific period specification unit 382 executes the same processing as that executed by the second period specification unit 342 for each VLAN type.

The VLAN-specific burst period decision unit 351 decides the longer period between the front edge period of the VLAN 10 and the rear edge period of the VLAN 10 as the period of the VLAN 10. The VLAN-specific burst period decision unit 351 also decides the longer period between the front edge period of the VLAN 20 and the rear edge period of the VLAN 20 as the period of the VLAN 20. The overall burst period decision unit 352 decides the longer period between the period of the VLAN 10 and the period of the VLAN 20 as the overall burst period. As a result, erroneous detection of the burst period may be reduced even in a burst in which different VLAN types are mixed.

Figure 39:
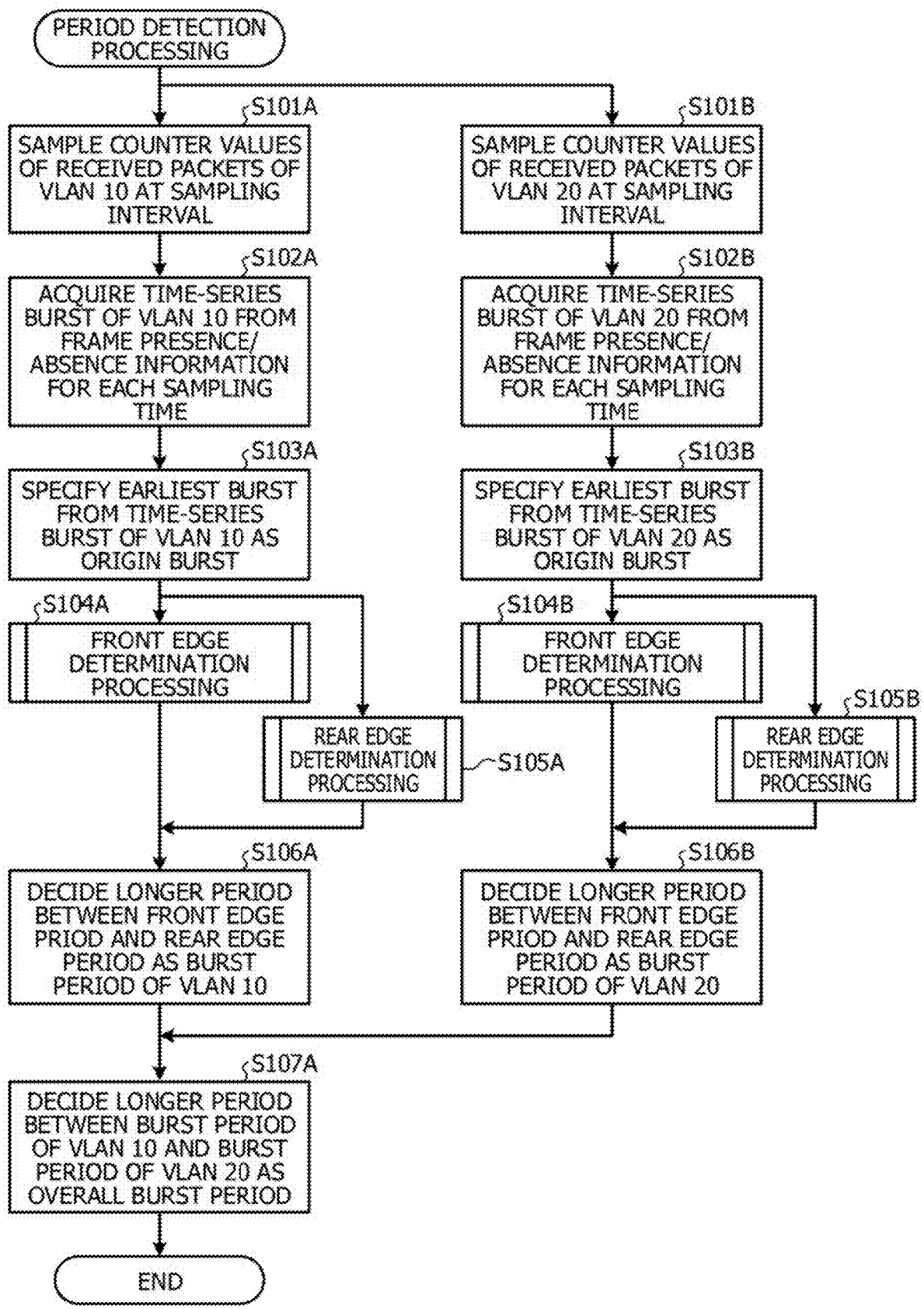
FIG. 39 is a flowchart illustrating an example of processing operations of the analysis unit related to period detection processing of Embodiment 7.

FIG. 39 is a flowchart illustrating an example of processing operations of the analysis unit 25 related to period detection processing of Embodiment 7. In FIG. 39, the acquisition unit 318 in the analysis unit 25 samples count values of the received packets for each VLAN type at a predetermined sampling interval. That is, the acquisition unit 31B samples the count values of the received packets of the VLAN 10 at a predetermined sampling interval (Step 101A) and also samples the count values of the received packets of the VLAN 20 at a predetermined sampling interval (Step S101B).

The acquisition unit 31B acquires frame presence/absence information for each sampling time from the sampling result of VLAN 10, and acquires a time-series burst of VLAN 10 from the acquired frame presence/absence information (Step S102A). The specification unit 32B specifies the earliest burst from the time-series burst of VLAN 10 as an origin burst of VLAN 10 (Step S103A).

After the origin burst of VLAN 10 is specified, the fifth determination unit 37 executes front edge determination processing of specifying a front edge period of VLAN 10 from the front edge interval between the adjacent bursts with the origin burst in the time-series burst as the starting point (Step S104A). In the front edge determination processing, the front edge period of the VLAN 10 is specified by executing the processing illustrated in FIGS. 16A and 16B.

After the origin burst of VLAN 10 is specified, the sixth determination unit 38 executes rear edge determination processing of specifying a rear edge period of VLAN 10 from the rear edge interval between the adjacent bursts with the origin burst in the time-series burst as the starting point (Step S105A). In the rear edge determination processing, the rear edge period of the VLAN 10 is specified by executing the processing illustrated in FIGS. 17A and 17B.

The decision unit 35A compares the front edge period of VLAN 10 specified in Step S104A with the rear edge period of VLAN 10 specified in Step S105A to decide the longer period as the burst period of VLAN 10 (Step S106A).

The acquisition unit 31B acquires frame presence/absence information for each sampling time from the sampling result of VLAN 20 in Step S101B, and acquires a time-series burst of VLAN 20 from the acquired frame presence/absence information (Step S102B). The specification unit 32B specifies the earliest burst from the time-series burst of VLAN 20 as an origin burst of VLAN 20 (Step S103B).

After the origin burst of VLAN 20 is specified, the fifth determination unit 37 executes front edge determination processing of specifying a front edge period of VLAN 20 from the front edge interval between the adjacent bursts with the origin burst in the time-series burst as the starting point (Step S104B). In the front edge determination processing, the front edge period of the VLAN 20 is specified by executing the processing illustrated in FIGS. 16A and 16B.

After the origin burst of VLAN 20 is specified, the sixth determination unit 38 executes rear edge determination processing of specifying a rear edge period of VLAN 20 from the rear edge interval between the adjacent bursts with the origin burst in the time-series burst as the starting point (Step S105B). In the rear edge determination processing, the rear edge period of the VLAN 20 is specified by executing the processing illustrated in FIGS. 17A and 17B.

The decision unit 35A compares the front edge period of VLAN 20 specified in Step S104B with the rear edge period of VLAN 20 specified in Step S105B to decide the longer period as the burst period of VLAN 20 (Step S106B). The decision unit 35A compares the burst period of VLAN 10 decided in Step S106A with the burst period of VLAN 20 decided in Step S106B to decide the longer period as the overall burst period (Step S107A). The decision unit 35A then terminates the processing operations illustrated in FIG. 39.

The analysis unit 25 of Embodiment 7 specifies the front edge period and the rear edge period for each VLAN type even when bursts of different VLAN types are mixed. The analysis unit 25 decides the longer period between the front edge period and the rear edge period for each VLAN type as the burst period for each VLAN type. The analysis unit 25 decides the longer period among the burst periods for each VLAN type as the overall burst period. As a result, erroneous detection of the burst period may be reduced even in a burst in which different VLAN types are mixed.

Embodiment 8

Figure 40:
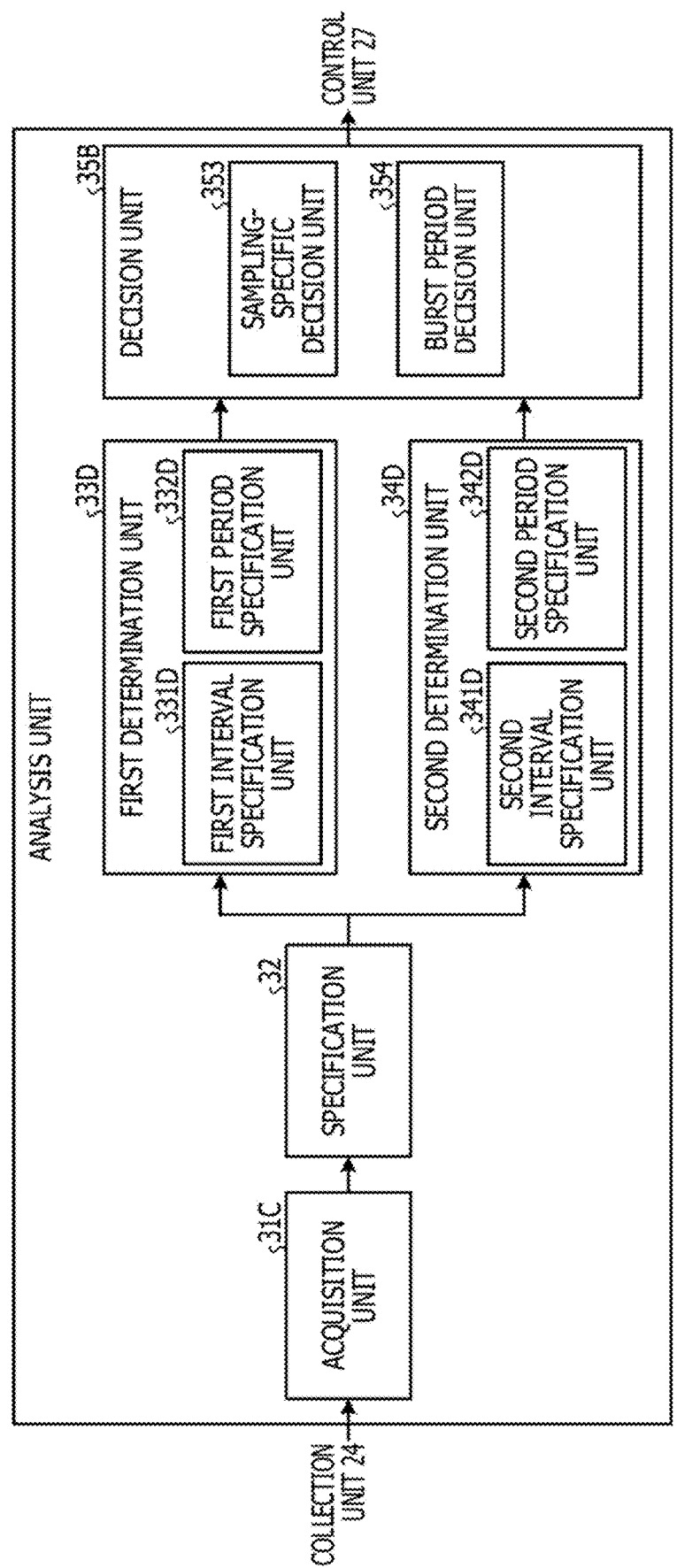
FIG. 40 is an explanatory diagram illustrating an example of functional configuration of an analysis unit of Embodiment 8.

FIG. 40 is an explanatory diagram illustrating an example of a functional configuration of an analysis unit 25 of Embodiment 8. For convenience of explanation, the same configurations as those in the packet switch 7 according to Embodiment 1 are denoted by the same reference numerals, and thus repetitive description of such configurations and operations is omitted. The analysis unit 25 illustrated in FIG. 40 includes an acquisition unit 31C instead of the acquisition unit 31, a first determination unit 33D instead of the first determination unit 33, a second determination unit 34D instead of the second determination unit 34, and a decision unit 35B instead of the decision unit 35.

The acquisition unit 31C samples count values of the received packets at each first sampling interval. The acquisition unit 31C acquires a time-series burst of the first sampling interval from the frame presence/absence information for each sampling time. The acquisition unit 31C samples count values of the received packets at each second sampling interval different from the first sampling interval. The acquisition unit 31C acquires a time-series burst of the second sampling interval from the frame presence/absence information for each sampling time. When the first sampling interval is set to 10µ seconds, for example, the second sampling interval is set to 9µ seconds, 11µ seconds, or the like, for example.

The first determination unit 33D includes a first interval specification unit 331D and a first period specification unit 332D. The first interval specification unit 331D specifies the front edge interval from the time-series burst of the first sampling interval and also specifies the front edge interval from the time-series burst of the second sampling interval. It is assumed that the first interval specification unit 331D executes the same processing as that executed by the first interval specification unit 331 for each sampling interval. The first period specification unit 332D decides the front edge period of the first sampling interval from the front edge interval of the first sampling interval, and also decides the front edge period of the second sampling interval from the front edge interval of the second sampling interval. It is assumed that the first period specification unit 332D executes the same processing as that executed by the first period specification unit 332 for each sampling interval.

The second determination unit 34D includes a second interval specification unit 341D and a second period specification unit 342D. The second interval specification unit 341D specifies the rear edge interval from the time-series burst of the second sampling interval and also specifies the rear edge interval from the time-series burst of the second sampling interval. It is assumed that the second interval specification unit 341D executes the same processing as that executed by the second interval specification unit 341 for each sampling interval. The first period specification unit 332D decides the rear edge period of the first sampling interval from the rear edge interval of the first sampling interval, and also decides the rear edge period of the second sampling interval from the rear edge interval of the second sampling interval. It is assumed that the second period specification unit 342D executes the same processing as that executed by the second period specification unit 342 for each sampling interval.

The decision unit 35B includes a sampling-specific decision unit 353 and a burst period decision unit 354. The sampling-specific decision unit 353 decides the longer period between the front edge period of the first sampling interval and the rear edge period of the first sampling interval as the burst period of the first sampling interval. The sampling-specific decision unit 353 decides the longer period between the front edge period of the second sampling interval and the rear edge period of the second sampling interval as the burst period of the second sampling interval. The burst period decision unit 354 determines whether or not the difference between the burst period of the first sampling interval and the burst period of the second sampling interval is within an allowable range. When the difference is within the allowable range, the burst period decision unit 354 decides the burst period of the first sampling interval as the overall burst period, and notifies the control unit 27 of the decided overall burst period.

Figure 41:
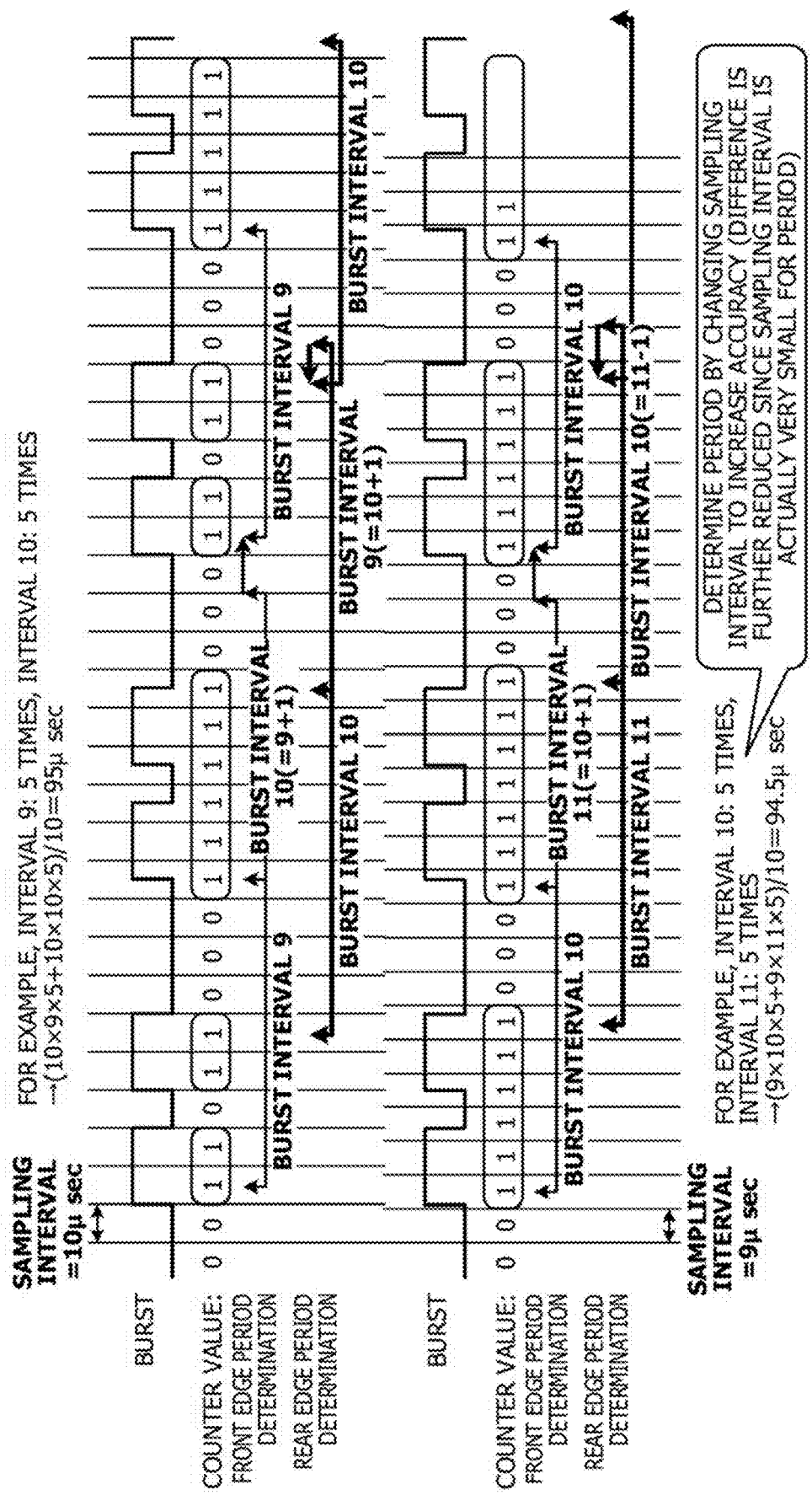
FIG. 41 is an explanatory diagram illustrating an example of a period determination operation for the interval between front edges and the interval between rear edges for each sampling interval.

FIG. 41 is an explanatory diagram illustrating an example of a period determination operation for the interval between front edges and the interval between rear edges for each sampling interval; After determining the period at the first sampling interval, the analysis unit 25 performs the period determination again at a second sampling interval different from the first sampling interval. The analysis unit 25 increases the accuracy of the burst period when the burst period detected at the first sampling interval is the same as the burst period detected at the second sampling interval. For example, when the burst interval of "9" is 5 times and the burst interval of "10" is 5 times at the first sampling interval (10μ seconds), the average is calculated by (10 9×9×5+10× 10×5)/10 as a burst period of 95μ seconds. On the other hand, when the burst interval of "10" is 5 times and the burst interval of "11" is 5 times at the second sampling interval (9μ seconds), the average is calculated by (10×10×5+10× 11×5)/10 as a burst period of 94.5μ seconds. Since the difference 0.5μ seconds between the burst period of the first sampling interval and the burst period of the second sampling interval is within an allowable range, it may be recognized that the burst period of the first sampling interval has high accuracy.

Figure 42:
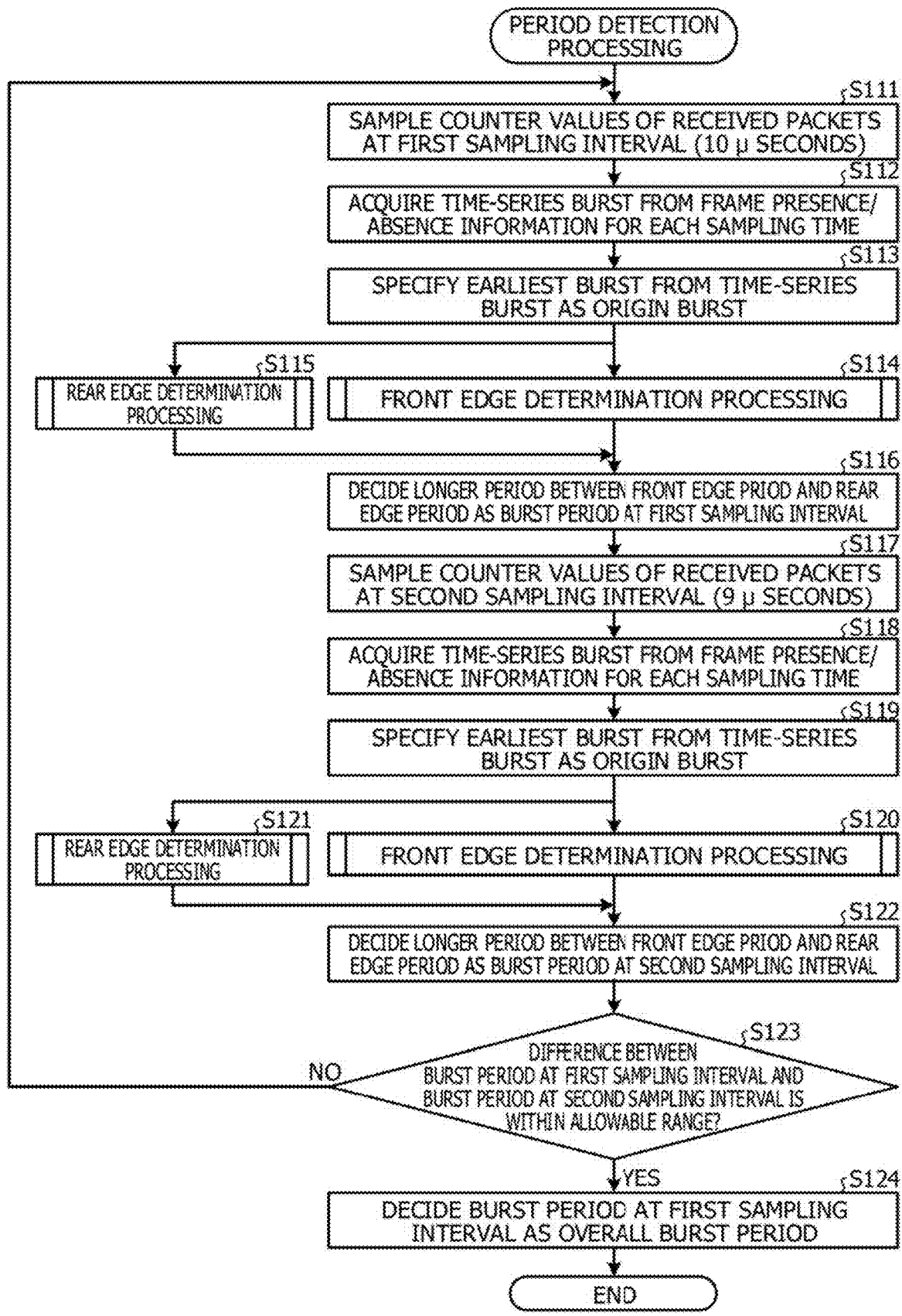
FIG. 42 is a flowchart illustrating an example of processing operations of the analysis unit related to period detection processing of Embodiment 8.

FIG. 42 is a flowchart illustrating an example of processing operations of the analysis unit 25 related to period detection processing of Embodiment 8. In FIG. 42, the acquisition unit 31C samples count values of the received packets at a first sampling interval (10μ seconds) (Step S111). The acquisition unit 31C acquires a time-series burst of the first sampling interval from the frame presence/absence information for each first sampling interval (Step S112). The specification unit 32 specifies the earliest burst from the time-series burst of the first sampling interval as an origin burst of the first sampling interval (Step S113).

After the origin burst of the first sampling interval is specified, the first determination unit 33D executes front edge determination processing of specifying a front edge period from the front edge interval between the adjacent bursts with the origin burst in the time-series burst as the starting point (Step S114). In the front edge determination processing, the front edge period at the first sampling interval is specified by executing the processing illustrated in FIGS. 16A and 16B.

After the origin burst of the first sampling interval is specified, the second determination unit 34D executes rear edge determination processing of specifying a rear edge period from the rear edge interval between the adjacent bursts with the origin burst in the time-series burst as the starting point (Step S115). In the rear edge determination processing, the rear edge period at the first sampling interval is specified by executing the processing illustrated in FIGS. 17A and 17B.

The decision unit 35B compares the front edge period of the first sampling interval specified in Step S114 with the rear edge period of the first sampling interval specified in Step S115, and decides the longer period as the burst period of the first sampling interval (Step S116).

After the burst period of the first sampling interval is decided, the acquisition unit 31C samples count values of the received packets at a predetermined sampling interval (9μ seconds) (Step S117). The acquisition unit 31C acquires a time-series burst of the second sampling interval from the frame presence/absence information for each second sampling interval (Step S118). The acquisition unit 31C specifies the earliest burst from the time-series burst of the second sampling interval as an origin burst (Step S119).

After the origin burst of the second sampling interval is specified, the first determination unit 33D executes front edge determination processing of specifying a front, edge period from the front edge interval between the adjacent bursts with the origin burst in the time-series burst as the starting point (Step S120). In the front edge determination processing, the front edge period at the second sampling interval is specified by executing the processing illustrated in FIGS. 16A and 16B.

After the origin burst of the second sampling interval is specified, the second determination unit 34D executes rear edge determination processing of specifying a rear edge period from the rear edge interval between the adjacent bursts with the origin burst in the time-series burst as the starting point (Step S121). In the rear edge determination processing, the rear edge period at the second sampling interval is specified by executing the processing illustrated in FIGS. 17A and 17B.

The decision unit 35B compares the front edge period of the second sampling interval specified in Step S120 with the rear edge period of the second sampling interval specified in Step S121, and decides the longer period as the burst period of the second sampling interval (Step S122).

The decision unit 35B determines whether or not the difference between the burst period of the first sampling interval decided in Step S116 and the burst period of the second sampling interval decided in Step S122 is within an allowable range (Step S123). When the difference between the burst period of the first sampling interval and the burst period of the second sampling interval is within the allowable range (Yes in Step S123), the decision unit 35B decides the burst period of the first sampling interval as the overall burst period (Step S124). The decision unit 35B then terminates the processing operations illustrated in FIG. 42.

On the other hand, when the difference between the burst period of the first sampling interval and the burst period of the second sampling interval is not within the allowable range (No in Step S123), the decision unit 35B proceeds to Step S111 to perform sampling at the first sampling interval.

The analysis unit 25 of Embodiment 8 specifies the front edge period and the rear edge period from the time-series burst acquired at the first sampling interval, and decides the longer period as the burst period of the first sampling interval. The analysis unit 25 also specifies the front edge period and the rear edge period from the time-series burst acquired at the second sampling interval, and decides the longer period as the burst period of the second sampling interval. When the difference between the burst period of the first sampling interval and the burst period of the second sampling interval is within the allowable range, the analysis unit 25 decides the burst period of the first sampling interval as the overall burst period. As a result, a highly accurate burst period may be provided.

Although it is assumed in the above embodiments that the MFH packets are high-priority packets and the non-MFH packets are low-priority packets, the packets are not limited to these two kinds but may be changed accordingly. For example, when packets having three kinds of priority are used, three gates are provided and set states of the respective gates are stored in the list table 26. Although the description is given of the case where the true periodicity is estimated for the MFH packets, which are the high-priority packets, as the arrival packets, in the above embodiments, the packets are not limited thereto but may be changed accordingly, and packets of another kind, such as the non-MFH packets, may be used.

Although the description is given of the case where the count values of the number of packets received are sampled at the sampling interval in the above embodiments, the embodiments are not limited to the number of packets received but may be changed accordingly, and the number of bytes received may be used. Although the description is given of the case where a time-series burst is acquired from the frame presence/absence information at each sampling time, the embodiments are not limited to the frame presence/absence information but may be changed accordingly, and presence/absence information on the number of bytes received may be used.

Although 1 m second is used as a duration of a sub-frame of a radio signal in the fourth generation mobile communication system in the above embodiments, the duration of the sub-frame is not limited to 1 m second but may be changed accordingly so as to correspond to a radio signal in the fifth generation mobile communication system, for example.

Although the analysis unit 25, the control unit 27, and the list table 26 are provided in the packet processor 12 in the above embodiments, the analysis unit 25, the control unit 27, and the list table 26 may be provided in the FPGA 12D or the CPU 15, for example, and such modification may be made accordingly. Alternatively, the analysis unit 25, the control unit 27, and the list table 26 may be provided over the FPGA 12D and the CPU 15, and such modification may be made accordingly. An ASIC may be used instead of the FPGA 12D, and such modification may be made accordingly.

The constituent elements in the units illustrated in the drawings do not necessarily have to be physically configured as illustrated therein. For example, specific modes of dispersion and integration of the respective units are not limited to those illustrated in the drawings, but all or some of the elements may be configured as functionally or physically dispersed and integrated by arbitrary unit depending on various loads, usage, and the like.

As for the various processing functions executed in each device, all or any part thereof may be executed over a central processing unit (CPU) (or a microcomputer such as a microprocessor unit (MPU) or a microcontroller unit (MCU)). Needless to say, all or any part of the various processing functions may be executed over a program for analysis and execution using the CPU (or microcomputer such as the MPU or MCU) or over wired logic hardware.

Figure 43:
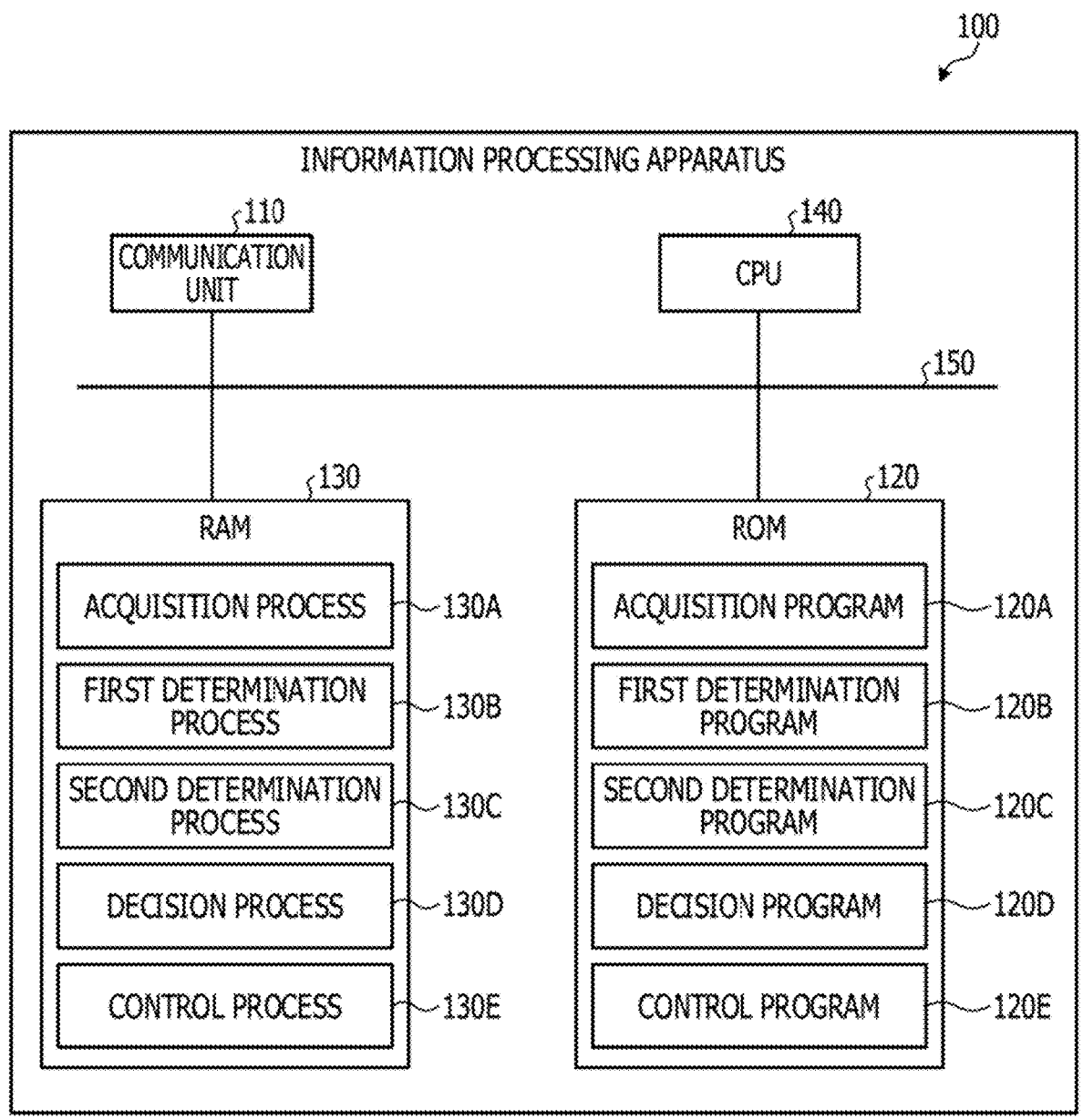
FIG. 43 is an explanatory diagram illustrating an example of an information processing apparatus that executes a packet processing program.

The various processing described in the embodiments may be realized by executing prepared programs with a processor such as the CPU in an information processing apparatus. Hereinafter, description is given of an example of an information processing apparatus that executes a program having the same functions as those of the above embodiments. FIG. 43 is an explanatory diagram illustrating an example of an information processing apparatus that executes a packet processing program.

An information processing apparatus 100 that executes the packet processing program illustrated in FIG. 43 includes a communication unit 110, a read-only memory (ROM) 120, a random-access memory (RAM) 130, and a CPU 140. The communication unit 110, the ROM 120, the RAM 130, and the CPU 140 are coupled to each other through a bus 150. The communication unit 110 outputs either a first packet or a second packet among received packets.

The ROM 120 has the packet processing program previously stored therein to exert the same functions as those in the above embodiments. The ROM 120 has an acquisition program 120A, a first determination program 120B, a second determination program 120C, a decision program 120D, and a control program 120E stored therein as the packet processing programs. The packet processing program may be recorded in a computer-readable recording medium with an unillustrated drive, rather than the ROM 120. As the recording medium, for example, a compact disc (CD)-ROM, a digital versatile disc (DVD), a portable recording medium such as, a Universal Serial Bus (USB) memory, a semiconductor memory such as a flash memory, and the like may be used.

The CPU 140 reads the acquisition program 120A from the ROM 120 to function over the RAM 130 as an acquisition process 130A. The CPU 140 reads the first determination program 120B from the ROM 120 to function over the RAM 130 as a first determination process 130B. The CPU 140 reads the second determination program 120C from the ROM 120 to function over the RAM 130 as a second determination process 130C. The CPU 140 reads the decision program 120D from the ROM 120 to function over the RAM 130 as a decision process 130D. The CPU 140 reads the control program 120E from the ROM 120 to function over the RAM 130 as a control process 130E.

The CPU 140 samples the count values of a plurality of received packets at each sampling interval, and acquires a time-series burst indicating the presence/absence of the packet from the sampling result. The CPU 140 decides the similar front edge interval as the front edge period when the intervals between the front edges of adjacent bursts at a specified burst interval, with the origin burst in the time-series burst as the starting point, are similar continuously for the number of protection stages. The CPU 140 decides the similar rear edge interval as the rear edge period when the intervals between the rear edges of adjacent bursts at a specified burst interval, with the origin burst in the time-series burst as the starting point, are similar continuously for the number of protection stages. The CPU 140 decides the longer period between the front edge period and the rear edge period as the burst period. The CPU 140 controls transfer of the received packets based on the decided burst period. As a result, output delay of arriving packets may be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A packet processing device comprising:
a memory; and
circuitry coupled the memory and configured to perform:
sampling received packets at a predetermined interval;
detecting a plurality of bursts each of which includes the received packets continuously detected by the sampling, each of the plurality of bursts having a respective time length from a front edge to a rear edge;
calculating a front edge period that is a cycle length of the front edge by using the front edge associated with each of the plurality of bursts detected;
calculating a rear edge period that is a cycle length of the rear edge by using the rear edge associated with each of the plurality of bursts detected;
deciding the longer period between the front edge period and the rear edge period as a burst period, the deciding of the burst period being configured to decide the front edge period as the burst period in response to the front edge period longer than the rear edge period and decide the rear edge period as the burst period in response to the rear edge period longer than the front edge period; and controlling transfer of the received packets based on the decided burst period.

2. The packet processing device according to claim 1, wherein the front edge period is calculated based on the received packet detected first in each of the plurality of bursts, the rear edge period is calculated based on the received packet detected last in each of the plurality of bursts.

3. The packet processing device according to claim 1, wherein the calculating of the front edge period is configured to use a first origin burst from among the plurality of bursts to calculate the front edge period, the first origin burst being a burst following a time interval in which no burst is detected in consecutively two or more samples immediately before the origin burst to calculate the front edge period, and the calculating of the rear edge period is configured to use a second origin burst from among the plurality of bursts to calculate the rear edge period, the second origin bursts being a burst followed by a time interval in which no burst is detected in consecutively two or more samples immediately after the origin burst to calculate the rear edge period.

4. The packet processing device according to claim 1, wherein when the detection interval of the received packet detected first for each of the plurality of bursts is similar continuously for a predetermined number, the interval of the received packet detected first is decided as the front edge period, and when the detection interval of the received packet detected last for each of the plurality of bursts is similar continuously for a predetermined number, the interval of the received packet detected last is decided as the rear edge period.

5. The packet processing device according to claim 4, wherein, in determining the similarity, the similarity range is set to zero or +1 until the predetermined number ends when the similarity is determined even once with an error of +1 during the predetermined number, while the similarity range is set to zero or −1 until the predetermined number ends when the similarity is determined even once with an error of +1 during the predetermined number.

6. The packet processing device according to claim 3, wherein a burst width of the first origin burst is larger than a set threshold, and a burst width of the second origin burst is larger than the set threshold.

7. The packet processing device according to claim 1, wherein sampling received packets at a predetermined interval, a plurality of bursts in which received packets are continuously detected by the sampling are detected for each VLAN type, a front edge period is calculated for each VLAN type based on the received packet detected first among the bursts, for each of the plurality of bursts detected, a rear edge period is calculated for each VLAN type based on the received packet detected last among the bursts, for each of the plurality of bursts detected, the longer period between the front edge period and the rear edge period is decided as the burst period for each VLAN type.

8. A packet processing method comprising:

sampling received packets at a predetermined interval;

detecting a plurality of bursts each of which includes the received packets continuously detected by the sampling, each of the plurality of bursts having a respective time length from a front edge to a rear edge;

calculating a front edge period that is a cycle length of the front edge by using the front edge associated with each of the plurality of bursts detected;

calculating a rear edge period that is a cycle length of the rear edge by using the rear edge associated with each of the plurality of bursts detected;

deciding the longer period between the front edge period and the rear edge period as a burst period, the deciding of the burst period being configured to decide the front edge period as the burst period in response to the front edge period longer than the rear edge period and decide the rear edge period as the burst period in response to the rear edge period longer than the front edge period; and controlling transfer of the received packets based on the decided burst period.

9. The packet processing method according to claim 8, wherein the front edge period is calculated based on the received packet detected first in each of the plurality of bursts, the rear edge period is calculated based on the received packet detected last in each of the plurality of bursts.

10. The packet processing method according to claim 8, wherein the calculating of the front edge period is configured to use a first origin burst from among the plurality of bursts to calculate the front edge period, the first origin burst being a burst following a time interval in which no burst is detected in consecutively two or more samples immediately before the origin burst to calculate the front edge period, and the calculating of the rear edge period is configured to use a second origin burst from among the plurality of bursts to calculate the rear edge period, the second origin bursts being a burst followed by a time interval in which no burst is detected in consecutively two or more samples immediately after the origin burst to calculate the rear edge period.

11. The packet processing method according to claim 8, wherein when the detection interval of the received packet detected first for each of the plurality of bursts is similar continuously for a predetermined number, the interval of the received packet detected first is decided as the front edge period, and when the detection interval of the received packet detected last for each of the plurality of bursts is similar continuously for a predetermined number, the interval of the received packet detected last is decided as the rear edge period.

12. The packet processing method according to claim 11, wherein, in determining the similarity, the similarity range is set to zero or +1 until the predetermined number ends when the similarity is determined even once with an error of +1 during the predetermined number, while the similarity range is set to zero or −1 until the predetermined number ends when the similarity is determined even once with an error of −1 during the predetermined number.

13. The packet processing method according to claim 10, wherein
- a burst width of the first origin burst is larger than a set threshold, and
- a burst width of the second origin burst is larger than the set threshold.

14. The packet processing method according to claim 8, wherein
- sampling received packets at a predetermined interval,
- a plurality of bursts in which received packets are continuously detected by the sampling are detected for each VLAN type,
- a front edge period is calculated for each VLAN type based on the received packet detected first among the bursts, for each of the plurality of bursts detected,
- a rear edge period is calculated for each VLAN type based on the received packet detected last among the bursts, for each of the plurality of bursts detected,
- the longer period between the front edge period and the rear edge period is decided as the burst period for each VLAN type.

\* \* \* \* \*